(12) United States Patent
Ishii et al.

(10) Patent No.: US 7,298,944 B2
(45) Date of Patent: Nov. 20, 2007

(54) METHOD AND DEVICE FOR MANUFACTURING OPTICAL FIBER GRATING, OPTICAL FIBER GRATING, OPTICAL MODULE, AND OPTICAL COMMUNICATION SYSTEM

(75) Inventors: Yuu Ishii, Sakura (JP); Akira Wada, Sakura (JP); Naoki Kimura, Sakura (JP); Susumu Saito, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 10/432,824

(22) PCT Filed: Nov. 28, 2001

(86) PCT No.: PCT/JP01/10382

§ 371 (c)(1),
(2), (4) Date: May 27, 2003

(87) PCT Pub. No.: WO02/44770

PCT Pub. Date: Jun. 6, 2002

(65) Prior Publication Data

US 2004/0028331 A1 Feb. 12, 2004

(30) Foreign Application Priority Data

Nov. 28, 2000 (JP) .............................. 2000-360905
Oct. 31, 2001 (JP) .............................. 2001-335669
Nov. 7, 2001 (JP) .............................. 2001-342507

(51) Int. Cl.
G02B 6/34 (2006.01)
G02B 6/02 (2006.01)

(52) U.S. Cl. ....................................... 385/37; 385/123

(58) Field of Classification Search ................ 385/11, 385/12, 24, 37, 123; 359/483–502, 566–576; 430/290, 321

See application file for complete search history.

(56) References Cited

U.S. PATENT DOCUMENTS

| 3,809,455 | A | * | 5/1974 | Pekau et al. .................... 385/37 |
| 5,502,786 | A | * | 3/1996 | Inniss et al. ................... 385/123 |
| 5,528,716 | A | | 6/1996 | Inniss et al. ................... 385/123 |
| 5,550,948 | A | | 8/1996 | Inniss et al. ................... 385/147 |
| 5,559,907 | A | | 9/1996 | Inniss et al. ................... 385/11 |
| 5,708,738 | A | | 1/1998 | Perez et al. |

(Continued)

FOREIGN PATENT DOCUMENTS

AU 46529/72 3/1974

(Continued)

*Primary Examiner*—Quyen Leung
(74) *Attorney, Agent, or Firm*—Sughrue Mion, PLLC

(57) ABSTRACT

An object of the invention is to improve polarization dependence of insertion loss (PDL) in an ultraviolet light induced optical fiber grating. In the invention, in a method of manufacturing an optical fiber grating with a plurality of grating sections arranged intermittently at a predetermined period along the longitudinal direction, by irradiating, from the side of an optical fiber having locations made of a material wherein the refractive index rises when irradiated by light of a specific wavelength, light of this specific wavelength along the length direction of the optical fiber at a predetermined period, causing the refractive index of the irradiated sections to rise, high refractive index sections are formed by irradiating light evenly onto the optical fiber around the circumferential direction thereof.

21 Claims, 29 Drawing Sheets

U.S. PATENT DOCUMENTS

| | | |
|---|---|---|
| 5,881,187 A | 3/1999 | Modavis |
| 5,945,261 A * | 8/1999 | Rourke ................ 430/321 |
| 6,400,868 B1 | 6/2002 | Riant et al. |
| 6,459,834 B1 | 10/2002 | Kim et al. |
| 6,501,881 B2 | 12/2002 | Kim |
| 6,542,668 B2 | 4/2003 | Gaylord et al. |
| 6,707,966 B1 | 3/2004 | Cline et al. |
| 2001/0016098 A1 | 8/2001 | Tallone ................ 385/37 |

FOREIGN PATENT DOCUMENTS

| | | |
|---|---|---|
| AU | 5973598 B2 | 9/1998 |
| BE | 789176 | 1/1973 |
| CA | 972594 | 8/1975 |
| CA | 2141075 A1 | 8/1995 |
| CA | 2329107 | 6/2001 |
| CH | 548 034 | 4/1974 |
| DE | 21 47 841 | 3/1973 |
| EP | 0 672 922 A2 * | 8/1995 |
| EP | 0 672 922 A2 | 9/1995 |
| FR | 2153318 | 5/1973 |
| FR | 2797057 A1 | 2/2001 |
| GB | 1 394 870 | 5/1975 |
| GB | 2298287 A | 8/1996 |
| JP | 48-42751 | 6/1973 |
| JP | 7-281043 A | 10/1995 |
| JP | 11-326669 A | 11/1999 |
| JP | 2001-83338 A | 3/2001 |
| JP | 1 111 415 A1 | 6/2001 |
| JP | 2001-183536 A | 7/2001 |
| JP | 2001-511904 A | 8/2001 |
| LU | 66 144 | 9/1974 |
| NL | 7212866 | 9/1972 |
| SE | 378 311 | 3/1973 |
| WO | WO83/00232 A1 | 1/1983 |
| WO | WO98/36296 | 8/1998 |

* cited by examiner

---- x POLARIZATION
—— y POLARIZATION

TRANSMISSION LOSS [arb.unit]

WAVELENGTH [arb.unit]

PDL [arb.unit]

WAVELENGTH [arb.unit]

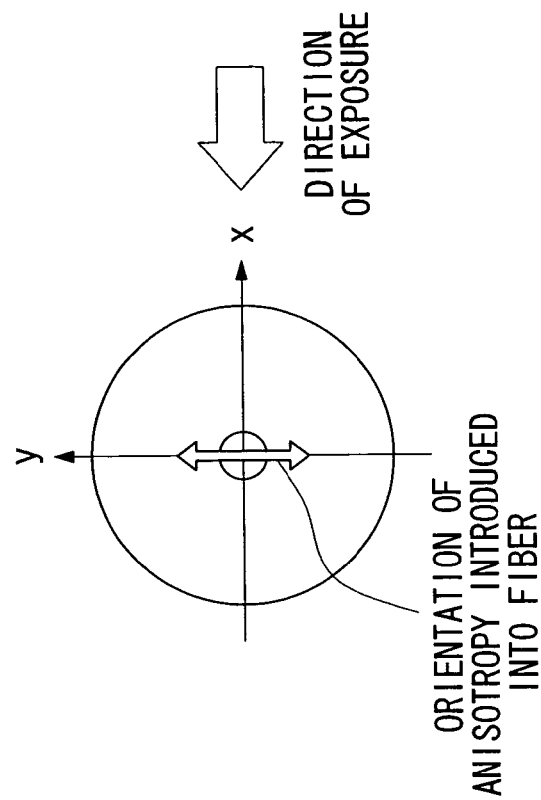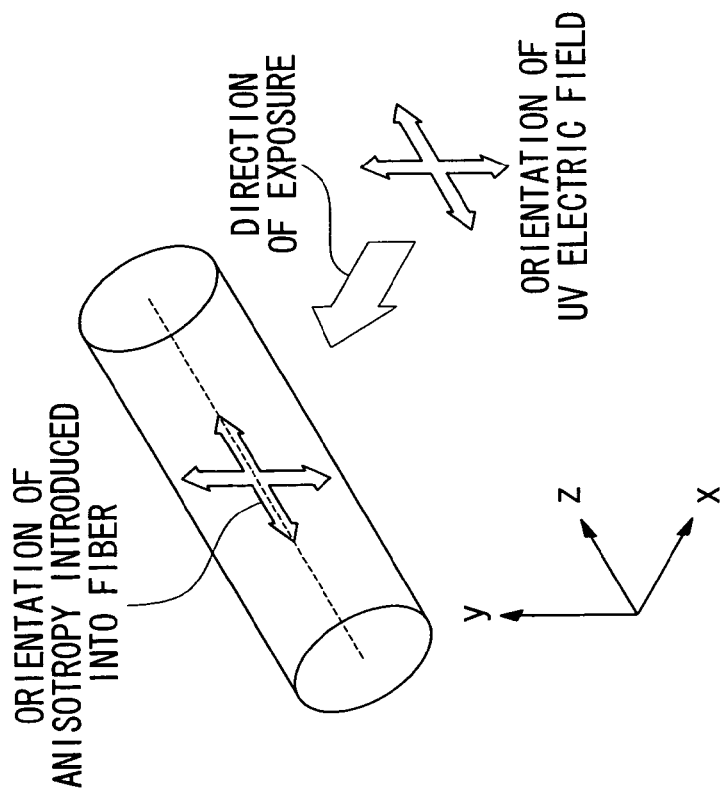
FIG. 41B
FIG. 41A

METHOD AND DEVICE FOR MANUFACTURING OPTICAL FIBER GRATING, OPTICAL FIBER GRATING, OPTICAL MODULE, AND OPTICAL COMMUNICATION SYSTEM

BACKGROUND OF THE INVENTION

1. Field of the Invention

The present invention relates to an optical fiber grating used in the field of optical information communication, and relates specifically to a manufacturing method and a manufacturing apparatus for an optical fiber grating.

2. Description of the Related Art

An optical fiber grating is an optical element with the characteristic of attenuating or reflecting light of a specific wavelength.

Known types of optical fiber gratings include ultraviolet light induced optical fiber gratings (abbreviated to UV induced optical fiber grating below), for example. A UV induced optical fiber grating makes use of a phenomenon whereby irradiating ultraviolet light of a specific wavelength in the vicinity of 240 nm onto silica glass doped with germanium (abbreviated to germanium doped silica glass below) causes the refractive index thereof to rise, and is conventionally manufactured by the following steps, for example.

Generally, an optical fiber in which the core is made of germanium doped silica glass and the cladding is made of silica glass is prepared. Recently however, the optical fiber gratings are sometimes manufactured using optical fibers in which either the core and the cladding, or alternatively just the cladding, is made of germanium doped silica glass.

This optical fiber is then placed in a hydrogen atmosphere according to need, and hydrogen gas immersion treatment is performed to increase the sensitivity of the refractive index fluctuation relative to ultraviolet light.

In addition, when ultraviolet light is irradiated from a single direction onto the side of the optical fiber along the length direction at a predetermined period, using known methods such as an interference exposure method, a phase mask method, an intensity mask method, or a method in which an operation of performing exposure directly using a focused beam is repeated (step-by-step method), then the refractive index of the exposed portions of the optical fiber rises, forming a grating section in which a plurality of high refractive index sections are arranged intermittently at a predetermined period, and the refractive index fluctuates periodically along the length direction of the optical fiber.

Subsequently, a dehydrogenation process is performed, and heat aging is also preferably performed, thereby obtaining an optical fiber grating. The heat aging is performed with an object of improving the long term stability of the optical fiber grating.

In a short period fiber grating (abbreviated to "SPFG" below) in which the period of refractive index variation of the grating section (referred to as the grating period below) is comparatively short, a so-called reflective characteristic is obtained whereby light of a specific wavelength traveling the core in the same direction as the direction of incidence is reflected and attenuated. On the other hand, in a long period fiber grating (abbreviated to "LPFG" below) in which the grating period is comparatively long, a so-called radiating characteristic is obtained whereby light of a specific wavelength traveling the core in the same direction as the direction of incidence is coupled to cladding modes traveling in the same direction, and thereby attenuated.

However, it is known that in conventional manufacturing methods there is an attendant deterioration in the polarization dependence of the insertion loss of the optical fiber grating, regardless of type. The polarization dependence of the insertion loss (referred to as PDL below) is the difference between the insertion losses of the two polarization components constituting the light which propagates the optical fiber, and is particularly pronounced in optical fiber gratings with high transmission loss or high reflectance.

PDL is described below taking an LPFG as an example. This is because the optical characteristics of an LPFG are more sensitive than those of an SPFG to the characteristics of the optical fiber or the grating, specifically the anisotropy and birefringence, and the effects of any improvements are therefore more noticeable, although the same situation can be said to also apply to an SPFG.

The relationship in equation (1) holds true between the center wavelength $\lambda_{ctr}$ of the transmission loss of the LPFG (referred to as the "center wavelength" below) and the grating period $\Lambda$.

$$\lambda_{ctr} = \Lambda(n_{e1} - n_{en}) \quad (1)$$

Here, $n_{e1}$ and $n_{en}$ refer to the effective refractive index of the guided mode ($LP_{01}$) and the cladding mode ($LP_{0n}$), respectively. When the optical fiber is birefringent, that is, $n_{e1}$ and $n_{en}$ fluctuate due to polarization, this center wavelength $\lambda_{ctr}$ also fluctuates due to polarization as shown in equation (2), equation (3) and equation (4).

$$\lambda_{ctr}^{MAX} = \Lambda(n_{e1}^{MAX} - n_{en}^{MIN}) \quad (2)$$

$$\lambda_{ctr}^{MIN} = \Lambda(n_{e1}^{MIN} - n_{en}^{MAX}) \quad (3)$$

$$\Delta\lambda_{ctr} = \lambda_{ctr}^{MAX} - \lambda_{ctr}^{MIN} = \Lambda(B_1 + B_n) \approx \Lambda B_1 \quad (4)$$

Here, $B_1$ and $B_n$ refer to the birefringence of the guided mode and the cladding mode, respectively. Here, attention is directed specifically to the refractive index of the guided mode.

The causes of this deterioration in PDL can be broadly divided into the two causes described below.

The first cause is polarization mode dispersion (referred to as PMD below) which occurs due to the difference between the effective refractive indices between polarization components. This is caused by slight ovality and eccentricity of the core of the optical fiber. The PDL caused by PMD becomes greater as the tilt of the transmission loss or the reflectance increases, but can be reduced to a certain extent by selecting an optical fiber with little ovality and eccentricity.

The second cause is non-uniform refractive index variation which occurs in the ultraviolet light exposure process.

FIG. 38A to FIG. 38D are diagrams describing the refractive index variation which occurs in a conventional ultraviolet light exposure process.

FIG. 38A is a perspective view showing a state in which ultraviolet light is irradiated from a single direction (the A direction) towards the side of an optical fiber 3 onto one location where the refractive index is to be raised.

FIG. 38B shows the refractive index variation in a cross-section of the optical fiber 3 caused by the irradiation intensity of this ultraviolet light, for the high refractive index section 3a formed in this manner. Because the intensity of the ultraviolet light increases towards the irradiation position of the ultraviolet light, there is a large rise in the refractive index, and a refractive index distribution develops in the cross-section of the optical fiber 3.

Here, the traveling direction of the optical fiber 3 is deemed the z axis direction, and the two directions which are orthogonal within the cross-section of the optical fiber 3 are deemed the x axis direction and the y axis direction.

It is known that the polarization state of the ultraviolet light irradiated onto the optical fiber 3 causes birefringence in the actual rise in the refractive index of the optical fiber 3. In other words, the rise in refractive index for a guided wave having an electric field with the same orientation as the electric field of the irradiated ultraviolet light is greater than the rise in refractive index for a guided wave having an electric field perpendicular in orientation to the electric field of the ultraviolet light.

As shown in FIG. 38C, the electric field of the ultraviolet light irradiated from the A direction can be considered to be divided into a y axis component and a z axis component. Of these components, the refractive index variation caused by the electric field of the y axis component presents birefringence in relation to the guided wave which is guided through the optical fiber 3. In other words, refractive index variation is greater for a guided wave having an electric field with an orientation in the y axis direction (called the Y polarization component for convenience) than for a guided wave having an electric field with an orientation in the x axis direction (called the X polarization component for convenience).

FIG. 38D is a diagram describing the anisotropy of the refractive index variation introduced at this time. The orientations of the polarization components which cause large refractive index variation are indicated by the bold arrows.

As a result, the difference in propagation constant between the X polarization component and the Y polarization component is large, and the PDL deteriorates. Because the refractive index variation caused by ultraviolet light having an electric field component in the z axis direction has an equivalent effect on the X polarization component and the Y polarization component, it does not need to be considered here.

FIG. 39 is a graph showing the refractive index variation for each polarization component in a case where the grating section is formed by irradiating ultraviolet light at a predetermined period along the length direction of the optical fiber 3 from the A direction only. It is apparent that there is a difference between the X polarization component and the Y polarization component in the amount of refractive index variation.

FIG. 40 is a graph showing an example of the optical characteristics of an optical fiber grating manufactured by this manufacturing method.

In this example, a cut-off shifted optical fiber (manufactured by Fujikura Co., Ltd.), for use with a band of 1.55 μm, in which the core is made of germanium doped silica glass and the cladding is made of silica glass, was used in the manufacture of a so-called radiative optical fiber grating with a grating period of 295 μm and a grating length (the length of the grating section) of 35 mm. Fine adjustment of the grating period was performed in the vicinity of 295 μm so that the wavelength in the transmission spectrum where the rejection ratio (transmission loss value) is the highest (referred to as the maximum rejection wavelength below) was 1530.0 nm. Furthermore, the ultraviolet light irradiation time and the power of the ultraviolet light were adjusted appropriately so that the transmission loss value at the maximum rejection wavelength was 4.0 dB.

A KrF excimer laser or an Ar-SHG (Argon-ion Second Harmonic Generation) laser or the like was used as the light source for irradiating ultraviolet light.

In the graphs, there are two peaks in the graph showing the PDL, but generally the highest peak is deemed the PDL worst case value. The PDL worst case value of the optical fiber grating of this example is 0.17 dB.

The other peak occurs due to the polarization of the ultraviolet light irradiated onto the optical fiber.

The state of the birefringence introduced as a result of the polarization of the ultraviolet light is shown in FIG. 41A and FIG. 41B. In these diagrams, the traveling direction of the light which propagates the optical fiber is deemed the z axis direction, and the two directions which are orthogonal within the cross-section of the optical fiber are deemed the x axis direction and the y axis direction.

It is reported in OFS-11, We 5-1 (1996), (T. Meyer, et al.) that the polarization state of the ultraviolet light irradiated onto the optical fiber affects the birefringence of the refractive index variation of the optical fiber. In other words, the rise in refractive index for a guided wave having an electric field with the same orientation as the electric field of the irradiated ultraviolet light is greater than the rise of the refractive index for a guided wave having an electric field perpendicular in orientation to the electric field of the ultraviolet light.

Here, as shown in FIG. 41A, the electric field of the irradiated ultraviolet light can be considered to be divided into a component which is parallel to the axis of the optical fiber, and a component which is perpendicular to the axis of the optical fiber. Because the refractive index variation caused by the component which is parallel to the axis of the optical fiber is axisymmetric, it is not a cause of the difference in the effective refractive index variation due to the guided wave, that is, it is not a cause of birefringence. However, regarding the perpendicular component, as shown in FIG. 41B, when exposure is performed from the x axis direction, a guided wave which has an electric field component oriented in the y axis direction has a higher refractive index than a guided wave which has an electric field component oriented in the x axis direction.

As described above, birefringence caused by ultraviolet light irradiation can be considered to be divided into the two types mentioned above, but in each case, a difference occurs in the size of the refractive index due to polarization.

This difference in refractive index due to polarization is shown in FIG. 42. As shown in FIG. 42, if the refractive index for the polarization B is higher than that for the polarization A, for example, then the disparity in the average refractive index of the grating section (abbreviated to the "DC component" below) is a cause of deviation in the center wavelength, and the disparity in the refractive index variation amount (abbreviated to the "AC component" below) is a cause of fluctuation in the maximum loss difference (rejection ratio). Both these factors are causes of PDL, and are particularly pronounced when the transmission loss and the reflectance of the optical fiber grating are high.

When actually manufacturing an LPFG, because the respective orientations of the birefringence caused by each of the two factors described above, that is the birefringence caused by the makeup of the optical fiber itself and the birefringence caused by exposure, are random, and these two types of birefringence can be added to each other or cancel each other out, it is assumed that even LPFGs manufactured by performing exposure under identical conditions can have complicated PDL characteristics.

The optical characteristics of an LPFG in a case where the respective orientations of the birefringence caused by the makeup of the optical fiber itself and the birefringence caused by exposure are taken into consideration is examined below.

A uniform LPFG transmission loss spectrum can be approximated closely by the sinc² function shown in equation (5) below.

$$\text{loss}(\lambda) = \Delta L \cdot \text{sinc}^2\left(\pi \frac{\lambda - \lambda ctr}{\sigma}\right) + L_{ex} \quad (5)$$

The transmission loss spectrum of the LPFG is shown in FIG. 43. Here, $\lambda_{ctr}$ is the center wavelength of the transmission loss, $\sigma$ is the bandwidth half-width, $\Delta L$ is the maximum loss difference, and $L_{ex}$ is the excess loss. Assuming a linearly polarized light for the sake of simplification, it is natural to assume that the period of the fluctuation of the center wavelength $\lambda_{ctr}$ and the maximum loss difference $\Delta L$ relative to the polarization direction of the incident light is 180°, and this can be approximated as shown in equations (6) and (7).

$$\lambda ctr \to \lambda_{ctr}^0 + \Delta\lambda_{fib}\frac{\cos 2\theta}{2} + \Delta\lambda_{\exp}\frac{\cos 2\varphi}{2} \quad (6)$$

$$\Delta L \to \Delta L^0\left(1 + \varepsilon\frac{\cos 2\varphi}{2}\right) \quad (7)$$

Here, $\Delta\lambda_{fib}$ indicates the fluctuation width in the center wavelength caused by the birefringence of the optical fiber itself, $\Delta\lambda_{exp}$ indicates the fluctuation width in the center wavelength caused by the DC component of the birefringence introduced as a result of exposure, and $\varepsilon$ indicates the size of the fluctuation caused by the AC component of the birefringence introduced as a result of exposure.

The angle formed between the primary axis of the birefringence of the optical fiber itself and the primary axis of the birefringence introduced as a result of the exposure is defined as $\phi$. In this case, it can be assumed that $\varphi = \theta + \phi$, and the transmission loss for a specific polarization with an angle of polarization of $\theta$ can be expressed as in equation (8).

ultraviolet light being irradiated onto the side of the optical fiber 3 from one direction (the A direction), ultraviolet light is also irradiated from a direction (the B direction) which opposes this A direction. As a result, as shown in FIG. 44B, it is possible to solve the problem of bias in the refractive index in the cross-section of the optical fiber 3.

However, even in this method, as shown in FIG. 44C, since the ultraviolet light irradiated from the A direction is polarized in the y axis direction and the z axis direction, and the ultraviolet light irradiated from the B direction is also polarized in the y axis direction and the z axis direction, then the refractive index variation of the Y polarization component is greater than the refractive index variation in the X polarization component. As a result, the birefringence caused by the polarization of the irradiated ultraviolet light is not eliminated by this method.

FIG. 44D is a diagram explaining the anisotropy of the refractive index variation introduced at this time. The orientations of the polarization components which cause large refractive index variations are indicated by the bold arrows.

FIG. 45 is a graph showing the optical characteristics of an optical fiber grating manufactured in the same manner as in the example above, but with the exception that ultraviolet light was irradiated from two directions, the A direction and the B direction. The PDL worst case value is approximately 0.12 dB, which is slightly lower than that shown in FIG. 14. However, this value is not considered to be small enough, and further improvement is required.

In Japanese Patent Application No. 2000-360905, the inventors of the present invention proposed an exposure method in which birefringence caused by exposure is minimized, by irradiating ultraviolet light from four directions which are symmetrical about the axis of the optical fiber. In this method, the birefringence introduced into the fiber by the exposure can be reduced to a minimum, but the PDL resulting from the birefringence caused by the optical fiber itself can only be solved by using an optical fiber with minimal birefringence, that is minimal PMD.

The reason for this is because in this exposure method, the angle $\phi$ formed between the orientation of the birefringence of the optical fiber itself in the equation (8), and the $$\text{loss}(\lambda) = \Delta L\left(1 + \varepsilon\frac{\cos 2(\theta + \phi)}{2}\right)\text{sinc}^2\left(\pi\frac{\lambda - \left(\lambda_{ctr}^0 + \Delta\lambda_{fib}\frac{\cos 2\theta}{2} + \Delta\lambda_{\exp}\frac{\cos 2(\theta + \phi)}{2}\right)}{\sigma}\right) + L_{ex} \quad (8)$$

PDL is the difference between the maximum value and the minimum value of this loss ($\lambda$) when $\theta$ is varied from 0° through 180°, and can be expressed as in equation (9).

$$PDL(\lambda) = \text{loss}(\lambda)^{MAX} - \text{loss}(\lambda)^{MIN} \quad (9)$$

From the above it is evident that, generally, PDL deteriorates in cases where the amount of fluctuation in $\lambda_{ctr}$ and $\Delta L$ are large, that is, in cases in which the birefringence of the optical fiber is large, and cases in which the birefringence introduced by exposure with ultraviolet radiation is large.

In order to solve this problem of the deterioration of PDL, a method described below is proposed in Optics Letters V. 19, n. 16, pp. 1260–1262 (Aug. 15, 1994).

FIG. 44A to FIG. 44D are explanatory diagrams showing this method, which differs from the method shown in FIG. 38A to FIG. 38D in that, as shown in FIG. 44, in addition to orientation of the birefringence introduced as a result of the exposure is treated as indeterminable, and in equation (10), $$\Delta\lambda_{ctr} = \Delta\lambda_{fib} + \int \Delta\lambda_{\exp}\cos 2\phi dl = \Lambda(B_{fib} + B_{exp}\int \cos 2\phi dl) \quad (10)$$

$B_{fib}$ and $B_{exp}$ are set as the birefringence of the optical fiber and the birefringence caused by exposure, respectively, and the second term in the right parentheses is set to zero, meaning that this is an exposure method in which the birefringence of the optical fiber and the birefringence caused by the exposure are not linked.

DISCLOSURE OF INVENTION

The present invention takes the above factors into consideration, with an object of providing an optical fiber grating with improved PDL. Specifically, an object of the present invention is to decrease the birefringence caused by the polarization of the ultraviolet light in a UV induced optical fiber grating. Furthermore, another object of the present invention is to manufacture an optical fiber grating by irradiating ultraviolet light so that the birefringence of the optical fiber itself and the birefringence caused by the exposure cancel each other out, thereby enabling a substantial reduction in insertion loss polarization dependence.

In the present invention, the following solutions are proposed in order to solve the above problems.

A first aspect of the present invention is a method of manufacturing an optical fiber grating having a plurality of grating sections arranged intermittently at a predetermined period along the longitudinal direction, by irradiating, onto the side of an optical fiber having locations made of a material wherein the refractive index rises when irradiated by light of a specific wavelength, light of this specific wavelength along the length direction of the optical fiber at a predetermined period, causing the refractive index of the irradiated sections to rise, wherein high refractive index sections are formed by irradiating light evenly onto the optical fiber around the circumferential direction thereof.

A second aspect of the present invention is a method of manufacturing an optical fiber grating having a plurality of grating sections arranged intermittently at a predetermined period along the longitudinal direction, by irradiating, onto the side of an optical fiber having locations made of a material wherein the refractive index rises when irradiated by light of a specific wavelength, light of this specific wavelength along the length direction of the optical fiber at a predetermined period, causing the refractive index of the irradiated sections to rise, wherein in the formation of a plurality of high refractive index sections, light is irradiated by varying sequentially the light irradiation position along the longitudinal direction of the optical fiber, so that the irradiation amount becomes equal around the circumferential direction of the optical fiber as the result of integrating the light irradiation amount along the length direction of the optical fiber over all of the grating section.

A third aspect of the present invention is an optical fiber grating manufacturing method according to the first aspect, wherein by using a parabolic mirror, light is irradiated evenly onto the optical fiber around the circumferential direction thereof.

A fourth aspect of the present invention is an optical fiber grating manufacturing method according to either one of the first and the second aspects, wherein by using a plurality of reflecting mirrors, light is irradiated evenly onto the optical fiber around the circumferential direction thereof.

A fifth aspect of the present invention is an optical fiber grating manufacturing method according to either one of the first and the second aspects, wherein by rotating either one or both of the optical fiber and the irradiating light around the axis of the optical fiber, light is irradiated evenly onto the optical fiber around the circumferential direction thereof.

A sixth aspect of the present invention is an optical fiber grating manufacturing apparatus used in the optical fiber grating manufacturing method according to either one of the first and the second aspects, comprising a holding device which holds the optical fiber, and an irradiating device which irradiates light of a specific wavelength onto the optical fiber, and the holding device comprises a rotation mechanism which rotates the optical fiber in the circumferential direction.

A seventh aspect of the present invention is an optical fiber grating manufacturing apparatus used in the optical fiber grating manufacturing method according to the third aspect, comprising a parabolic mirror having a mirrored inner surface, an irradiating device which irradiates light onto the inner surface of this parabolic mirror, a holding device which holds an optical fiber in place within the parabolic mirror, and a moving device which moves at least one of the parabolic mirror and the holding device in the length direction of the optical fiber.

An eighth aspect of the present invention is an optical fiber grating manufacturing apparatus used in the optical fiber grating manufacturing method according to the fourth aspect, comprising a plurality of reflecting mirrors, an irradiating device which irradiates light onto these reflecting mirrors, a holding device which holds an optical fiber in place within the optical path of the light reflected by the reflecting mirrors, and a moving device which moves at least one of the reflecting mirrors and the holding device in the length direction of the optical fiber.

A ninth aspect of the present invention is an optical fiber grating which has a periodic refractive index distribution, which is formed by irradiating ultraviolet light at a predetermined period along the length direction of an optical fiber, wherein the distribution of maximum insertion loss polarization dependence values within the working wavelength range of the optical fiber gratings for a single manufacturing batch is less than one fifth of the average value of the maximum insertion loss polarization dependence within the same manufacturing batch.

A tenth aspect of the present invention is an optical fiber grating manufacturing apparatus for manufacturing an optical fiber grating by irradiating ultraviolet light onto an optical fiber doped with a photosensitive element to form periodic high refractive index sections, comprising; a device which measures the outer diameter of the optical fiber, and a device which varies a direction of exposure relative to the optical fiber.

An eleventh aspect of the present invention is an optical fiber grating manufacturing apparatus according to the tenth aspect, wherein an optical fiber clamp which holds the optical fiber is rotated around the axis of the optical fiber, for varying the exposure direction.

A twelfth aspect of the present invention is an optical fiber grating manufacturing apparatus according to the tenth aspect, wherein either a mirror, or both a mirror and a condensing lens, for irradiating ultraviolet light onto the optical fiber are rotated around the outer periphery of the optical fiber, for varying the exposure direction.

A thirteenth aspect of the present invention is an optical fiber grating manufacturing apparatus according to any one of the tenth through twelfth aspects, wherein the exposure is performed by an interference exposure system.

A fourteenth aspect of the present invention is an optical fiber grating manufacturing apparatus according to any one of the tenth through twelfth aspects, wherein the exposure is performed by irradiating the ultraviolet light onto the optical fiber through a phase mask or an intensity mask.

A fifteenth aspect of the present invention is an optical fiber grating manufacturing apparatus according to any one of the tenth through twelfth aspects, wherein the exposure is performed by irradiating the ultraviolet light onto the optical fiber while moving either a mirror, or both a mirror and a condensing lens, in a parallel direction to the axis of the optical fiber.

A sixteenth aspect of the present invention is an optical fiber grating manufacturing apparatus according to any one of the tenth through twelfth aspects, wherein the exposure is performed by irradiating the ultraviolet light onto the optical fiber while moving an optical fiber clamp which holds the optical fiber, in a parallel direction to the axis of the optical fiber.

A seventeenth aspect of the present invention is an optical fiber grating manufacturing method, wherein a major axis direction and a minor axis direction of an optical fiber cross-section are found by measuring the outer diameter of the optical fiber, and an optical fiber grating is manufactured by irradiating ultraviolet light onto the optical fiber from the major axis direction and/or the minor axis direction of the optical fiber cross-section to form periodic high refractive index sections.

An eighteenth aspect of the present invention is an optical fiber grating manufacturing method, wherein a major axis direction and a minor axis direction of an optical fiber cross-section are found by measuring the outer diameter of the optical fiber, and an optical fiber grating is manufactured by irradiating mutually different amounts of ultraviolet light onto the optical fiber from the major axis direction and the minor axis direction of the optical fiber cross-section, respectively, to form periodic high refractive index sections.

A nineteenth aspect of the present invention is an optical fiber grating manufacturing method, wherein a major axis direction and a minor axis direction of an optical fiber cross-section are found by measuring the outer diameter of the optical fiber, and an optical fiber grating is manufactured by irradiating ultraviolet light onto the optical fiber from either a single direction or a plurality of directions with a predetermined angle relative to the major axis or the minor axis of the optical fiber cross-section, to form periodic high refractive index sections.

A twentieth aspect of the present invention is an optical fiber grating manufacturing method according to the nineteenth aspect, wherein the predetermined angle is decided based on a transmission loss spectrum and an insertion loss polarization dependence of an optical fiber grating formed by irradiating ultraviolet light onto the optical fiber from the major axis direction and/or the minor axis direction of the optical fiber cross-section.

A twenty-first aspect of the present invention is an optical fiber grating made by forming periodic high refractive index sections by irradiating ultraviolet light onto an optical fiber doped with a photosensitive material, which has a smaller insertion loss polarization dependence $PDL_{meas}(\lambda)$ than an insertion loss polarization dependence $PDL_{calc}(\lambda)$ determined as $$\Lambda \cdot B_1 \cdot |dloss(\lambda)/d\lambda|$$

from the absolute value $|dloss(\lambda)/d\lambda|$ of the loss spectrum loss $(\lambda)$, observed when non polarized light or fully polarized light is introduced, differentiated by the wavelength, the mode birefringence $B_1$ of the guided mode of the optical fiber, and the grating period $\Lambda$.

A twenty-second aspect of the present invention is an optical module using the optical fiber grating described above.

A twenty-third aspect of the present invention is an optical communication system incorporating the above optical module.

BRIEF DESCRIPTION OF THE DRAWINGS

FIG. 41A is a diagram showing the birefringence introduced by the polarization of the ultraviolet light.

FIG. 41B is a diagram showing the birefringence introduced by the polarization of the ultraviolet light.

BEST MODE FOR CARRYING OUT THE INVENTION

Embodiment 1

FIG. 1A to FIG. 1D are diagrams showing an example of an optical fiber grating manufacturing method of the present invention.

Figure 1:
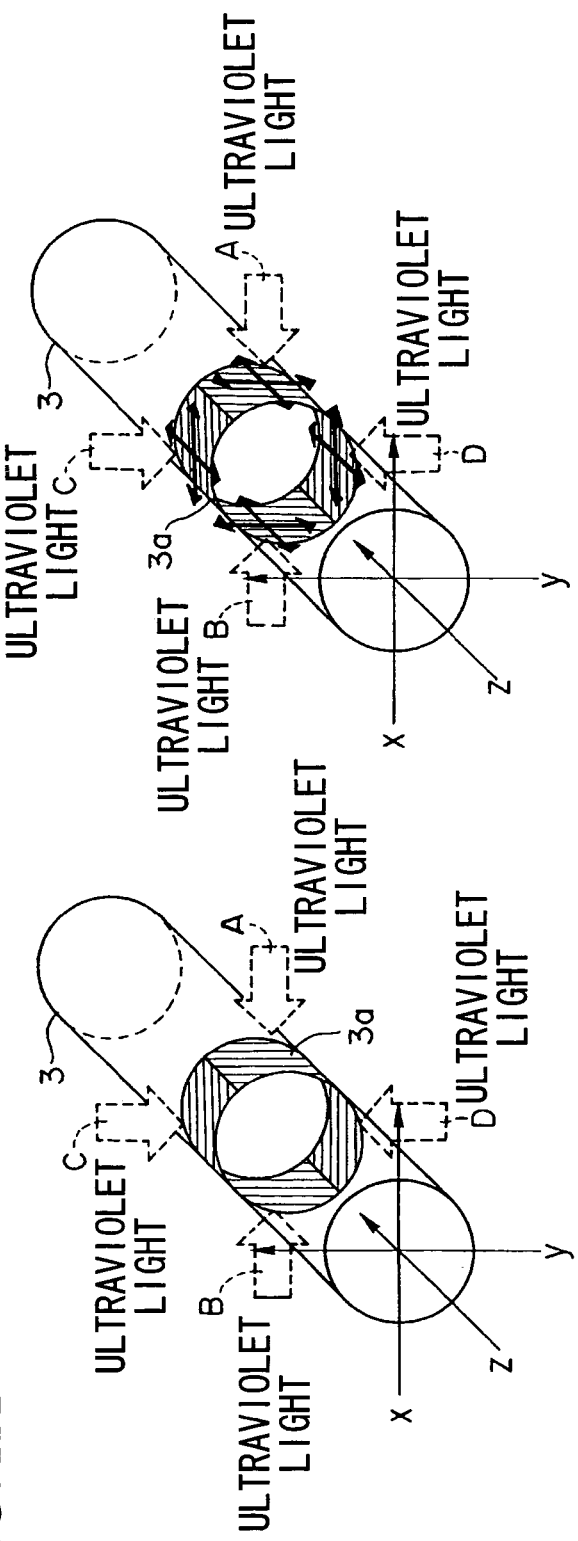
FIG. 1A is a perspective view describing an example of an optical fiber grating manufacturing method of the present invention, showing a state in which ultraviolet light is irradiated onto the side of an optical fiber.
FIG. 1B is a diagram describing the variation in refractive index caused by the irradiation intensity of the ultraviolet light in a cross-section of the optical fiber, in the optical fiber grating manufacturing method shown in FIG. 1A.
FIG. 1C is a diagram describing the polarization of the ultraviolet light in the optical fiber grating manufacturing method shown in FIG. 1A.
FIG. 1D is a diagram describing the anisotropy of the refractive index caused by the polarization shown in FIG. 1C.
Figure 44A:
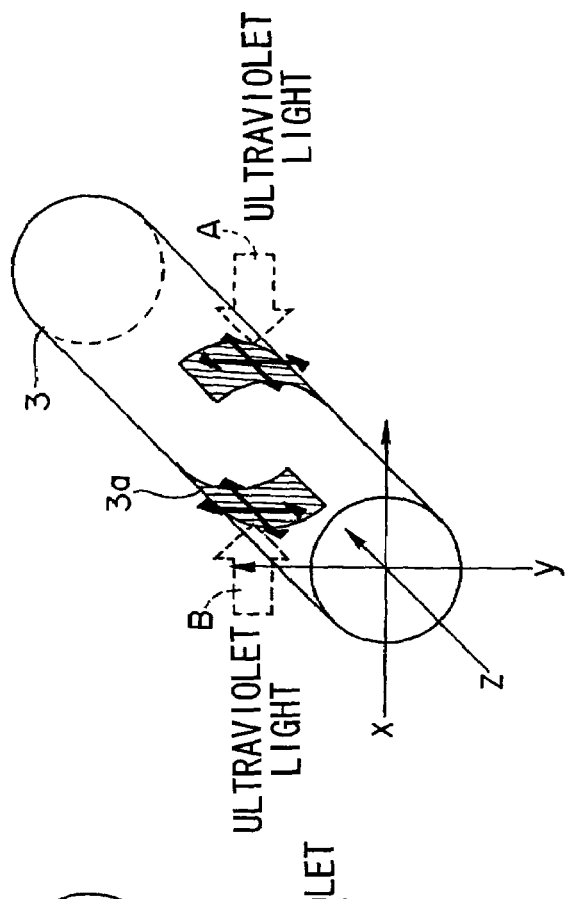
FIG. 44A is a diagram describing the irradiation direction of the ultraviolet light in a method in which an optical fiber grating is manufactured by irradiating ultraviolet light onto the side of the optical fiber from two opposing directions.
Figure 44B:
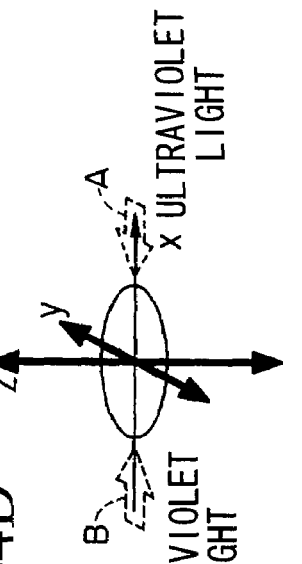
FIG. 44B is a diagram describing the refractive index variation caused by the irradiation intensity of the ultraviolet light in the cross-section of the optical fiber, in a method in which an optical fiber grating is manufactured by irradiating ultraviolet light onto the side of the optical fiber from two opposing directions.
Figure 44C:
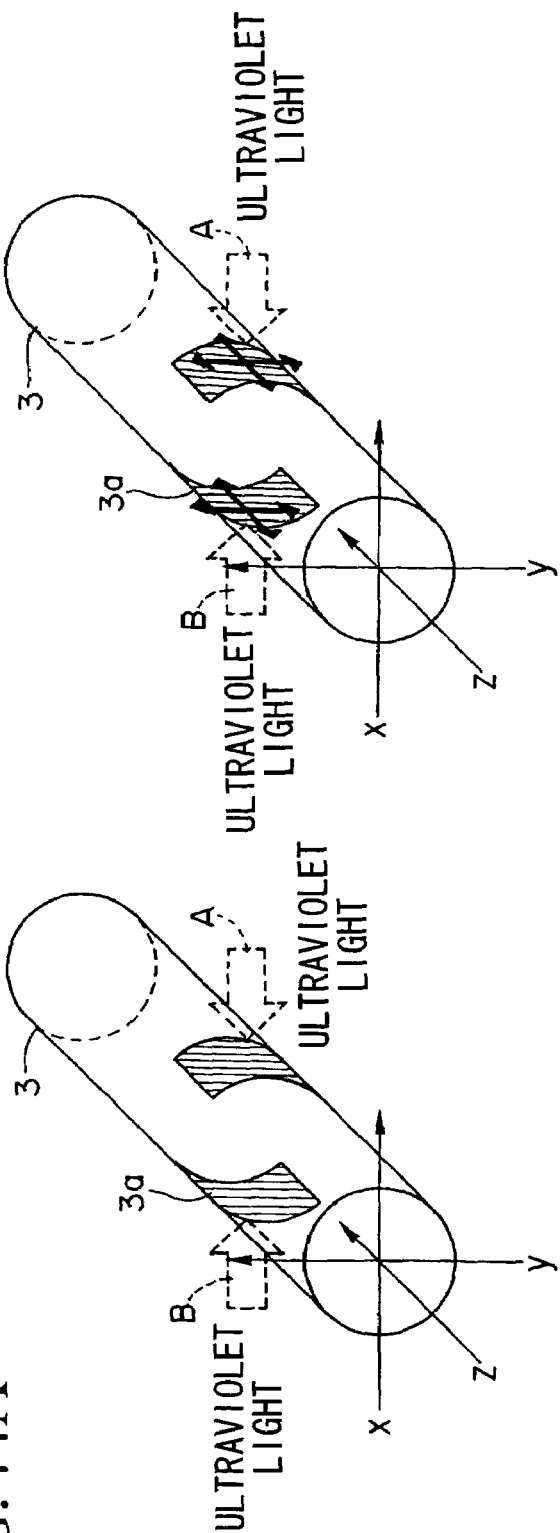
FIG. 44C is a diagram describing the polarization of the ultraviolet light, in a method in which an optical fiber grating is manufactured by irradiating ultraviolet light onto the side of the optical fiber from two opposing directions.
Figure 44D:
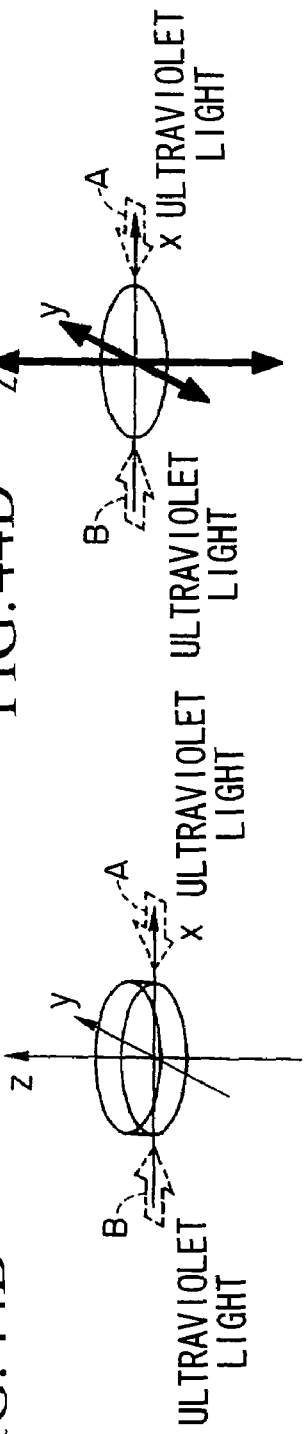
FIG. 44D is a diagram describing the anisotropy of the refractive index caused by the polarization shown in FIG. 44C.

In the present invention, as shown in FIG. 1A, a high refractive index section 3a is formed by irradiating ultraviolet light evenly around the entire side surface of a location of an optical fiber 3 where the high refractive index section 3a is to be formed. In other words, in the same manner as in the method shown in FIG. 44A described above, ultraviolet light is irradiated from an A direction and a B direction which opposes the A direction, ultraviolet light is also irradiated from a C direction which is orthogonal to the A direction and the B direction, and ultraviolet light is further irradiated from a direction (a D direction) which opposes this C direction. In other words, by dividing the side surface of the optical fiber 3 in parallel to the length direction of the optical fiber 3 so as to be divided into four equal portions around the circumferential direction, and then irradiating ultraviolet light evenly onto each of the four even portions, ultraviolet light is irradiated evenly over the entire side surface of the optical fiber 3.

Furthermore, light may be irradiated by varying sequentially the irradiation position of the light along the longitudinal direction of the optical fiber so that the irradiation amount becomes equal around the circumferential direction of the optical fiber as the result of integrating the light irradiation amount along the length direction of the optical fiber over all of the grating section.

As a result, as shown in FIG. 1B, ununiformity in the refractive index caused by the irradiation intensity of the ultraviolet light does not occur in the cross-section of the optical fiber 3.

Furthermore, as shown in FIG. 1C, the polarization of the ultraviolet light irradiated from the A direction and the B direction can be divided into a polarization parallel to the y axis (Y polarization) component and a polarization parallel to the z axis (Z polarization) component. Similarly, the polarization of the ultraviolet light irradiated from the C direction and the D direction can be divided into a polarization parallel to the x axis (X polarization) component and a polarization parallel to the z axis (Z polarization) component.

By performing exposure from both the x axis direction and the y axis direction in this manner, as shown in FIG. 1D, it is possible to ensure that the refractive index variation is equal for both the X polarization component and the Y polarization component. As described above, the bold arrows in the diagram show the orientation of the polarization components which cause large refractive index variation.

Figure 2:
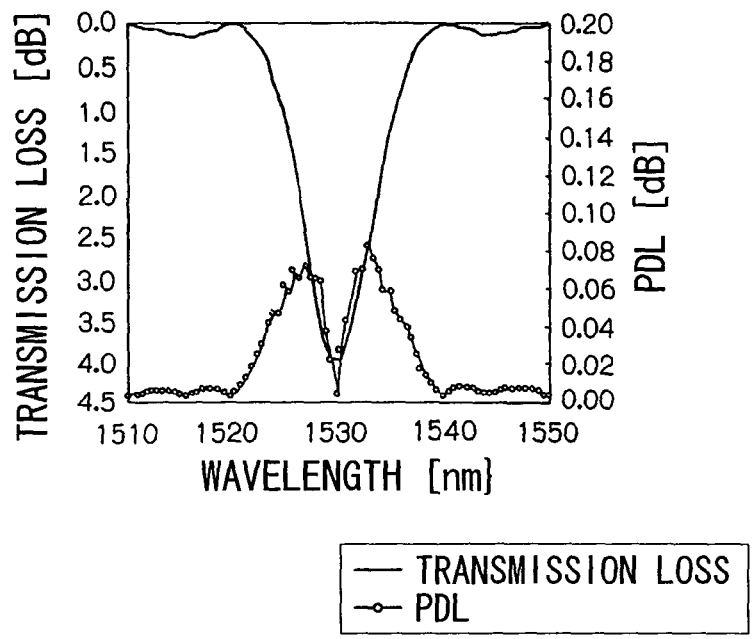
FIG. 2 is a graph showing an example of the optical characteristics of an optical fiber grating manufactured by the method shown in FIG. 1A to FIG. 1D.

FIG. 2 is a graph showing an example of the optical characteristics of an optical fiber grating manufactured in the same manner as the method described above, with the exception of the irradiation method. In other words, this graph shows the optical characteristics of an optical fiber grating manufactured by repeating, at a predetermined period along the length of the optical fiber 3, an operation of irradiating ultraviolet light from four directions A, B, C and D to form high refractive index sections 3a, as shown in FIG. 1A.

Figure 40:
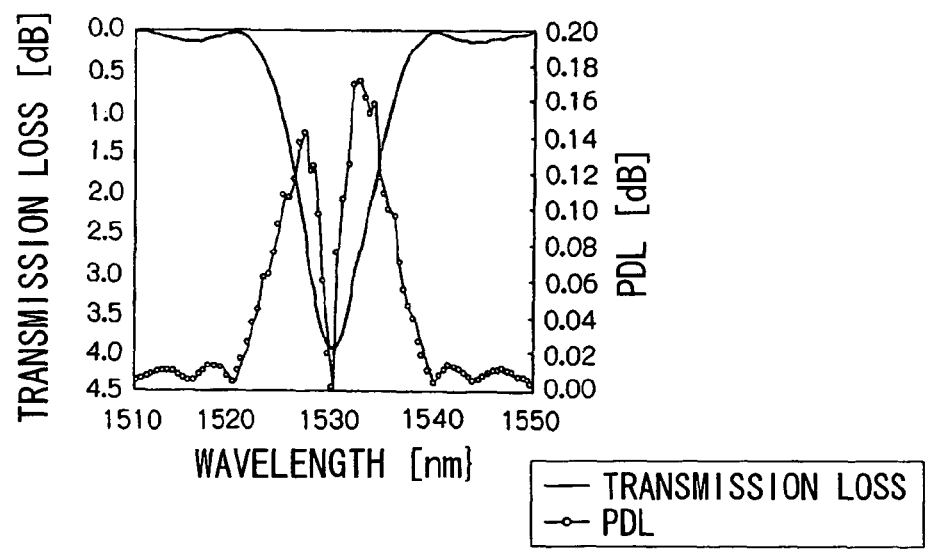
FIG. 40 is a graph showing an example of the optical characteristics of an optical fiber grating manufactured by the conventional manufacturing method shown in FIG. 38A to FIG. 38D.
Figure 45:
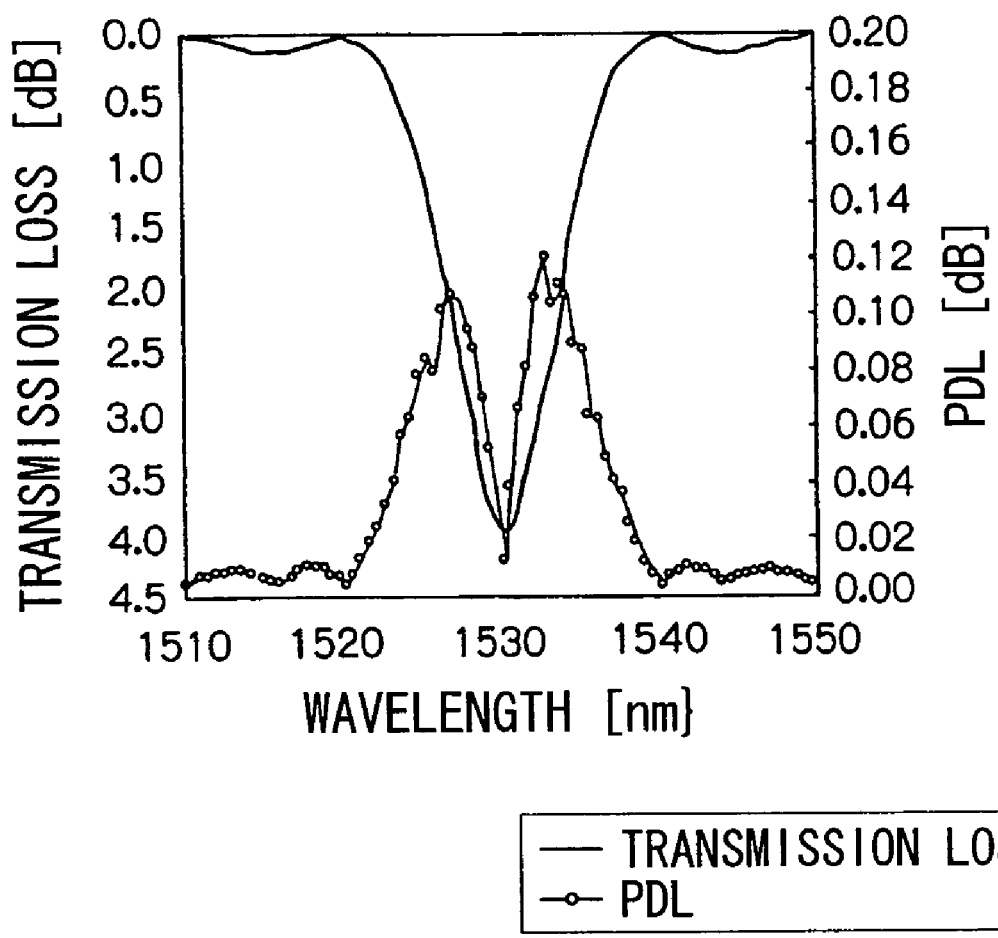
FIG. 45 is a graph showing an example of the optical characteristics of an optical fiber grating manufactured by the conventional manufacturing method shown in FIG. 44A to FIG. 44D.

The PDL worst case value of the optical fiber grating in this example is 0.08 dB, meaning that a lower value is obtained than in the examples shown in FIG. 40 and FIG. 45 described above.

Because PDL also occurs due to PMD as described above, it is difficult to completely eliminate PDL.

Figure 3:
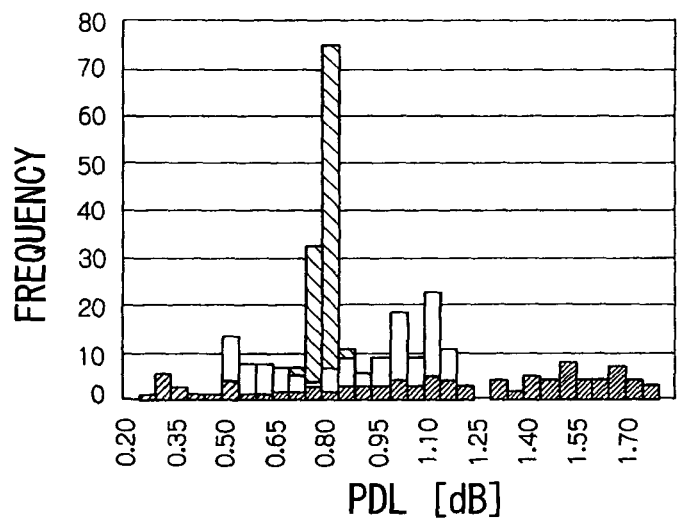
FIG. 3 is a graph showing a comparison of the distribution of the optical characteristics of optical fiber gratings made by different manufacturing methods.
Figure 38A:
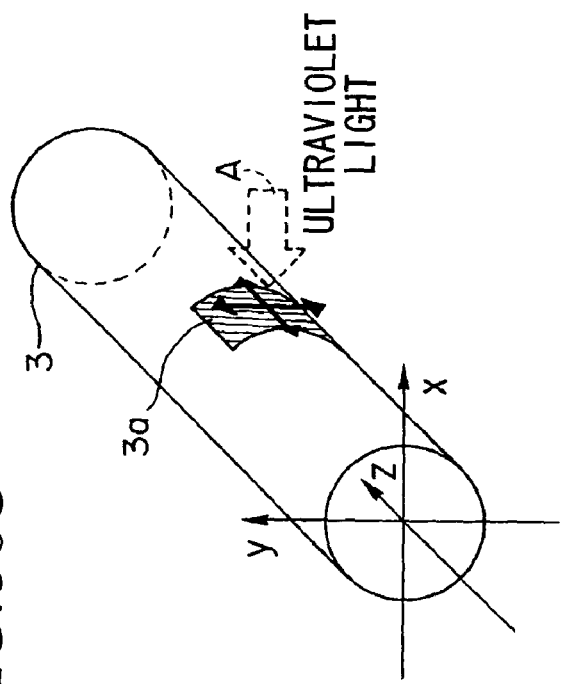
FIG. 38A is a perspective view describing a conventional optical fiber grating manufacturing method, showing a state in which ultraviolet light is irradiated from a single direction.
Figure 38B:
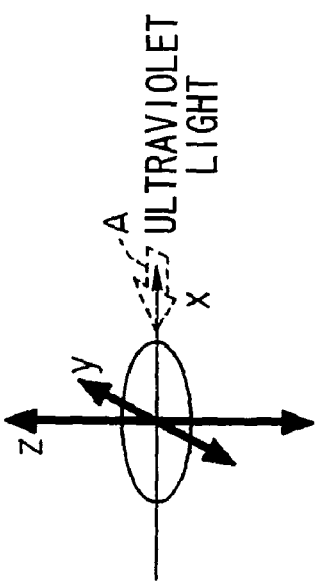
FIG. 38B is a diagram describing the refractive index variation caused by the irradiation intensity of the ultraviolet light in the cross-section of the optical fiber, in a conventional optical fiber grating manufacturing method.
Figure 38C:
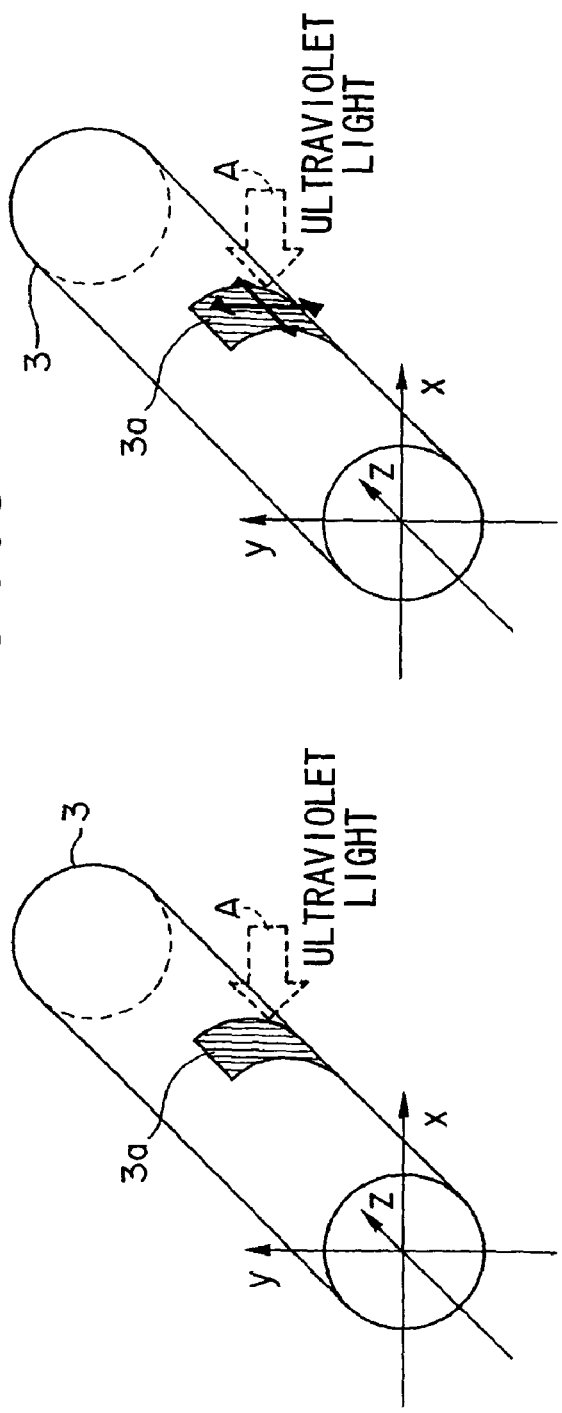
FIG. 38C is a diagram describing the polarization of ultraviolet light in a conventional optical fiber grating manufacturing method.
Figure 38D:
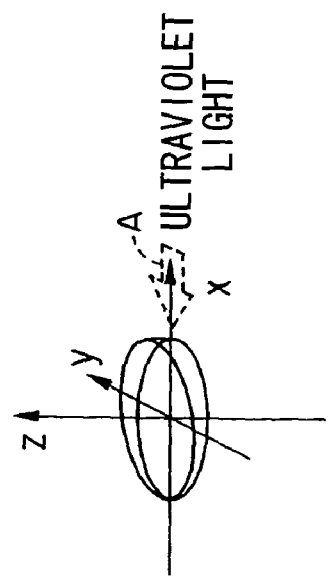
FIG. 38D is a diagram describing the anisotropy of the refractive index caused by the polarization shown in FIG. 38C.
Figure 39:
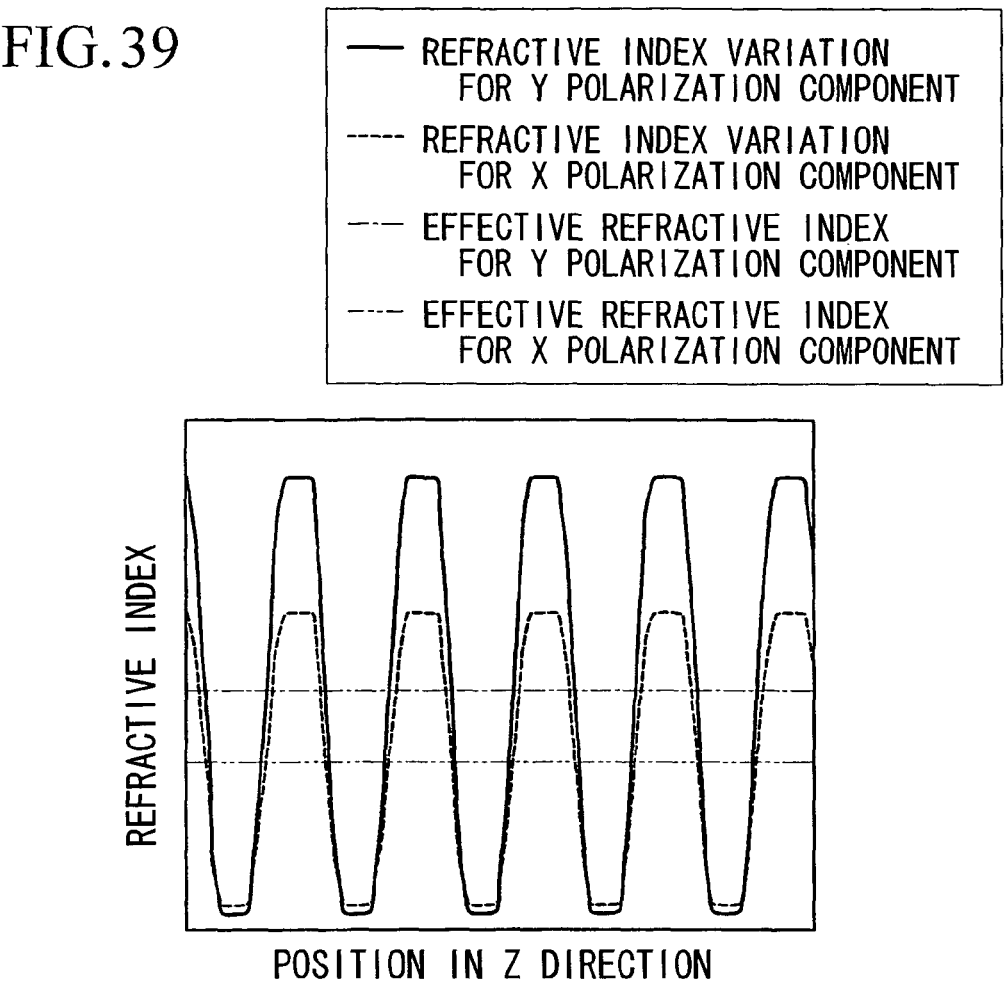
FIG. 39 is a graph showing the refractive index variation of an optical fiber grating manufactured by the conventional method shown in FIG. 38A to FIG. 38D.

FIG. 3 shows collectively the results of measuring the PDL of the optical fiber gratings manufactured according to the method shown in FIG. 1A (described in the graph as "axisymmetric exposure"), the method shown in FIG. 38A (described in the graph as "conventional (one-side) exposure"), and the method shown in FIG. 44 (described in the graph as "plane-symmetric exposure"). The frequency of the vertical axis indicates the number of samples.

It is apparent from this graph that in an optical fiber grating manufactured according to the manufacturing method of the present invention, the PDL value is small, and there is little variation therein. Specifically, it is apparent that when the optical characteristics are effectively the same and the optical fibers used as the material for the optical fiber grating are of the same type, the standard deviation of the distribution of the PDL in the optical fiber grating is of the order of the error of measurement, and is less than one fifth of the absolute value of the PDL. Accordingly, it is apparent that volume production of optical fiber gratings with stable characteristics can be achieved by the manufacturing method of the present invention.

FIG. 4 through FIG. 7 are schematic diagrams showing the structure of an optical fiber grating manufacturing apparatus applied to the optical fiber grating manufacturing method of the present invention.

Figure 4:
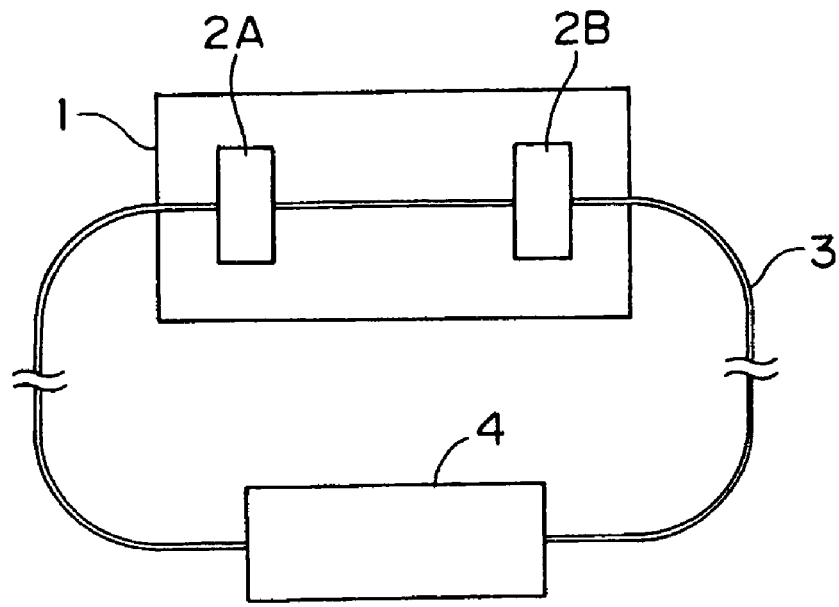
FIG. 4 is a schematic structural diagram showing an example of an optical fiber grating manufacturing apparatus of the present invention.

In FIG. 4, reference numeral 1 indicates a flat exposure stage, on the upper surface of which are provided two fiber clamps 2A, 2B, with a predetermined gap therebetween, and the optical fiber 3 is held by these fiber clamps 2A, 2B. A rotation mechanism which is not shown in the diagram is provided on these fiber clamps 2A, 2B, and by operating this rotation mechanism, it is possible to rotate the optical fiber 3 with a predetermined angle in the circumferential direction, without the center axis thereof moving. An example of a suitable rotation mechanism is a rotation drive method by means of a stepping motor, for example.

Both ends of the optical fiber 3 held by the fiber clamps 2A, 2B are connected to an optical measuring unit 4, allowing the optical characteristics of the optical fiber grating to be monitored while the manufacturing operations are performed.

Figure 5:
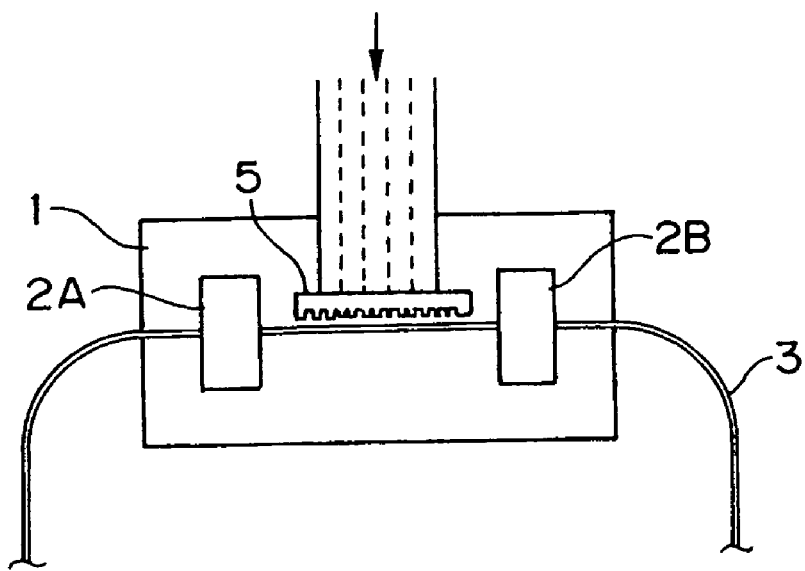
FIG. 5 is a schematic structural diagram showing an example of application of a phase mask method to the optical fiber grating manufacturing apparatus shown in FIG. 4.

In a state in which the optical fiber 3 is held by the fiber clamps 2A, 2B in this manner, when ultraviolet light is then irradiated from a light source (not shown in the figure) via a mask 5, as shown in FIG. 5, a light intensity distribution of a predetermined period occurs beneath the mask 5, and ultraviolet light is irradiated onto the length direction of the optical fiber 3 at a predetermined period, thereby forming at once a plurality of high refractive index sections disposed intermittently at predetermined periods along the length direction of the optical fiber 3. A phase mask is used as the mask 5 when manufacturing an optical fiber grating with a short grating period, that is a grating period of less than 1 µm, and a so-called intensity mask is used when manufacturing an optical fiber grating with a relatively long grating period, that is a grating period greater than 10 µm.

After irradiating ultraviolet light from a single direction onto the side of the optical fiber 3 in this manner, the optical fiber 3 is rotated by 90° in the circumferential direction by the rotation mechanism provided on the fiber clamps 2A, 2B and the operation of irradiating ultraviolet light is repeated in the same manner, irradiating ultraviolet light evenly over the entire circumferential direction of the optical fiber 3, and thereby manufacturing an optical fiber grating.

Figure 6:
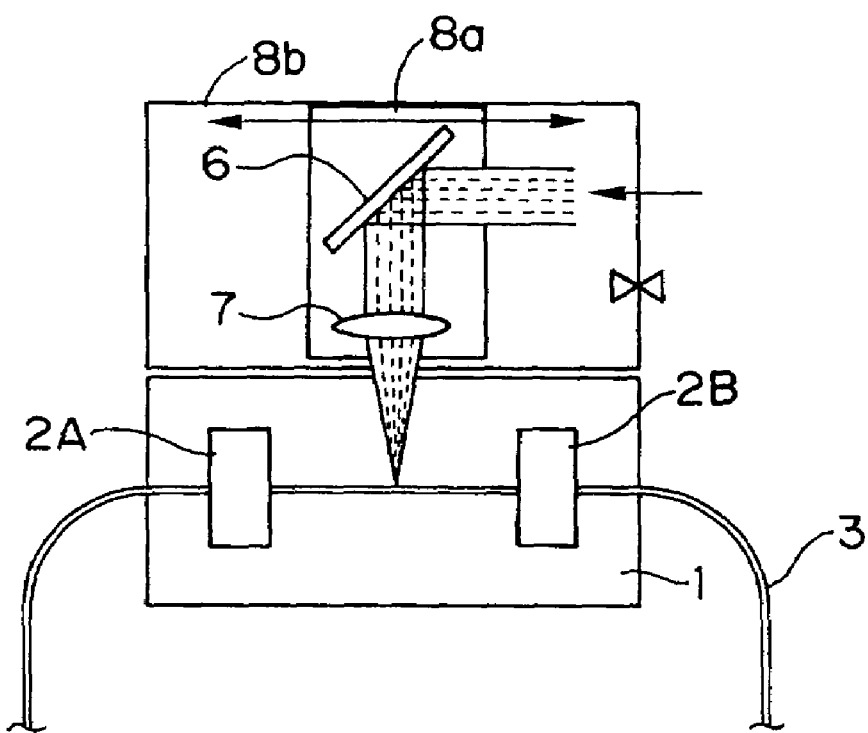
FIG. 6 is a schematic structural diagram showing an example of an optical fiber grating manufacturing apparatus of the present invention.

FIG. 6 shows a manufacturing apparatus for use in a so-called step-by-step method, when the high refractive index sections are formed location by location.

Reference numeral 6 in the diagram indicates a total reflection mirror, and reference numeral 7 indicates a lens. The total reflection mirror 6 and the lens 7 are mounted on a mirror lens stage 8a, and this mirror lens stage 8a is mounted on a moving apparatus 8b.

In this apparatus, the ultraviolet light emitted from the light source (not shown in the figure) is reflected by the total reflection mirror 6, narrowed via the lens 7, and thereby focused onto the optical fiber 3. The optical fiber 3 is then rotated by 90° in the circumferential direction by the rotation mechanism provided on the fiber clamps 2A, 2B and the operation of irradiating ultraviolet light is repeated in the same manner, thereby irradiating ultraviolet light evenly around the circumference of the optical fiber 3.

The mirror lens stage 8a is then moved a predetermined distance along the length direction of the optical fiber 3 by the moving apparatus 8b, and the same operation as above is repeated, thereby manufacturing an optical fiber grating.

Figure 7:
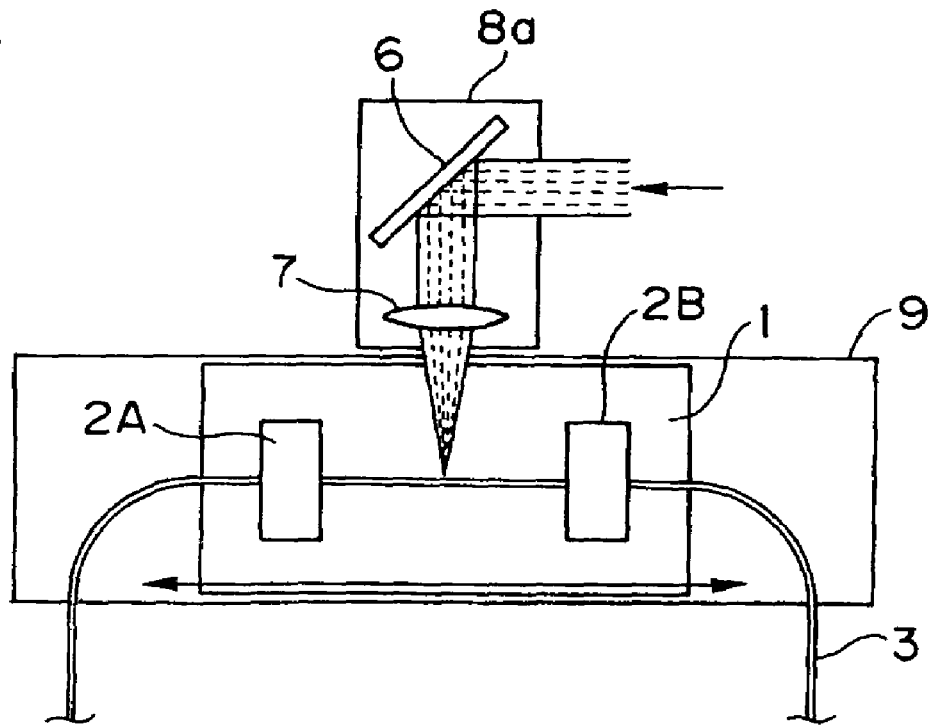
FIG. 7 is a schematic structural diagram showing an example of an optical fiber grating manufacturing apparatus of the present invention.

The manufacturing apparatus shown in FIG. 7 is the same as the manufacturing apparatus shown in FIG. 6, with the exception that instead of moving the mirror lens stage 8a, a moving apparatus 9 is mounted on the exposure stage 1. An optical fiber grating is then manufactured by the same steps as for the apparatus shown in FIG. 6, with the exception that the irradiation position of the light on the optical fiber 3 is varied by moving the exposure stage 1 using the moving apparatus 9, instead of by moving the mirror lens stage 8a.

In the description above, the side of the optical fiber 3 was divided into four equal portions around the circumferential direction thereof, and ultraviolet light was irradiated from four irradiation directions (the exposure directions of the optical fiber 3), but provided that ultraviolet light can be irradiated evenly onto the side of the optical fiber 3, the irradiation directions of the ultraviolet light are not limited to these four directions.

Figure 8:
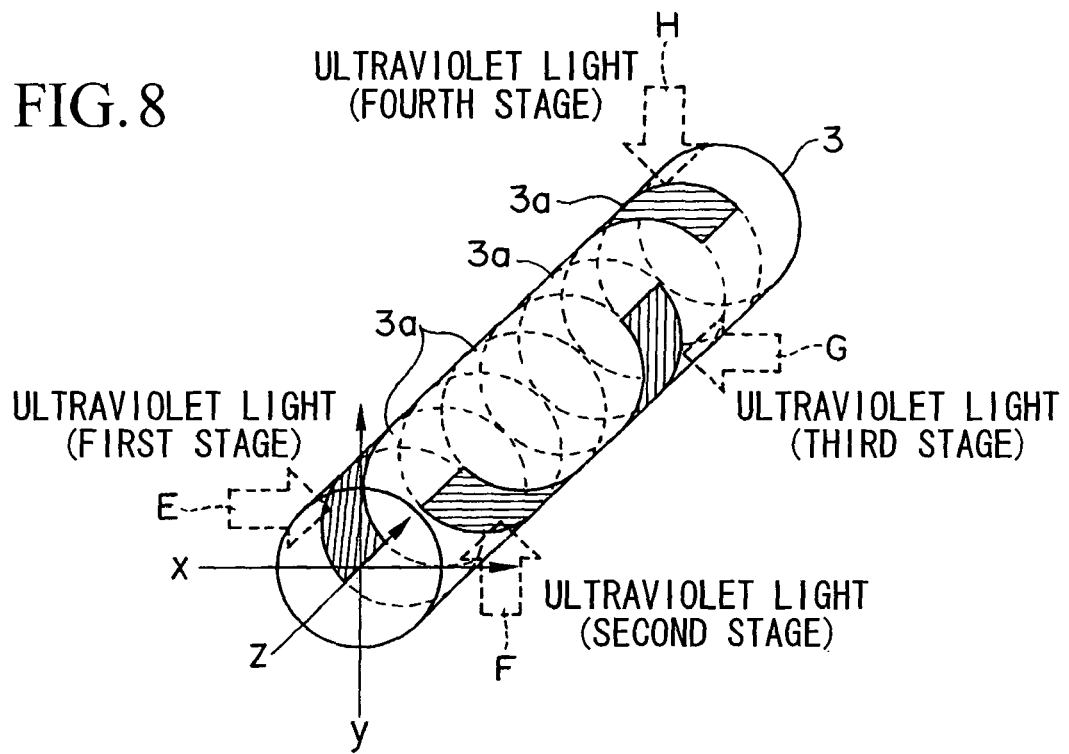
FIG. 8 is a diagram describing an example of an optical fiber grating manufacturing method of the present invention.

Another example of an optical fiber grating manufacturing method of the present invention is shown in FIG. 8.

In this method, the side of the optical fiber 3 is divided into four equal portions around the circumferential direction of the optical fiber 3, ultraviolet light is irradiated onto one of these divided portions from one direction (the E direction) to form a first stage high refractive index section 3a, the irradiation position is then moved along the length direction of the optical fiber 3 according to a predetermined grating period, the irradiation direction is rotated by 90°, and ultraviolet light is irradiated from the F direction to form a second stage high refractive index section.

The irradiation position is then moved again in the same manner, the irradiation direction is changed to the G direction by a 90° rotation, and a third stage high refractive index section 3a is formed, and in the same manner, ultraviolet light is then irradiated from the H direction, to form a fourth stage high refractive index section 3a.

As a result, in the forming of the first stage to the fourth stage high refractive index sections 3a, ultraviolet light is irradiated onto the optical fiber 3 around the whole circumference of the optical fiber 3, and the refractive index bias and birefringence in the cross-section of the optical fiber 3 within each of the first through fourth stage high refractive index sections 3a mutually cancel each other out, and deterioration in PDL can be prevented.

In this case, when the operation wherein four high refractive index sections 3a are formed by irradiating ultraviolet light onto the optical fiber 3 from four directions is deemed one period, this period is repeated until a predetermined grating length is obtained, thereby manufacturing an optical fiber grating. The number of irradiation directions of the ultraviolet light is not limited to this number, provided that the objects of the present invention can be achieved.

The apparatuses shown in FIG. 6 and FIG. 7, for example, are suitable for use in this method. In other words, after forming the first stage high refractive index section 3a, the irradiation position of the ultraviolet light is moved along the length direction of the optical fiber 3 and is rotated with a predetermined angle in the circumferential direction of the optical fiber 3, whereupon ultraviolet light is irradiated to form the next stage high refractive index section 3a. The grating section can be formed by repeating such an operation.

Figure 9:
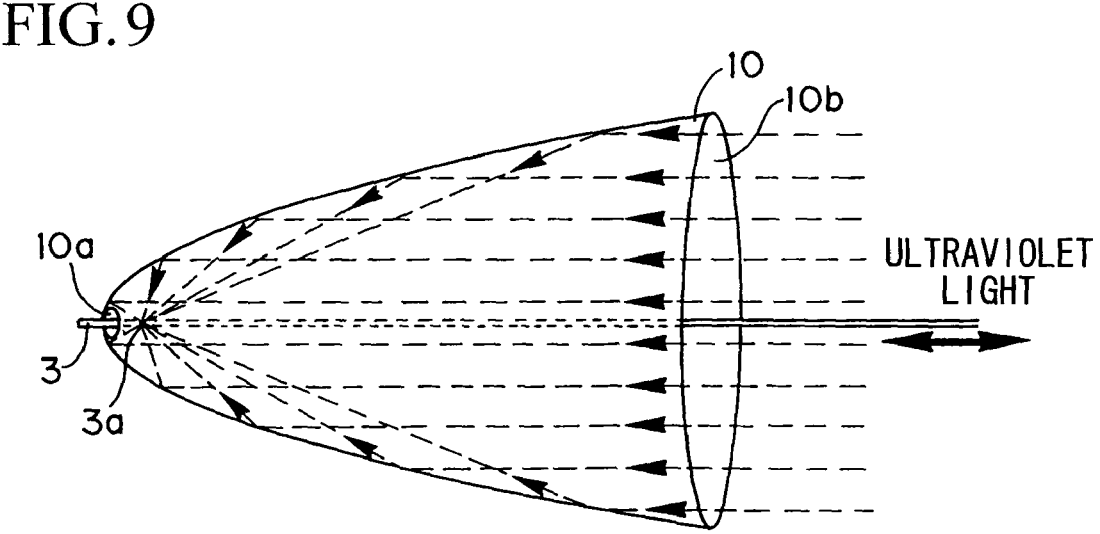
FIG. 9 is a diagram describing an example of an optical fiber grating manufacturing method of the present invention.

FIG. 9 shows another example of an optical fiber grating manufacturing method of the present invention, and reference numeral 10 in the diagram indicates a parabolic mirror. The parabolic mirror 10 is in the form of a hollow dome with a hole 10a in the bottom (apex), and the inside surface thereof is a mirrored surface.

In this example, the optical fiber 3 is inserted into the hole 10a so that the optical fiber 3 is positioned upon the center axis of the hollow section of the parabolic mirror 10. When ultraviolet light is then irradiated from an opening 10b of the parabolic mirror 10, the ultraviolet light is reflected by the mirrored surface within the parabolic mirror 10, and focused onto the entire side of the optical fiber 3, thereby forming one high refractive index section 3a. At least one of the optical fiber 3 or the parabolic mirror 10 is then moved along the length direction of the optical fiber 3 according to a predetermined grating period, and the same operation is then repeated to manufacture the optical fiber grating.

In this case, it is possible to manufacture an optical fiber grating using an optical fiber grating manufacturing apparatus comprising a parabolic mirror 10, a light source which irradiates light onto the mirror surface of the parabolic mirror 10, a holding device (not shown in the figure) which holds the optical fiber 3 in position inside this parabolic mirror 10, and a moving device (not shown in the figure) which moves at least one of the parabolic mirror 10 and the holding device in the length direction of the optical fiber 3, for example. Accordingly, it is not necessary to provide a rotation mechanism on the holding device.

Figure 10A:
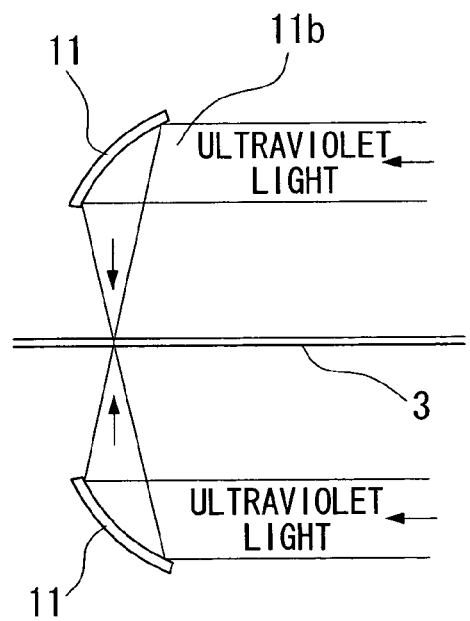
FIG. 10A is a diagram for describing an example of an optical fiber grating manufacturing method of the present invention, showing a view from a direction perpendicular to the longitudinal direction of the optical fiber.
Figure 10B:
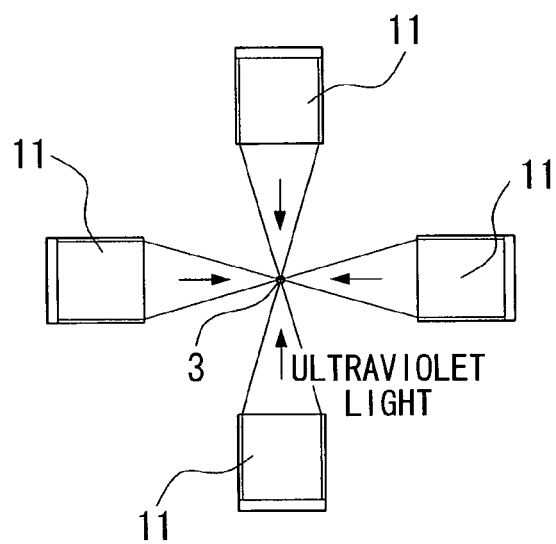
FIG. 10B is a diagram showing the apparatus shown in FIG. 10A viewed from the cross-section side of the optical fiber.

FIG. 10A and FIG. 10B show another example of an optical fiber grating manufacturing method of the present invention, where FIG. 10A is a view from a direction perpendicular to the longitudinal direction of the optical fiber and FIG. 10B is a view of the apparatus shown in FIG. 10A from the optical fiber cross-section side. In these diagrams, reference numeral 11 indicates a concave reflecting mirror. The surfaces of the concave reflecting mirrors 11 which face the optical fiber are mirrored surfaces, and a plurality of the concave reflecting mirrors 11 are arranged so as to have a common focal point.

In this example, the optical fiber 3 is placed in the focal position of the concave reflecting mirrors 11. When ultraviolet light is irradiated from openings 11b of the concave reflecting mirrors 11, the ultraviolet light is reflected from the mirrored surfaces of the concave reflecting mirrors 11, and focused onto the side of the optical fiber 3, and as a result, one high refractive index section 3a is formed. Subsequently, at least one of the optical fiber 3 or the concave reflecting mirror 11 is moved along the longitudinal direction of the optical fiber 3 according to a predetermined grating period, and the same operation is then repeated to manufacture the optical fiber grating.

In this example, it is possible to manufacture an optical fiber grating using an optical fiber grating manufacturing apparatus comprising a concave reflecting mirror 11, a light source which irradiates light onto the mirrored surface of the concave reflecting mirror 11, a holding device (not shown in the figure) which holds the optical fiber 3 in position at the focal point of the concave reflecting mirror 11, and a moving device (not shown in the figure) which moves at least one of the concave reflecting mirror 11 and the holding device along the longitudinal direction of the optical fiber 3, for example. Accordingly, it is not necessary to provide a rotation mechanism for the holding device. Furthermore, the number of concave reflecting mirrors 11 is not limited to the number in the example, provided that the objects of the present invention can be achieved. Moreover, the concave reflecting mirrors 11 may be concave cylindrical mirrors, as long as the ultraviolet light is focused onto the side of the optical fiber 3.

Figure 11A:
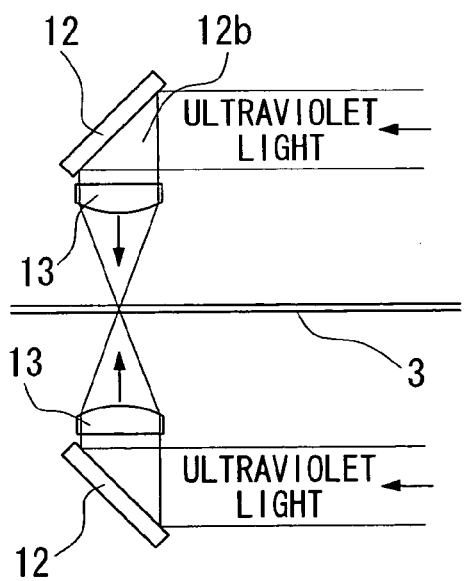
FIG. 11A is a diagram for describing an example of an optical fiber grating manufacturing method of the present invention, showing a view from a direction perpendicular to the longitudinal direction of the optical fiber.
Figure 11B:
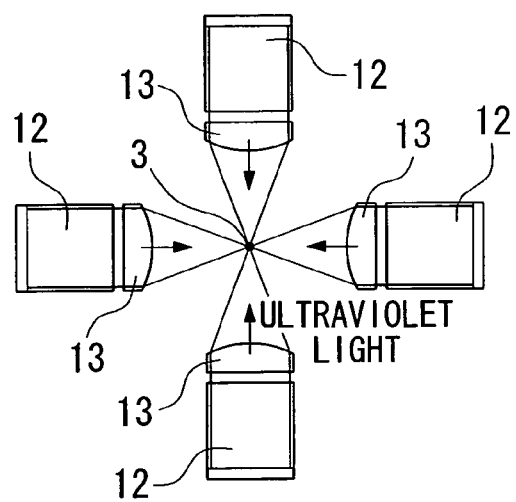
FIG. 11B is a diagram showing the apparatus shown in FIG. 11A viewed from the cross-section side of the optical fiber.

FIG. 11A and FIG. 11B show another example of an optical fiber grating manufacturing method of the present invention, where FIG. 11A is a view from a direction perpendicular to the longitudinal direction of the optical fiber and FIG. 11B is a view of the apparatus shown in FIG. 11A from the optical fiber cross-section side. In these diagrams, reference numeral 12 indicates a reflecting mirror and reference numeral 13 indicates a convex lens. The surfaces of the reflecting mirrors 12 which face the optical fiber are mirrored surfaces, and a plurality of the reflecting mirrors 12 and the convex lenses 13 are arranged so as to have a common focal point.

In this example, the optical fiber 3 is placed in the focal position of the convex lenses 13. When ultraviolet light is irradiated from openings 12b of the reflecting mirrors 12, the ultraviolet light is reflected from the mirrored surfaces of the reflecting mirrors 12, and focused onto the side of the optical fiber 3 by the convex lenses 13, to form one high refractive index section 3a. Subsequently, at least one of the optical fiber 3 or the reflecting mirrors 12 and convex lenses 13 is moved along the longitudinal direction of the optical fiber 3 according to the predetermined grating period, and the same operation is then repeated to manufacture the optical fiber grating.

In this example, as above, it is possible to manufacture an optical fiber grating using an optical fiber grating manufacturing apparatus comprising reflecting mirrors 12, a light source which irradiates light onto the mirrored surfaces of the reflecting mirrors 12, a holding device (not shown in the figure) which holds the optical fiber 3 in position at the focal point of the convex lenses 13, and a moving device (not shown in the figure) which moves at least one of the reflecting mirrors 12 and the holding device along the longitudinal direction of the optical fiber 3, for example. Accordingly, it is not necessary to provide a rotation mechanism for the holding device. Furthermore, the number of reflecting mirrors 12 is not limited to the number in the example, provided that the objects of the present invention can be achieved. Furthermore, the convex lenses 13 may be convex cylindrical lenses, provided that the ultraviolet light is focused on the side of the optical fiber 3.

As described above, in the present invention, because it is possible to control the refractive index distribution which occurs in the cross-section of the optical fiber caused by the irradiation intensity of the light, and the birefringence of the optical fiber which occurs due to the polarization of the light, PDL deterioration in the manufacturing process can be prevented. As a result, it is possible to provide a manufacturing method and a manufacturing apparatus for an optical fiber grating with a small PDL value, and in which there is little variation in PDL across optical fiber gratings when a plurality of optical fiber gratings are manufactured.

Embodiment 2

Figure 12:
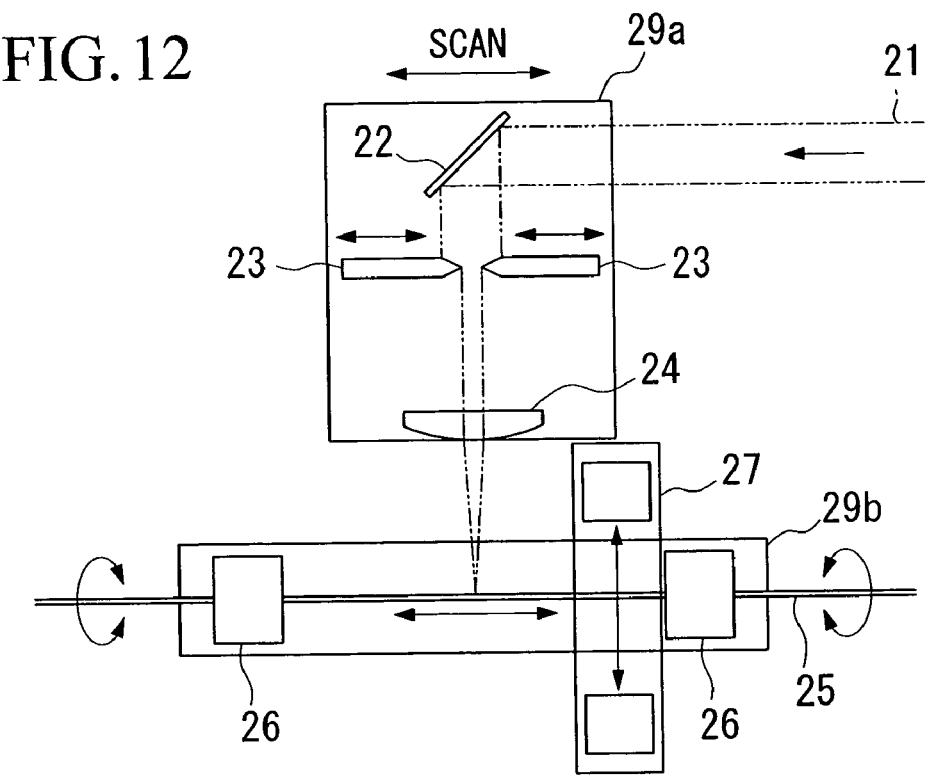
FIG. 12 is a diagram showing an example of an optical fiber grating manufacturing apparatus of the present invention.

FIG. 12 shows an example of an optical fiber grating manufacturing apparatus of the present invention.

This optical fiber grating manufacturing apparatus comprises a device which measures the outer diameter of the optical fiber, and a device which rotates the, optical fiber about an axis thereof, and as a result, it is possible to expose the optical fiber in such a manner that the birefringence caused by the makeup of the optical fiber itself, and the birefringence caused by the exposure, cancel each other out.

In FIG. 12, reference numeral 21 indicates the ultraviolet light emitted from a light source. This ultraviolet light 21 is reflected by a mirror 22, changing its traveling direction, and after being narrowed by a slit 23, is focused by a lens 24. The width of the slit 23 is variable, and the beam diameter of the ultraviolet light can be changed by changing the width of the slit according to need. Reference numeral 25 indicates the optical fiber used as the material for the optical fiber grating. This optical fiber 25 is held by an optical fiber clamp 26. The optical fiber clamp 26 comprises a rotation mechanism, and the ultraviolet light 21 is irradiated onto the optical fiber 25 while the optical fiber 25 is rotated by the optical fiber clamp 26. Reference numeral 27 indicates an optical fiber outer diameter measurement device which measures the outer diameter of the optical fiber 25. A laser diameter measurement device can be used as the optical fiber outer diameter measurement device 27, for example. Reference numeral 29a indicates a movable stage on which the mirror 22 is mounted, and reference numeral 29b indicates a movable stage on which the optical fiber clamp 26 is mounted.

Using this optical fiber grating manufacturing apparatus, an optical fiber grating is manufactured by the following method.

While monitoring on-line the outer diameter of the optical fiber 25 measured by the optical fiber outer diameter measurement device 27, the optical fiber clamp 26 is rotated, thereby rotating the optical fiber 25 about its axis. In this manner, by rotating the optical fiber 25 to an appropriate orientation based on the measured value of the outer diameter of the optical fiber 25, and irradiating ultraviolet light 21 from the side of the optical fiber 25, it is possible for exposure to be performed so that the birefringence caused by the makeup of the optical fiber 25 itself and the birefringence caused by the exposure cancel each other out.

In this example, the optical fiber 25 is exposed by a step-by-step method, in which the optical fiber 25 is exposed directly by the ultraviolet light beam focused by the lens 24. The fiber grating length (grating period×number of steps) can be determined by the amount of movement and the number of movement repetitions of the movable stage 29a on which the mirrors are mounted, and by repeating exposure and stage movement, an optical fiber grating with the desired parameters can be formed.

The principle how it becomes possible to perform exposure in such a manner that the birefringence caused by the makeup of the optical fiber itself and the birefringence caused by the exposure cancel each other out, using an exposure apparatus shown in FIG. 12 comprising a device which measures the outer diameter of the optical fiber and a device which rotates the optical fiber about an axis thereof, are explained below.

An object of the present invention is to realize an exposure method in which the content of the right parentheses in equation (10) can be made as close to zero as possible, by knowing the orientation of the birefringence of the optical fiber. First, the birefringence of the optical fiber is considered.

A normal optical fiber (single mode fiber) is different from polarization maintaining fiber, in that PMD and the birefringence of the fiber occurs because of slight ovality of the core, that is because the core deviates from perfect circularity and is elliptical.

In this case, the causes of birefringence in a slightly elliptical core are first that the effective refractive index differs for each polarization because the physical shape differs slightly for each polarization, and second that due to the core shape deviating from perfect circularity, the residual stress in the vicinity of the core in the optical fiber occurs non-axisymmetrically, generating birefringence due to a photoelastic effect. However it is expected that the question as to which of these causes is predominant differs depending on the degree of ovality, and the composition of the core and the cladding, that is, the amount of thermal strain introduced during the manufacture of the optical fiber.

However, the difference in the effective refractive index between polarization having an electric field parallel to the major axis of the core and polarization having an electric field parallel to the minor axis of the core, that is the birefringence, is regarded to be at a maximum when the core is seen to be substantially elliptical.

Here, the deformation of the core is considered. In most single mode fibers, the core diameter is approximately 10 μm at most, or smaller. Furthermore, the ovality of the core can be assumed to normally be about 0.1%, and even in cases of high ovality, is within 0.5%, and at a maximum, is within 1%. This core ovality amounts to a difference between the diameters of the major and minor axes of the core within a range from 0.05 μm, that is 50 nm (when the core ovality is 0.5%) to 1.0 μm, that is 100 nm (when the core ovality is 1.0%), and is very difficult to determine optically from outside the optical fiber.

However, considering the manufacturing conditions of the optical fiber, it is natural to assume that in the fiber forming process the core and the cladding of the optical fiber are deformed in approximately the same direction, and by measuring the ovality of the cladding, it is possible to estimate the direction of the ovality of the core. In other words, in an optical fiber with an outer diameter (cladding diameter) of 125 μm, the variation amount in the outer diameter (cladding diameter) when the ovality of the core is 0.1%, 0.5% and 1.0% is 0.125 μm, 0.625 μm and 1.25 μm, respectively, which are values which can be satisfactorily examined optically.

Potential methods for measuring directly the outer diameter of a fiber include the use of a laser interferometry outer diameter measuring device, for example. In other words, it is possible to determine the direction where the outer diameter of the optical fiber is the largest, and the direction where the outer diameter is the smallest, using the optical fiber outer diameter measurement device 27, and rotating the optical fiber about a direction parallel to the axis of the optical fiber.

When the directions for which the outer diameter of the optical fiber is at a maximum and a minimum are determined by the optical fiber outer diameter measurement device 27, and ultraviolet light is irradiated from the respective directions to form the grating, the orientations of the birefringence of the fiber itself and the birefringence caused by the exposure are considered in one case to add to each other, and in another case to cancel each other out.

Figure 13A:
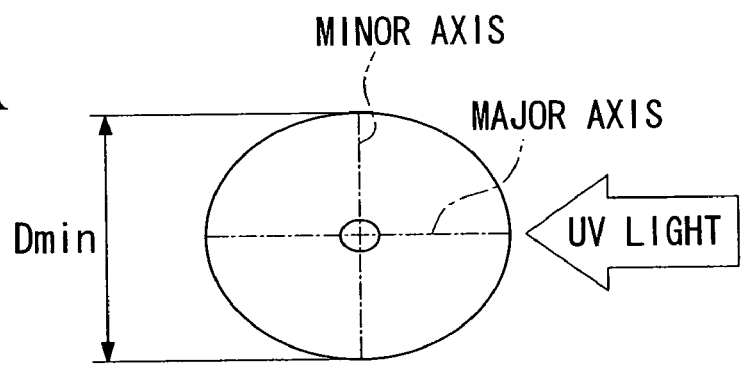
FIG. 13A is a diagram showing the irradiation of ultraviolet light from the major axis direction of the optical fiber cross-section.
Figure 13B:
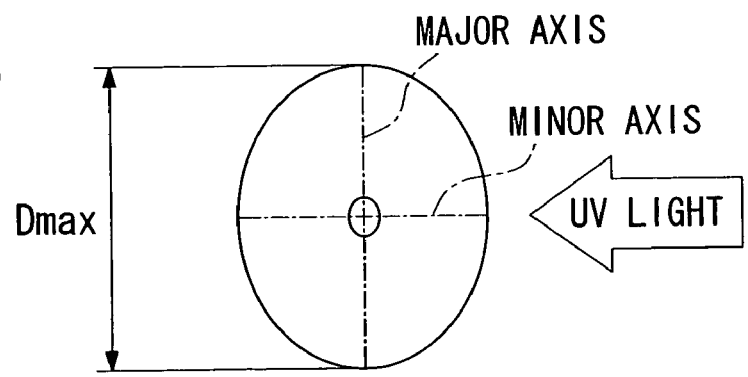
FIG. 13B is a diagram showing the irradiation of ultraviolet light from the minor axis direction of the optical fiber cross-section.

FIG. 13A shows a case in which ultraviolet light is irradiated from the major axis direction of the optical fiber cross-section, and FIG. 13B shows a case in which ultraviolet light is irradiated from the minor axis direction of the optical fiber cross-section. In these diagrams, $D_{min}$ is the minimum value of the optical fiber outer diameter, and $D_{max}$ is the maximum value of the optical fiber outer diameter.

As described above, although it is generally not possible to determine whether the effective refractive index is greater for a guided wave which has an electric field parallel to the major axis or for a guided wave which has an electric field parallel to the minor axis, it is natural to assume that the polarization having the maximum effective refractive index and the polarization having the minimum effective refractive index are each one of these cases.

An optical fiber grating was manufactured using the optical fiber grating manufacturing apparatus shown in FIG. 12, so that the birefringence of the fiber itself and the birefringence caused by the exposure, as described above, cancel each other out.

Here, testing was performed using an optical fiber with large PMD (approximately 10 fs/m) so that the effects of the present invention can be easily seen. The outer diameter of this optical fiber was 123.1±0.34 μm, which includes both diameter differences introduced by the orientation of the optical fiber and the differences between each sample. The outer diameter distribution across the samples displayed a difference of approximately 0.3 μm between the maximum value and the minimum value, and the ovality of the outer diameter was approximately 0.25%.

The state of the ovality of the optical fiber was elliptical to within the error of measurement. The parameters during the manufacture of the optical fiber grating are shown in table 1.

TABLE 1

| Grating Number | Grating Period (μm) | Number of Gratings |
|---|---|---|
| No. 1 (FIG. 14) | 243 | 45 |
| No. 2 (FIG. 15) | 242 | 45 |
| No. 3 (FIG. 16) | 242 | 45 |
| No. 4 (FIG. 17) | 242 | 45 |
| No. 5 (FIG. 18) | 242 | 45 |
| No. 6 (FIG. 19) | 238 | 45 |

Furthermore, in order to investigate the relationship between the orientations of the birefringence of the optical fiber and the birefringence introduced by exposure, ultraviolet light was irradiated from both a direction parallel to the major axis of the optical fiber cross-section, and a direction perpendicular to this direction, that is a direction parallel to the minor axis, to manufacture a LPFG. A KrF excimer laser was used as the ultraviolet light source.

Figure 14:
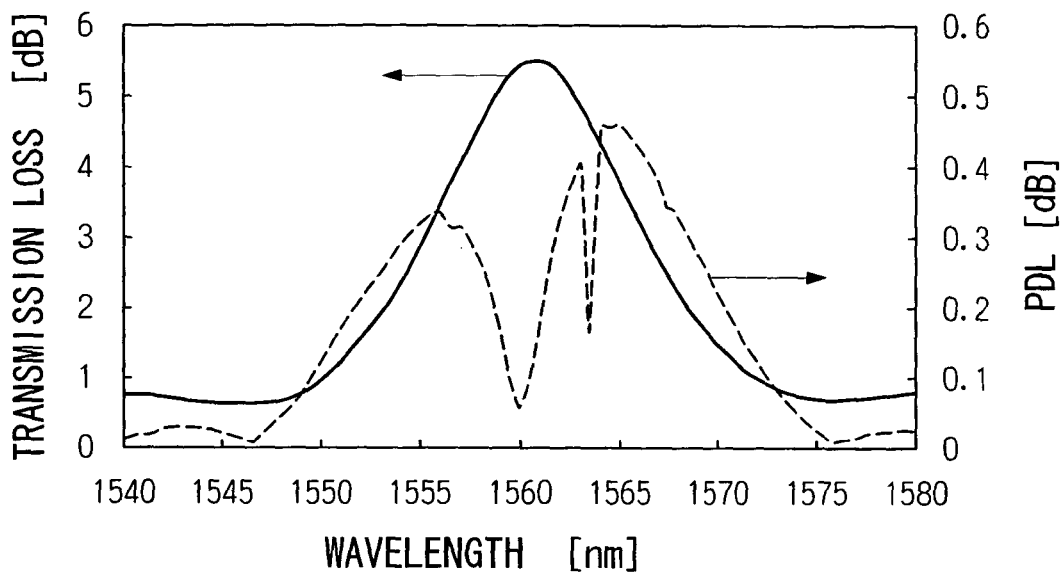
FIG. 14 is a diagram showing an example of the transmission loss and PDL of an optical fiber grating manufactured by performing exposure from a direction parallel to the major axis of the optical fiber cross-section.
Figure 15:
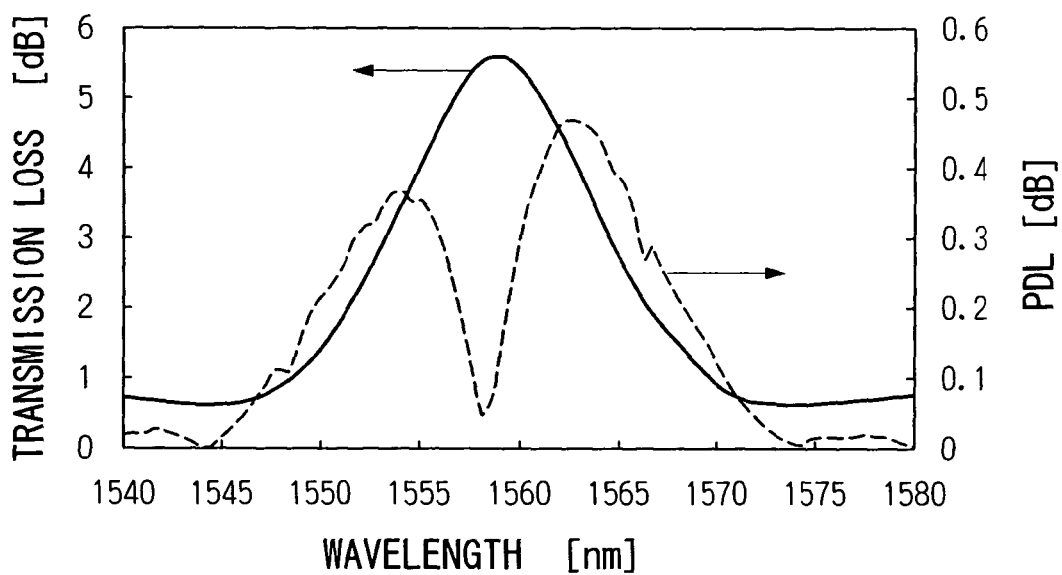
FIG. 15 is a diagram showing an example of the transmission loss and PDL of an optical fiber grating manufactured by performing exposure from a direction parallel to the major axis of the optical fiber cross-section.
Figure 16:
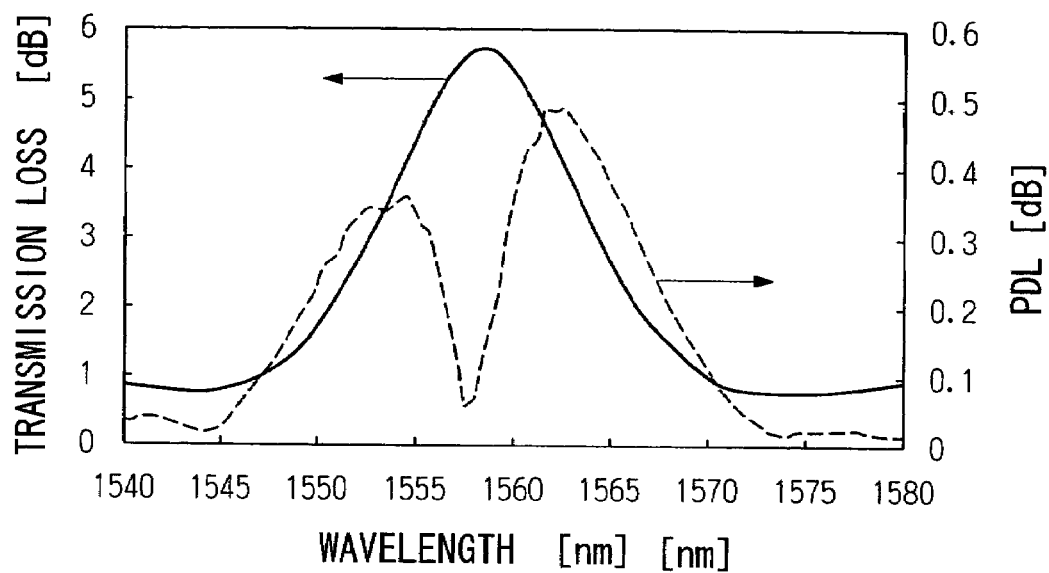
FIG. 16 is a diagram showing an example of the transmission loss and PDL of an optical fiber grating manufactured by performing exposure from a direction parallel to the major axis of the optical fiber cross-section.
Figure 17:
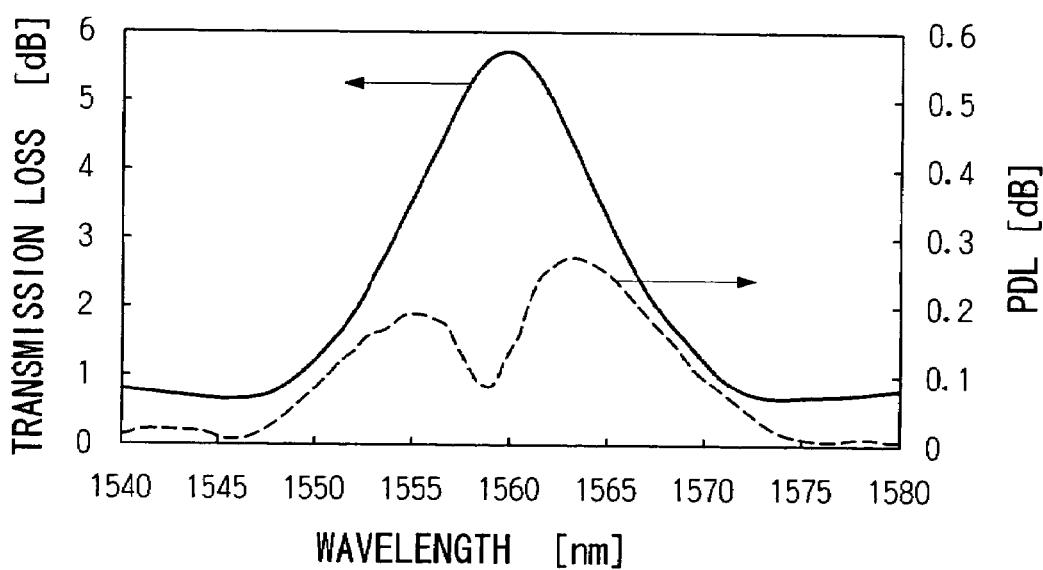
FIG. 17 is a diagram showing an example of the transmission loss and PDL of an optical fiber grating manufactured by performing exposure from a direction perpendicular to the major axis of the optical fiber cross-section.
Figure 18:
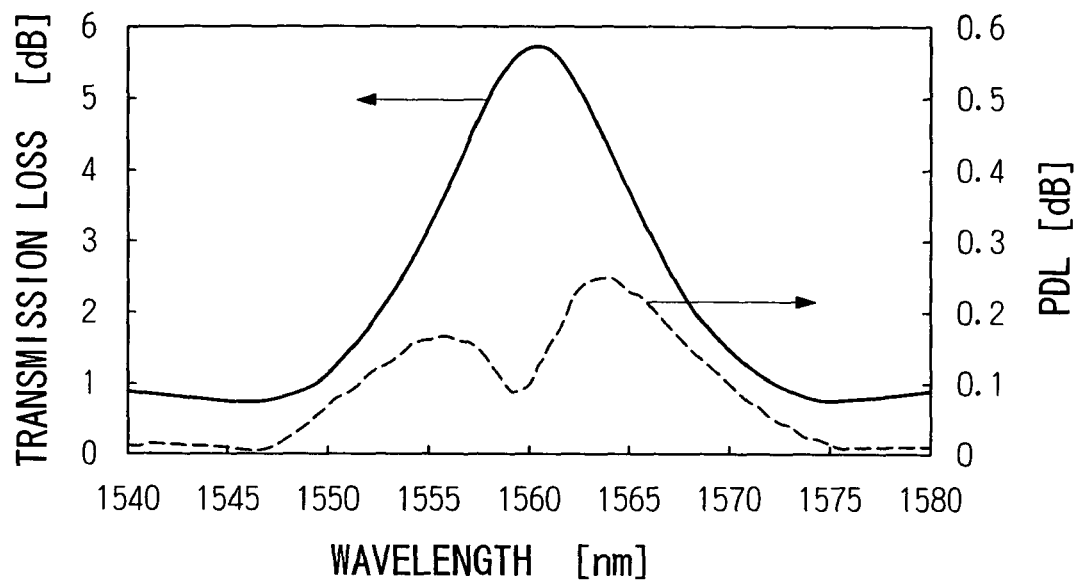
FIG. 18 is a diagram showing an example of the transmission loss and PDL of an optical fiber grating manufactured by performing exposure from a direction perpendicular to the major axis of the optical fiber cross-section.
Figure 19:
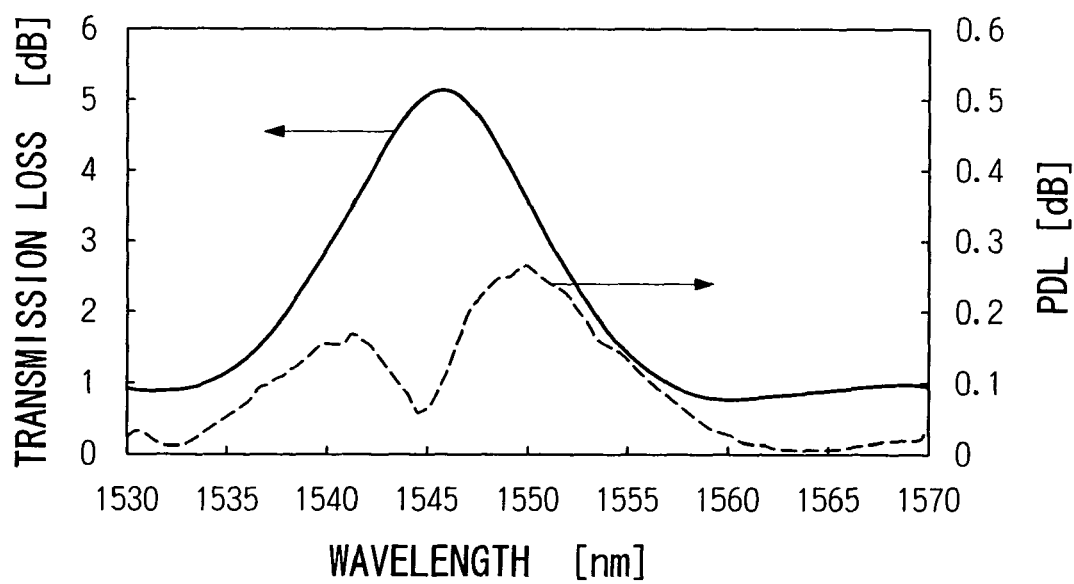
FIG. 19 is a diagram showing an example of the transmission loss and PDL of an optical fiber grating manufactured by performing exposure from a direction perpendicular to the major axis of the optical fiber cross-section.

The transmission spectrum and PDL of an LPFG manufactured by performing exposure by ultraviolet light from a direction parallel to the major axis of the optical fiber cross-section (the direction shown in FIG. 13A) are shown in FIG. 14 through FIG. 16. Furthermore, the transmission spectrum and PDL of an LPFG manufactured by performing exposure by ultraviolet light from a direction perpendicular to the major axis of the optical fiber cross-section (from the direction shown in FIG. 13B) are shown in FIG. 17 through FIG. 19.

The maximum PDL value of an LPFG manufactured by performing exposure with ultraviolet light from a direction parallel to the major axis was from 0.46 to 0.49 dB. On the other hand, the maximum PDL value of an LPFG manufactured by performing exposure with ultraviolet light from a direction perpendicular to the major axis was from 0.24 to 0.27 dB. There is obviously a difference between the maximum PDL values between these LPFGs, and in the case of this optical fiber, it is apparent that PDL can be reduced in a case where exposure is performed from a direction perpendicular to the major axis (the direction shown in FIG. 13B), in comparison with a case where exposure is performed from a direction parallel to the major axis (the direction shown in FIG. 13A).

The relationship between the birefringence of the optical fiber and the orientation of the physical deformation of the optical fiber, that is, the relationship between the orientation of the polarization at which the effective refractive index is at a maximum or a minimum, and the major axis and the minor axis of the ovality differs depending on the optical fiber. However, because the PDL of the optical fiber grating can be reduced when exposure is performed from a direction parallel to at least one of either the major axis or the minor axis of the ovality, then determining the direction of the exposure by rotating the optical fiber to a suitable orientation while monitoring the outer diameter of the optical fiber is an effective way to reduce birefringence.

In FIG. 12, the optical fiber is rotated by rotating the optical fiber clamp 26 around the axis of the optical fiber 25 in order to change the exposure direction, but the method of changing the irradiation direction of the ultraviolet light is not limited to this method, and the exposure direction may be changed by rotating the mirror or the mirror and the condensing lens which irradiate ultraviolet light onto the optical fiber, about the circumference of the optical fiber.

Furthermore, in the above example, an apparatus which performs step-by-step exposure by scanning a mirror was used as the device for performing the exposure, but the apparatus used for this purpose is not limited to such a device. Other examples are described below.

Figure 20:
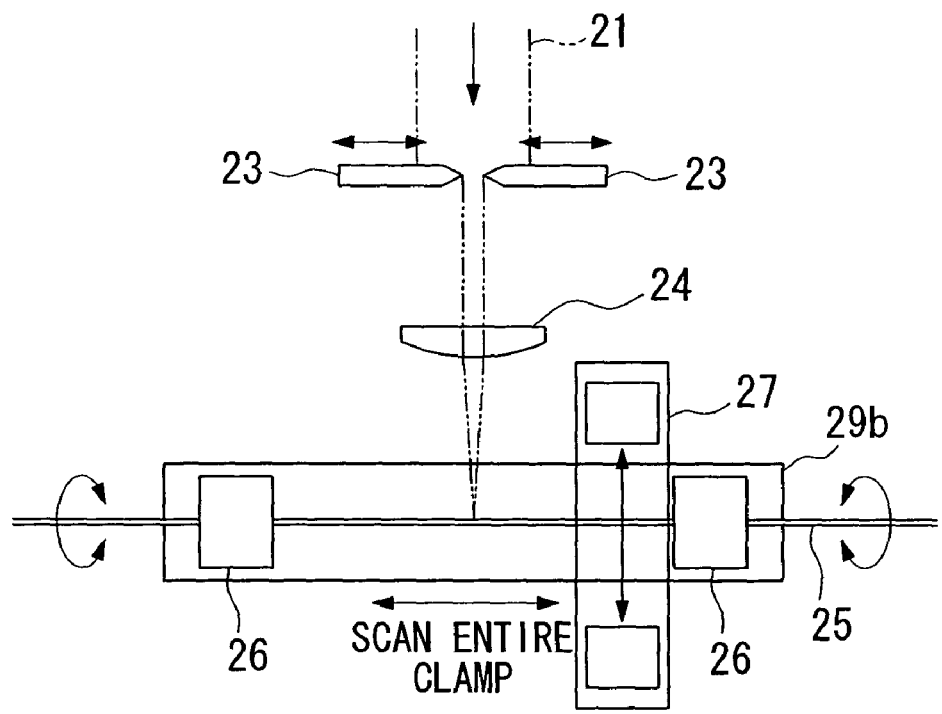
FIG. 20 is a diagram showing an example of an optical fiber grating manufacturing apparatus of the present invention.

FIG. 20 shows another example of an optical fiber grating manufacturing apparatus of the present invention.

In FIG. 20, those members which are the same as in the example shown in FIG. 12 are given the same reference numerals. In the example in FIG. 12, ultraviolet light was irradiated onto the optical fiber 25 by scanning the mirror 22, but this example differs from the example shown in FIG. 12 in that the entire optical fiber clamp 26 to which the optical fiber 25 is held performs a scanning movement, thereby moving the position of the focal point of the ultraviolet light 21 relative to the longitudinal direction of the optical fiber 25.

In this example, as for the previous example, while monitoring on-line the outer diameter of the optical fiber 25 measured by the optical fiber outer diameter measurement device 27, the optical fiber clamp 26 is rotated, thereby rotating the optical fiber 25 about its axis. In this manner, by rotating the optical fiber 25 to an appropriate orientation based on the measured value of the outer diameter of the optical fiber 25, and irradiating ultraviolet light 21 from the side of the optical fiber 25, it is possible for exposure to be performed so that the birefringence caused by the makeup of the optical fiber 25 itself and the birefringence caused by the exposure cancel each other out.

The fiber grating length (grating period×number of steps) can be determined by the amount of movement and the number of movement repetitions of the movable stage 29b on which the optical fiber clamp 26 is mounted, and by repeating exposure and stage movement, an optical fiber grating with the desired parameters can be formed.

Figure 21:
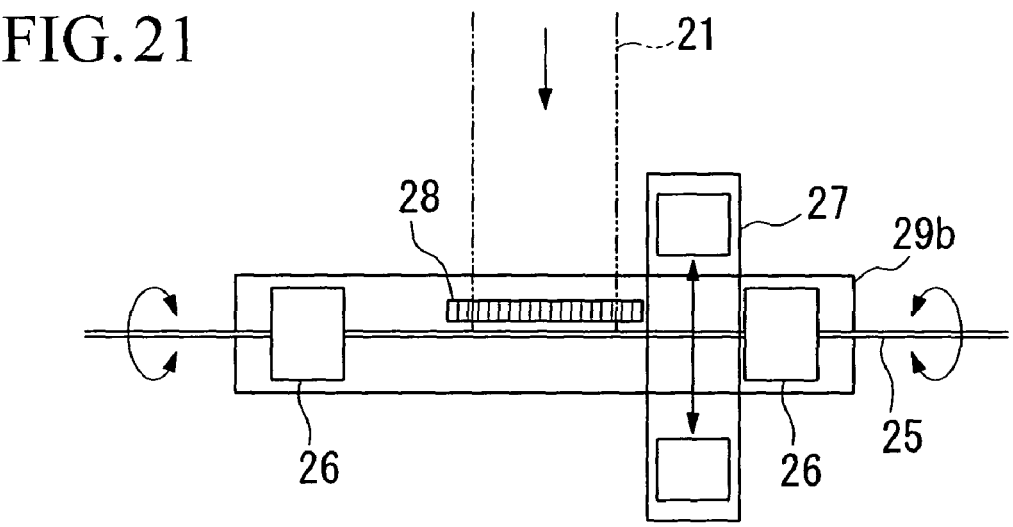
FIG. 21 is a diagram showing an example of an optical fiber grating manufacturing apparatus of the present invention.

FIG. 21 shows yet another example of an optical fiber grating manufacturing apparatus of the present invention.

In this example also, the same reference numerals are used to indicate those members which are the same as in the example shown in FIG. 12. In this example, an intensity mask 28 is provided between the ultraviolet light source and the optical fiber 25, and the ultraviolet light 21 is irradiated onto the optical fiber 25 through the intensity mask 28. This intensity mask 28 is such that a section which blocks light is formed in the shape of a slit within one portion of a transparent body, and by irradiating the ultraviolet light 21 onto the optical fiber 25 via the intensity mask 28, periodic high refractive sections can be formed on the optical fiber 25.

The outer diameter of the optical fiber 25 is measured by the optical fiber outer diameter measurement device 27, and while monitoring this outer diameter on-line, the optical fiber clamp 26 is rotated, thereby rotating the optical fiber 25 about its axis. In this manner, by rotating the optical fiber 25 to an appropriate orientation based on the measured value of the optical fiber outer diameter, and irradiating ultraviolet light 21 which has passed through the intensity mask 28 from the side of the optical fiber 25, exposure can be performed so that the birefringence caused by the makeup of the optical fiber itself and the birefringence caused by the exposure cancel each other out.

In this example, a phase mask may also be used instead of the intensity mask 28. This phase mask is a transmission diffraction grating formed generally from a transparent body, which by causing interference between two orders of diffracted light, +1 and −1, causes spatial modulation of the optical intensity, either evenly spaced or unevenly spaced in the form of chirp or the like, for example. By irradiating ultraviolet light which has been modulated in this manner onto the optical fiber, evenly spaced or unevenly spaced refractive index modulation can be introduced into the optical fiber.

Figure 22:
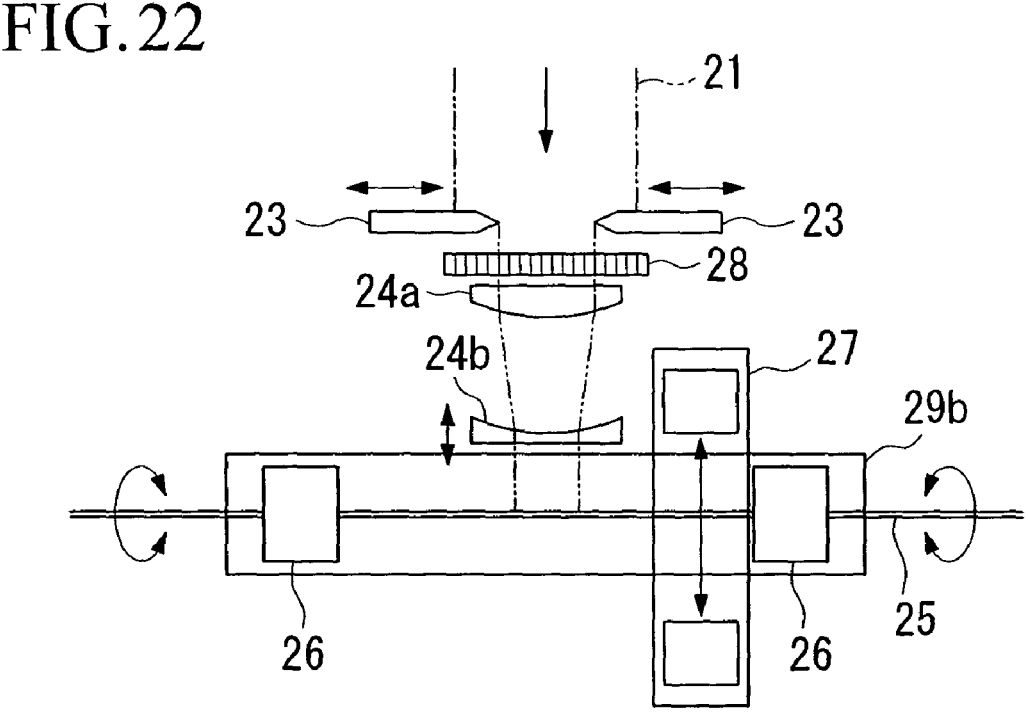
FIG. 22 is a diagram showing an example of an optical fiber grating manufacturing apparatus of the present invention.

FIG. 22 shows yet another example of an optical fiber grating manufacturing apparatus of the present invention.

In this example also, the same reference numerals are used to indicate those members which are the same as in the example shown in FIG. 12. In this example, cylindrical lenses 24a and 24b are provided between the intensity mask 28 and the optical fiber 25. Of these, 24a is a convex lens, and 24b is a convex lens. In this manner, by irradiating the ultraviolet light 21 through the intensity mask which has either a constant period or an unevenly spaced period, and the convex lens 24a and the concave lens 24b, optical fiber gratings with various grating periods can be manufactured.

Figure 23:
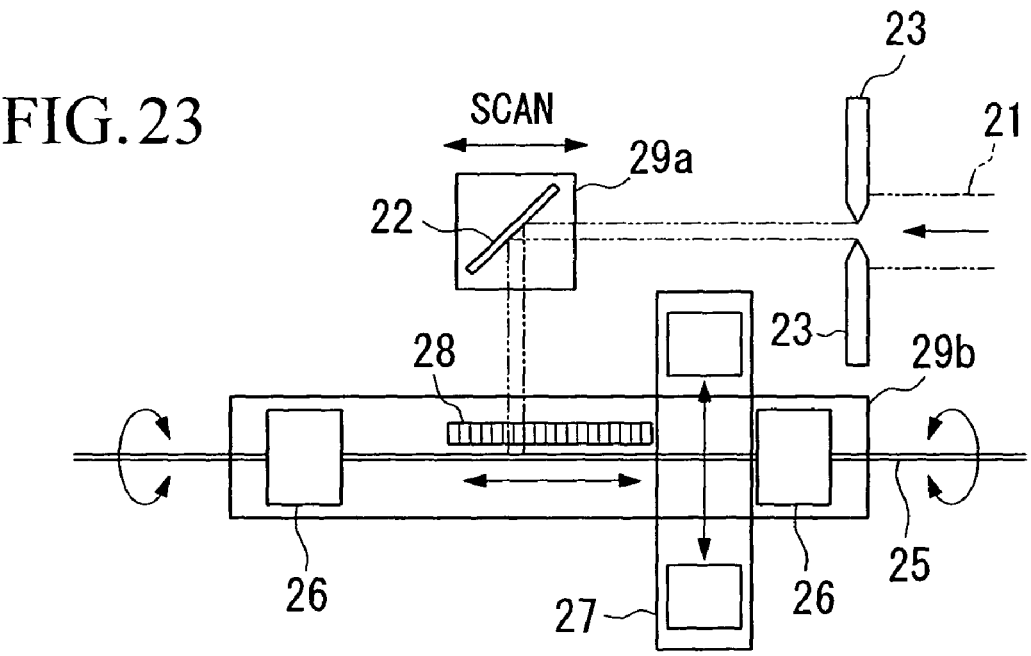
FIG. 23 is a diagram showing an example of an optical fiber grating manufacturing apparatus of the present invention.

FIG. 23 shows yet another example of an optical fiber grating manufacturing apparatus of the present invention.

This apparatus differs from the apparatus shown in FIG. 21 in which uniform ultraviolet light 21 is irradiated through the intensity mask 28, in that an ultraviolet light beam narrowed by means of a slit 23 is irradiated through the intensity mask 28.

In this example also, the same reference numerals are used to indicate those members which are the same as in the example shown in FIG. 12. In this example, the ultraviolet light beam which is irradiated through the intensity mask 28 is irradiated onto the optical fiber 25 while scanning the movable stage 29a or the movable stage 29b, thereby manufacturing an optical fiber grating.

In this example also, a phase mask may be used instead of an intensity mask.

Figure 24:
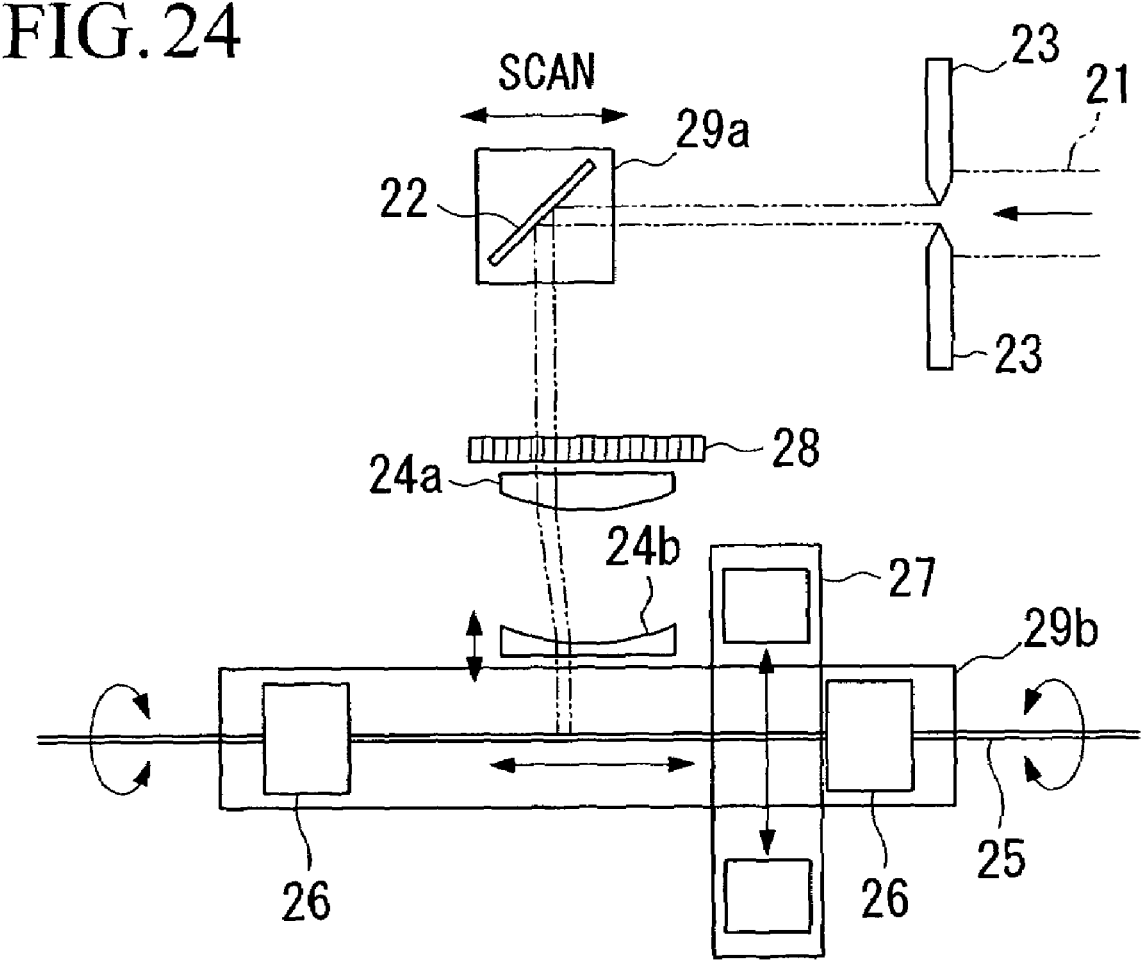
FIG. 24 is a diagram showing an example of an optical fiber grating manufacturing apparatus of the present invention.

FIG. 24 shows yet another example of an optical fiber grating manufacturing apparatus of the present invention.

This apparatus differs from the apparatus shown in FIG. 22 in which uniform ultraviolet light 21 is irradiated through the intensity mask 28, in that an ultraviolet light beam narrowed by means of a slit 23 is irradiated through the intensity mask 28.

In this example also, the same reference numerals are used to indicate those members which are the same as in the example shown in FIG. 12. In this example, the ultraviolet light beam which is irradiated through the intensity mask 28, the convex lens 24a and the concave lens 24b is irradiated onto the optical fiber 25 while scanning the movable stage 29a or the movable stage 29b, thereby manufacturing an optical fiber grating.

The description above related to methods and apparatuses for manufacturing LPFGs, but needless to say, such optical fiber grating manufacturing methods and manufacturing apparatuses can also be applied to the manufacture of SPFGs.

Normally, a phase mask method or an interference exposure method is used in the manufacture of an SPFG, but by using a phase mask instead of an intensity mask in the apparatuses shown in FIG. 21 or FIG. 23, these apparatuses can function as apparatuses for manufacturing SPFGs with low PDL.

Furthermore, it is possible to construct a manufacturing apparatus for optical fiber gratings with the same functions using an interference exposure method, by combining an optical fiber outer diameter measuring device and an optical fiber clamp having a rotation mechanism with an interference exposure system. This interference exposure method is a method wherein a micropattern is formed by performing exposure using an interference fringe formed by the interference between two mutually coherent light beams, for example.

The interference exposure system is an optical system in which laser light which is coherent and in the form of a parallel light beam is divided into two beams by a half mirror, and the two beams are each reflected by a plane mirror so as to intersect at a certain angle, forming an interference fringe at the intersecting section and thereby exposing the optical fiber, enabling periodic high refractive index sections corresponding with the intensity distribution of the interference fringe to be formed on the optical fiber.

Next, a method of further reducing PDL is described.

First, the changes in PDL of an LPFG for each polarization are examined for a case in which exposure is performed from one side of an optical fiber, assuming an ideal optical fiber, that is, an optical fiber where the birefringence of the optical fiber itself is zero.

Figure 25A:
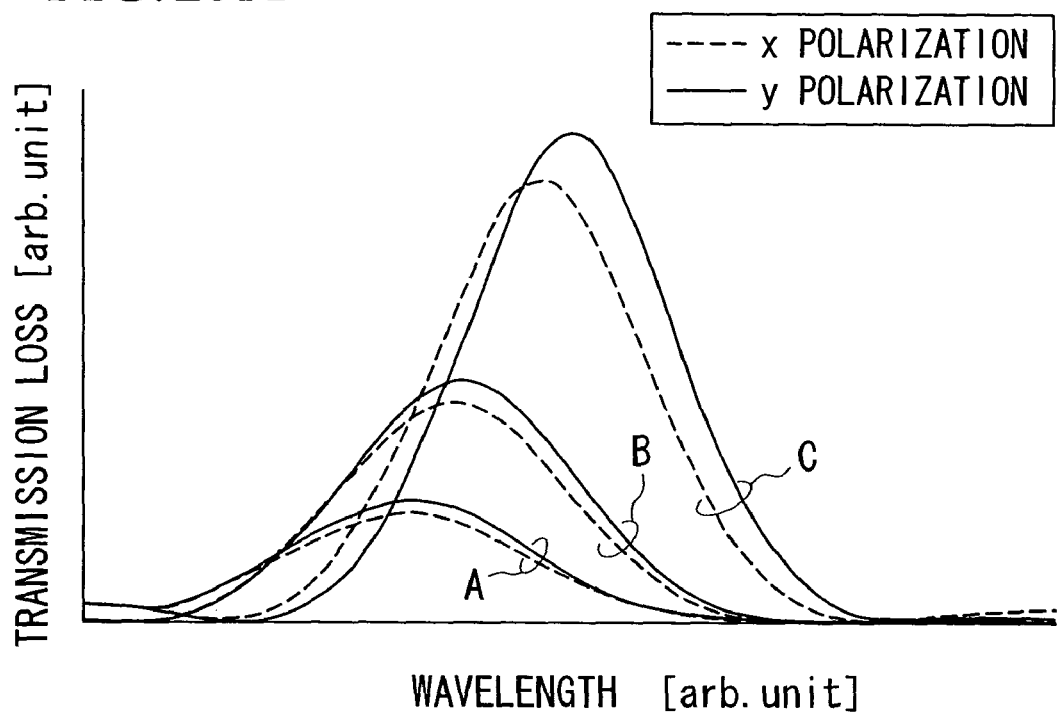
FIG. 25A is a diagram showing the transmission loss of an optical fiber grating manufactured by performing exposure onto an optical fiber in which the birefringence of the optical fiber itself is zero, from one side of the optical fiber.
Figure 25B:
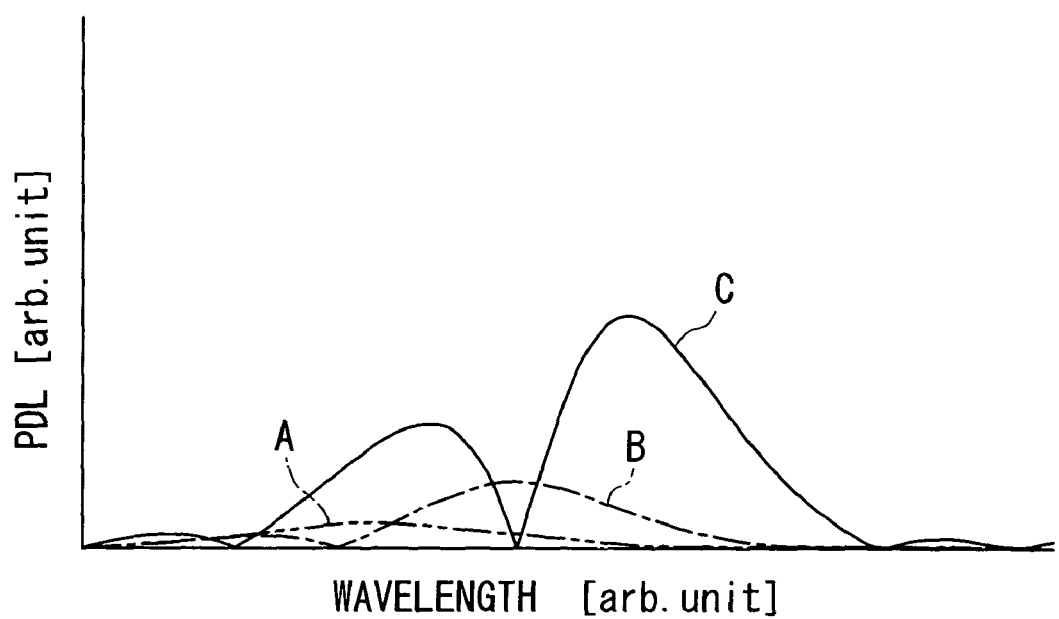
FIG. 25B is a diagram showing the PDL of an optical fiber grating manufactured by performing exposure onto an optical fiber in which the birefringence of the optical fiber itself is zero, from one side of the optical fiber.

Such a situation is shown in FIG. 25A and FIG. 25B. These diagrams show a case in which an optical fiber grating was formed by irradiating ultraviolet light from the x axis direction shown in FIG. 41A and FIG. 41B onto an optical fiber having a core which is symmetrical relative to the axis of the optical fiber, that is, an optical fiber for which $B_{fib}$ in equation (10) is 0. In FIG. 25A and FIG. 25B, A indicates the least amount of exposure, and this amount of exposure increases for B and then for C. This holds true for all of the diagrams until FIG. 30B. In terms of the exposure conditions, the grating period and the grating length are constant in A to C, and the time integration of the irradiation amount of the ultraviolet light, that is the irradiation power of the ultraviolet light, was increased in order for A, B and C, respectively.

Figure 42:
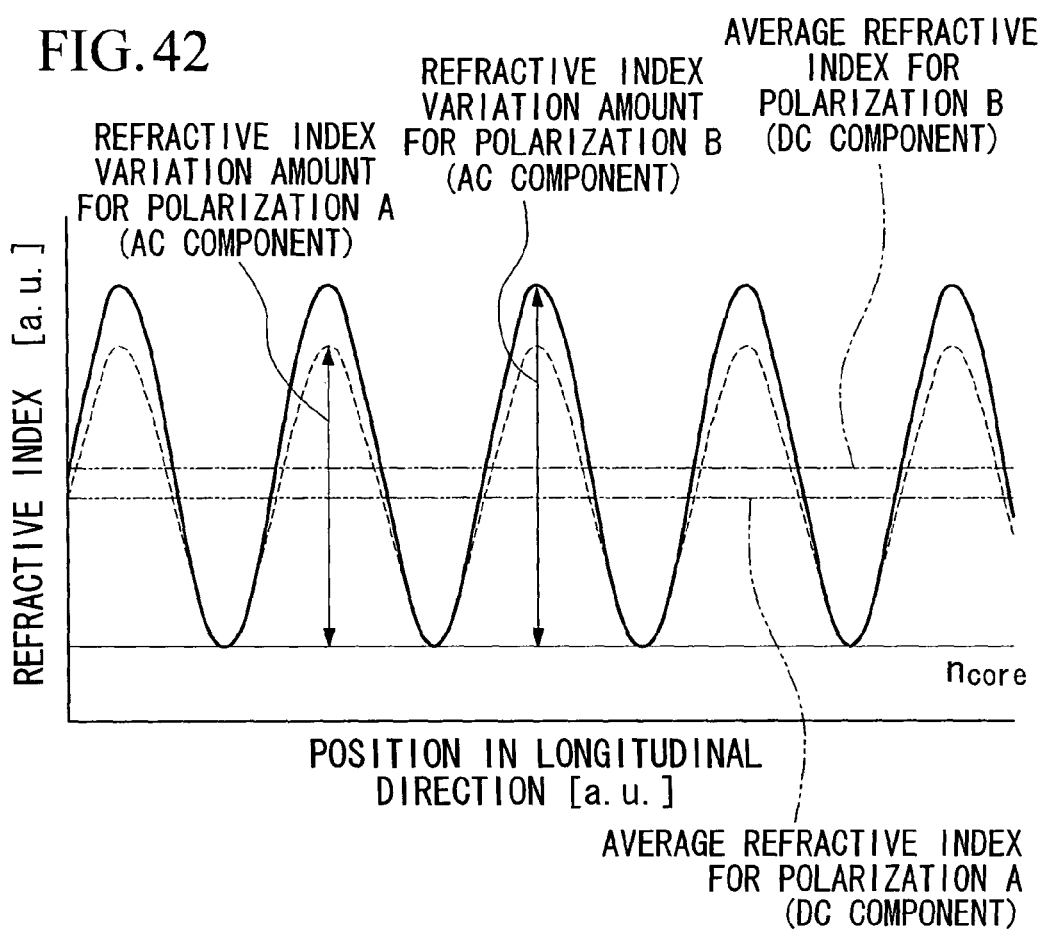
FIG. 42 is a diagram showing the manner in which the average refractive index (the DC component) and the refractive index variation amount (the AC component) of a grating section differ due to polarization.
Figure 43:
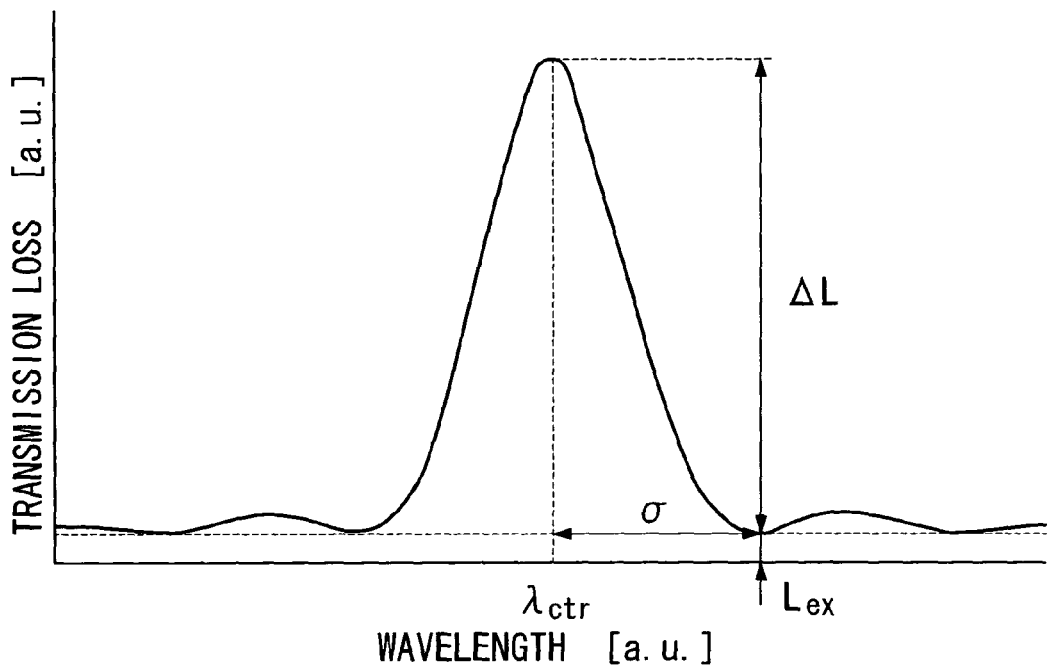
FIG. 43 is a diagram showing the transmission loss spectrum of an LPFG.

In FIG. 25A and FIG. 25B, while the exposure amount is sufficiently low, the refractive index fluctuation for each polarization x, y is substantially equal, but when the amount of refractive index fluctuation increases to above a certain level, then as described above using FIG. 41B, the amount of refractive index fluctuation is greater for the y polarization. Consequently, based on the theories described above using FIG. 41A, FIG. 41B and FIG. 42, and as shown in FIG. 25A, the loss peak for the y polarization is deeper than the loss peak for the x polarization, and also appears at a longer wavelength, and the absolute value of the difference between the loss spectrum of the x and y polarization is the PDL. This PDL is shown in FIG. 25B.

Next, the changes in the PDL of an LPFG for each polarization are examined for an LPFG formed by performing exposure while rotating an optical fiber with birefringence, that is, an asymmetric core optical fiber.

Figure 26A:
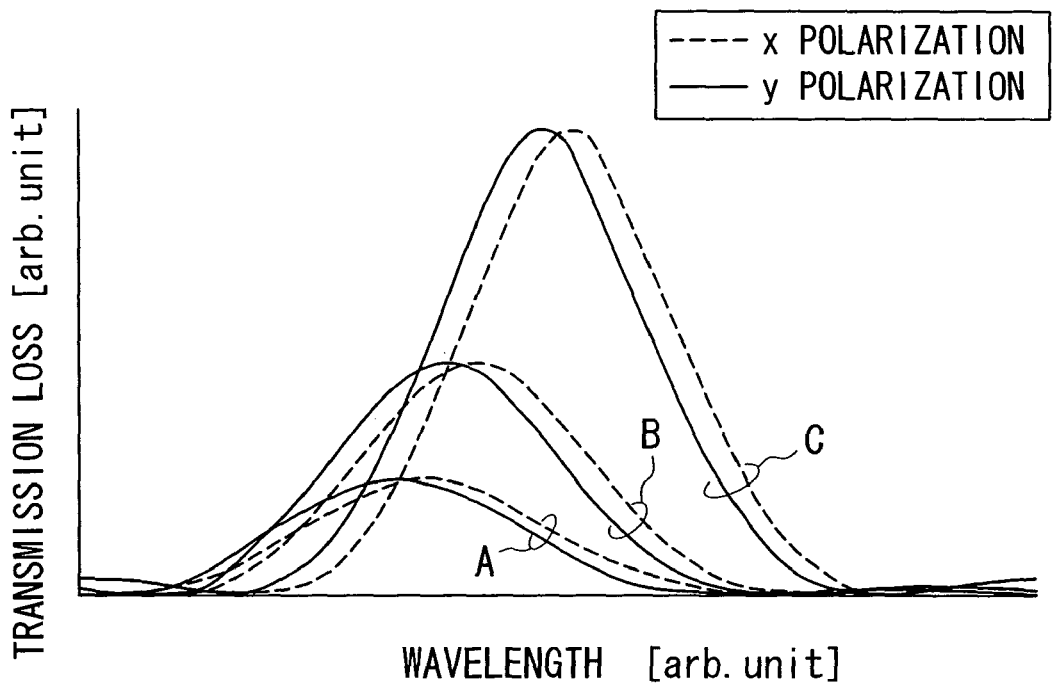
FIG. 26A is a diagram showing the transmission loss of an optical fiber grating manufactured by performing axisymmetric exposure of an optical fiber in which the optical fiber itself has a birefringence.
Figure 26B:
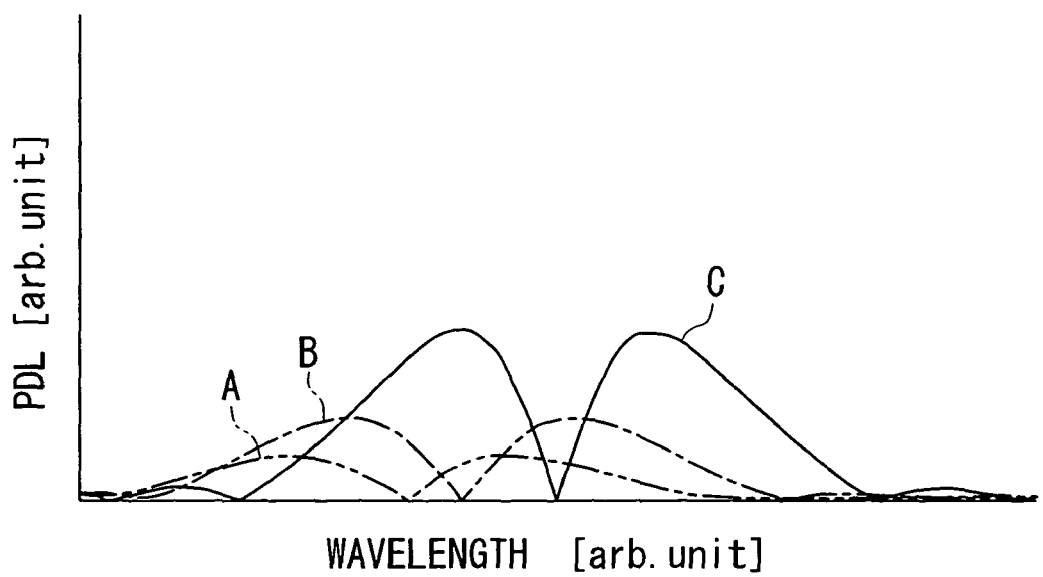
FIG. 26B is a diagram showing the PDL of an optical fiber grating manufactured by performing axisymmetric exposure of an optical fiber in which the optical fiber itself has a birefringence.

The orientation of the electric field of the polarization where the effective refractive index of the optical fiber is highest is deemed the x direction. During exposure, when exposure is performed such that ultraviolet light is irradiated in a symmetrical manner relative to the axis of the optical fiber so that birefringence caused by exposure does not occur, the changes in the transmission loss and the PDL are as shown in FIG. 26A and FIG. 26B. In this case, because the birefringence is not changed by the exposure, wavelength shift in the loss peak between the x and y polarization is constant from prior to the exposure through to after the exposure. In this case, the PDL is determined as the product of the wavelength shift caused by the birefringence of the optical fiber, and the loss tilt. In other words, assuming the same loss profile, PDL is determined based only on the birefringence of the optical fiber. It is therefore generally difficult to reduce the PDL caused by exposure when the birefringence of the fiber is large, that is, in cases when fibers with high PMD are used.

A method for further reducing PDL by taking into consideration the orientation of the birefringence of the optical fiber and the orientation of the birefringence caused by the exposure is described below in detail.

First, a case is considered in which ultraviolet light is irradiated from a single direction onto an optical fiber with birefringence, that is, an asymmetric core fiber, wherein the birefringence of the optical fiber and the birefringence caused by the exposure have the same orientation. Here also, the orientation of the polarization with the maximum effective refractive index is deemed the x axis direction.

Figure 27A:
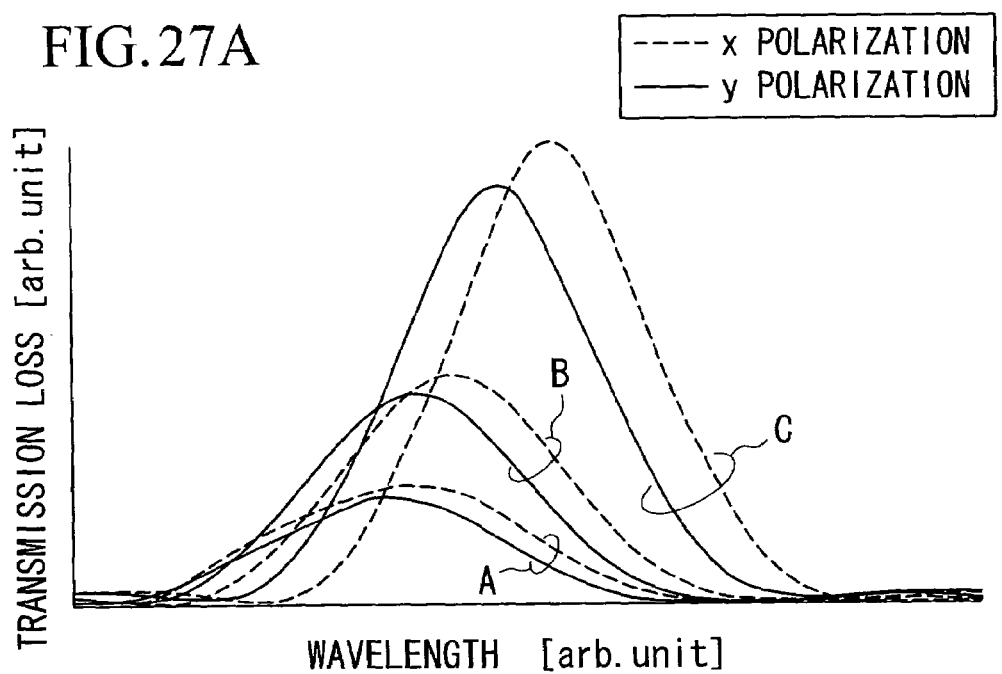
FIG. 27A is a diagram showing the transmission loss of an optical fiber grating manufactured by performing exposure so that the birefringence of the optical fiber itself and the birefringence caused by the exposure are added together.
Figure 27B:
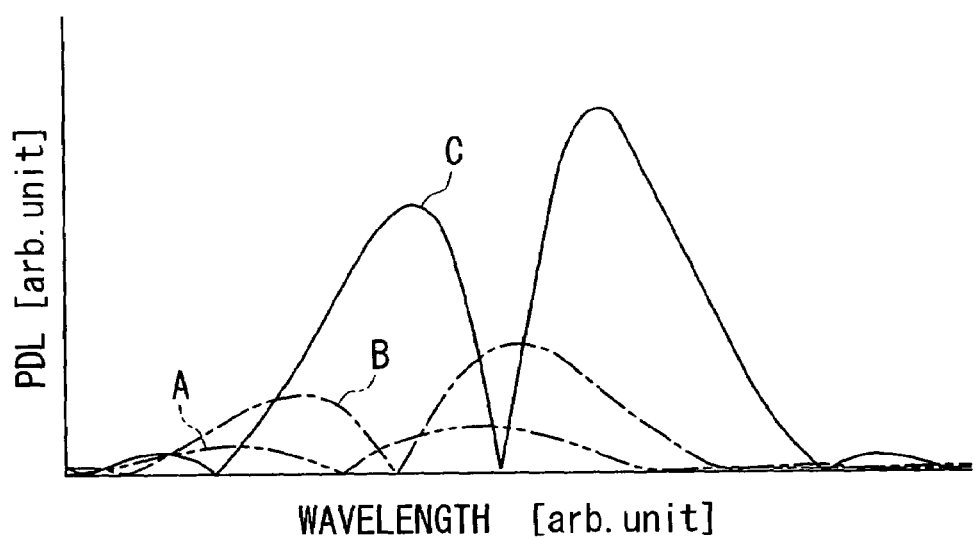
FIG. 27B is a diagram showing the PDL of an optical fiber grating manufactured by performing exposure so that the birefringence of the optical fiber itself and the birefringence caused by the exposure are added together.

When exposure by ultraviolet light is performed from the y axis direction, the orientation of the resulting birefringence caused by the exposure is the same as that of the fiber birefringence. In other words, the refractive index fluctuation for the x polarization (the polarization with an electric field component parallel to the x axis) is larger than the refractive index fluctuation for the y polarization. This is the same as for the situation shown in FIG. 14 to FIG. 16. In this case, as shown in FIG. 27A, the deviation from the center wavelength of the loss for each polarization widens as the exposure proceeds, and as shown in FIG. 27B, the PDL continues to deteriorate. As a result, it is apparent that if exposure is performed so that the birefringence of the optical fiber and the birefringence caused by the exposure have the same orientation, then it is not possible for the birefringence of the optical fiber to-be cancelled out by the birefringence caused by exposure.

Next, a method is described for reducing PDL in a case where the birefringence of the optical fiber and the birefringence caused by the exposure act in such directions that they cancel each other out, and the problem becomes the relative sizes of the absolute values of each type of birefringence.

First, the steps involved in reducing this PDL are described.

In a first step, optical fiber gratings are formed by performing exposure from directions parallel to the major axis and the minor axis of the optical fiber, respectively, and a comparison is made as to which exposure direction resulted in the optical fiber grating with the smaller PDL. As a result, a determination is made as to whether the polarization with the higher effective refractive index has an electric field parallel to the major axis or the minor axis.

In a second step, when it is necessary to further reduce PDL according to need, the PDL spectrum obtained in the above evaluation is analyzed, and the relative sizes of the center wavelength deviation $\Delta\lambda_{fib}$ caused by the birefringence of the optical fiber and the center wavelength deviation $\Delta\lambda_{exp}$ derived from the birefringence caused by the exposure are compared. By solving simultaneous equation (11) and equation (12) based on the center wavelength deviation $\Delta\lambda_{(1)}$ and $\Delta\lambda_{(2)}$ obtained in the first step, $$\Delta\lambda_{fib}+\Delta\lambda_{exp}=\text{MAX}(\Delta\lambda_{(1)},\Delta\lambda_{(2)}) \quad (11)$$

$$|\Delta\lambda_{fib}-\Delta\lambda_{exp}|=\text{MIN}(\Delta\lambda_{(1)},\Delta\lambda_{(2)}) \quad (12)$$

the values of $\Delta\lambda_{fib}$ and $\Delta\lambda_{exp}$ can be determined. Here, the absolute value signs in equation (12) allow two possible combinations of solutions for $\Delta\lambda_{fib}$ and $\Delta\lambda_{exp}$. However, because in optical fiber gratings manufactured under conditions where the irradiation amount of the ultraviolet light differs, $\Delta\lambda_{fib}$ is constant regardless of the irradiation amount, it is possible to determine a unique value for $\Delta\lambda_{fib}$ by manufacturing optical fiber gratings in which the exposure direction and/or the irradiation amount of the ultraviolet light differ, under at least four different conditions, and then evaluating the loss spectrum and PDL spectrum for each grating.

However, because there is a possibility that these values can vary considerably even with the same optical fiber, according to the exposure conditions, for example the order of the cladding mode coupled to the guided mode, the maximum loss difference $\Delta L$, the bandwidth half width $\sigma$ and the like, it is necessary to measure each product more than once.

As a result, if $\Delta\lambda_{fib} \geqq \Delta\lambda_{exp}$, then the PDL obtained to that point is the minimum. If PDL is not reduced sufficiently at this point, an optical fiber grating must be manufactured using an optical fiber with a smaller PMD.

On the other hand, if $\Delta\lambda fib < \Delta\lambda_{exp}$, then asymmetric exposure is performed on the optical fiber, to attempt to introduce an appropriate birefringence resulting from the asymmetric exposure. In other words, in equation (13), $$\Delta\lambda_{fib} + \Delta\lambda_{exp}\int\frac{\cos 2\phi}{2}dl = 0 \quad (13)$$

the angle $\phi$ is found.

A specific optical fiber grating manufacturing method based on the steps above is described below.

First, a first case is a setup in which the birefringence of the optical fiber and the birefringence caused by the exposure cancel each other out, and $\Delta\lambda_{fib}=\Delta\lambda_{exp}$, that is, the fluctuation width $\Delta\lambda_{fib}$ in the center wavelength caused by the birefringence of the optical fiber itself and the fluctuation width $\Delta\lambda_{exp}$ in the center wavelength caused by the DC component of the birefringence introduced by the exposure are equal.

Figure 28A:
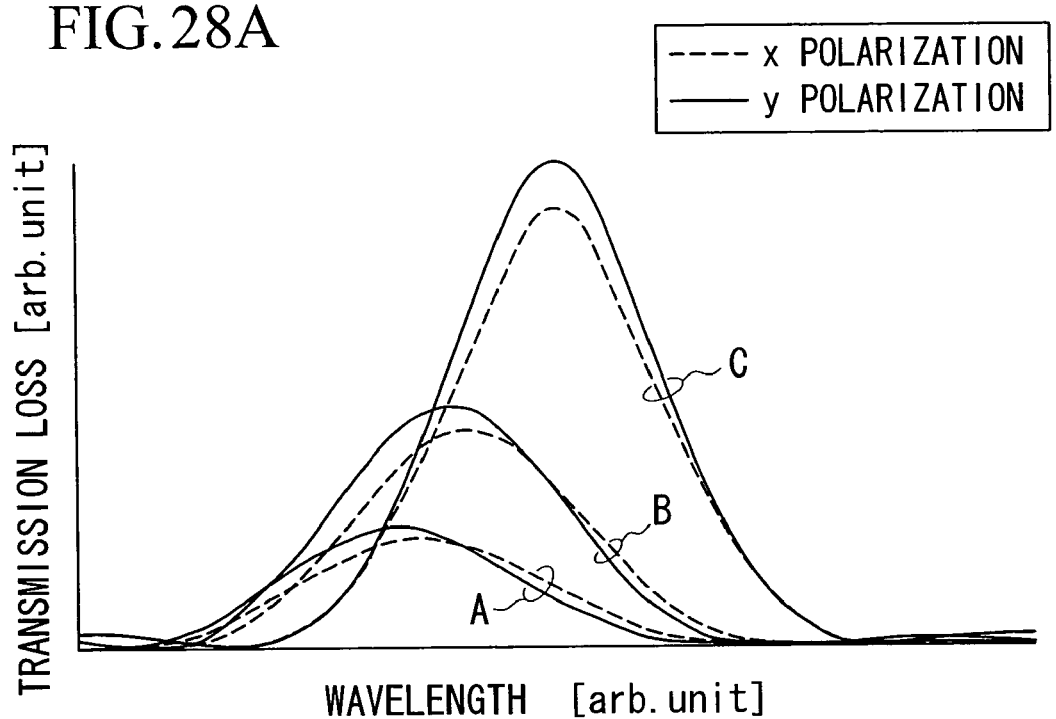
FIG. 28A is a diagram showing the transmission loss of an optical fiber grating manufactured by performing exposure so that the birefringence of the optical fiber itself and the birefringence caused by the exposure cancel each other out.
Figure 28B:
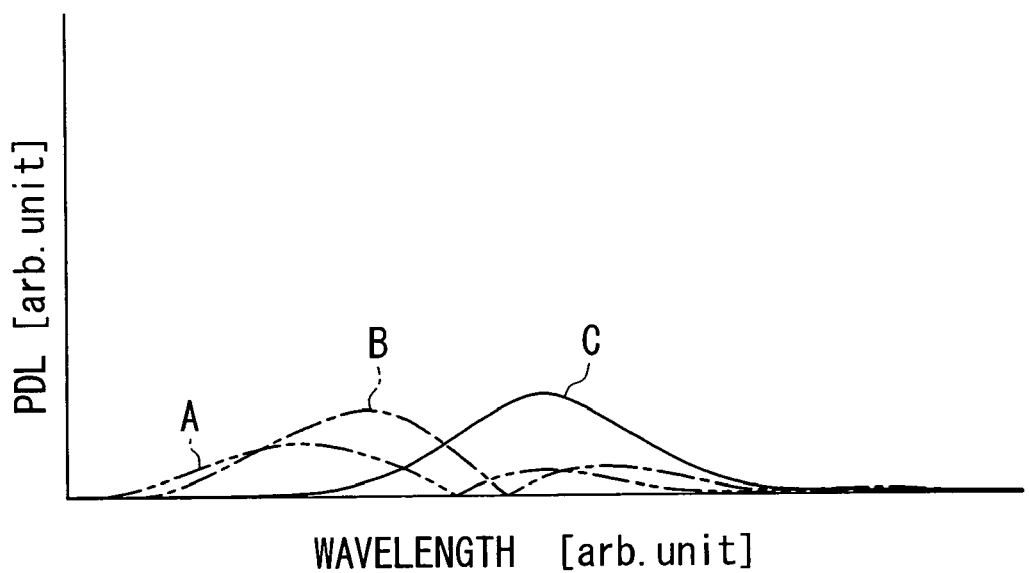
FIG. 28B is a diagram showing the PDL of an optical fiber grating manufactured by performing exposure so that the birefringence of the optical fiber itself and the birefringence caused by the exposure cancel each other out.

In this case, as shown in FIG. 28A, under exposure conditions A and B, the center wavelength of the loss has shifted for the x polarization and the y polarization, but under the exposure condition C, there is zero shift in the center wavelength of the loss. Furthermore, as shown in FIG. 28B, the only PDL present is in the difference in the depth of the loss due to the difference in the amount of refractive index fluctuation (AC component) between each polarization.

The example shown here is a case where an optical fiber is used in which the effective refractive index of the x polarization is greater than that of the y polarization, and assumes a situation in which ultraviolet light irradiation was irradiated onto the optical fiber from the x axis direction. Generally, such conditions allow PDL to be minimized.

A second case is a situation in which, although the optical fiber birefringence and the birefringence caused by the exposure can cancel each other out, the fiber birefringence is greater than the birefringence caused by the exposure.

Figure 29A:
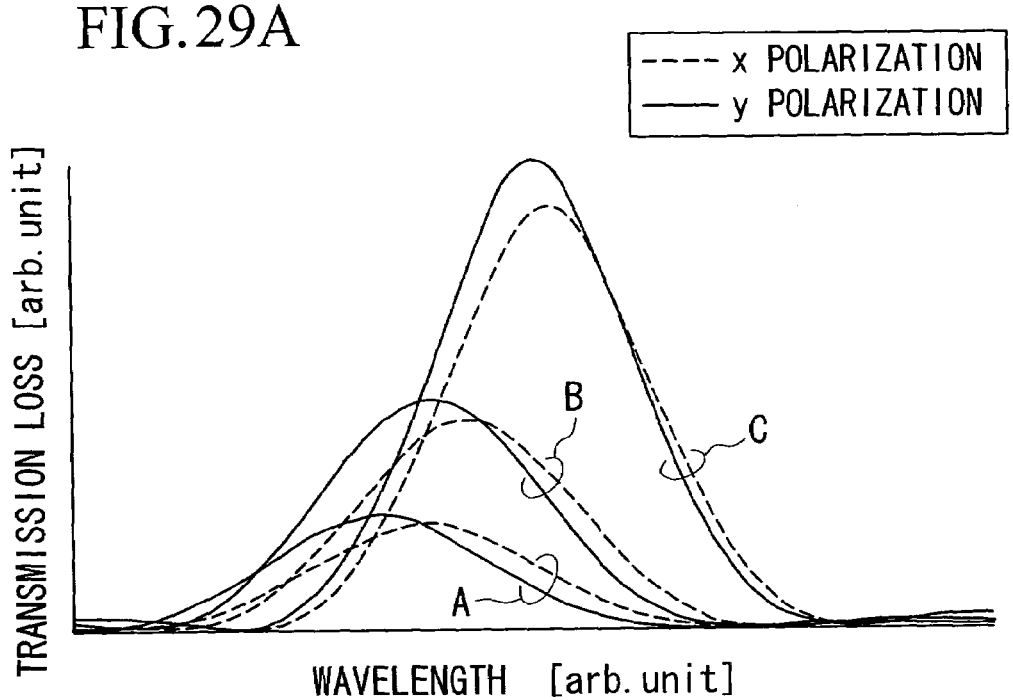
FIG. 29A is a diagram showing the transmission loss of an optical fiber grating manufactured by performing exposure so that the birefringence of the optical fiber itself and the birefringence caused by the exposure cancel each other out, for a case in which the birefringence of the optical fiber itself is larger.
Figure 29B:
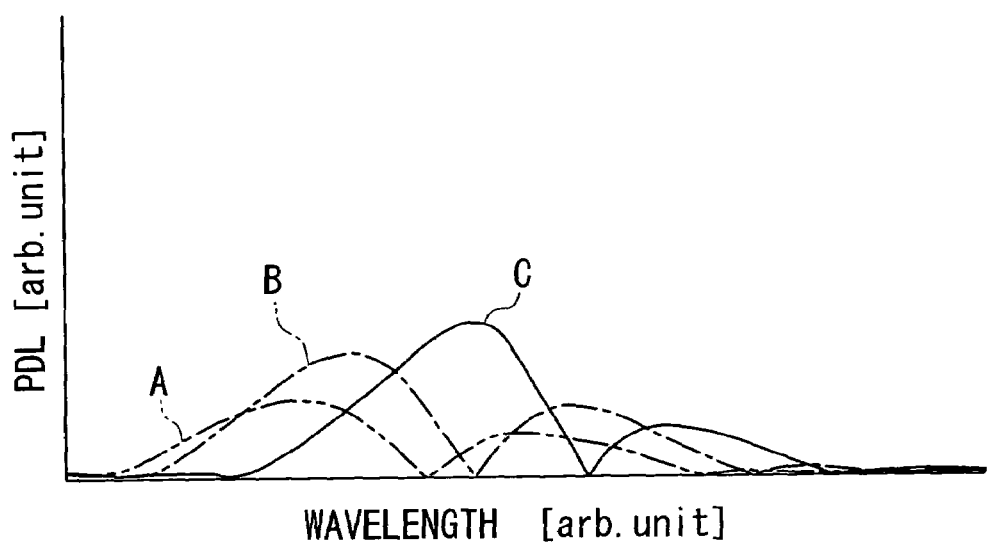
FIG. 29B is a diagram showing the PDL of an optical fiber grating manufactured by performing exposure so that the birefringence of the optical fiber itself and the birefringence caused by the exposure cancel each other out, for a case in which the birefringence of the optical fiber itself is larger.

In this case, as shown in FIG. 29A, as exposure proceeds from A to C, the center wavelength shift caused by the optical fiber birefringence is increasingly compensated for, but cannot be completely compensated for, even under the exposure condition C. In such a case, no further compensation of birefringence can be achieved by exposure. In other words, provided that a grating is formed in the same optical fiber under the same exposure conditions, PDL cannot be further improved even by optimizing the orientation of the optical fiber.

A third case is a situation in which the optical fiber birefringence and the birefringence caused by the exposure can cancel each other out, and the birefringence caused by the exposure is greater than the fiber birefringence. In other words, in this situation, from the viewpoint of the center wavelength shift, the birefringence of the optical fiber can be suitably compensated for by introducing birefringence caused by exposure.

Figure 30A:
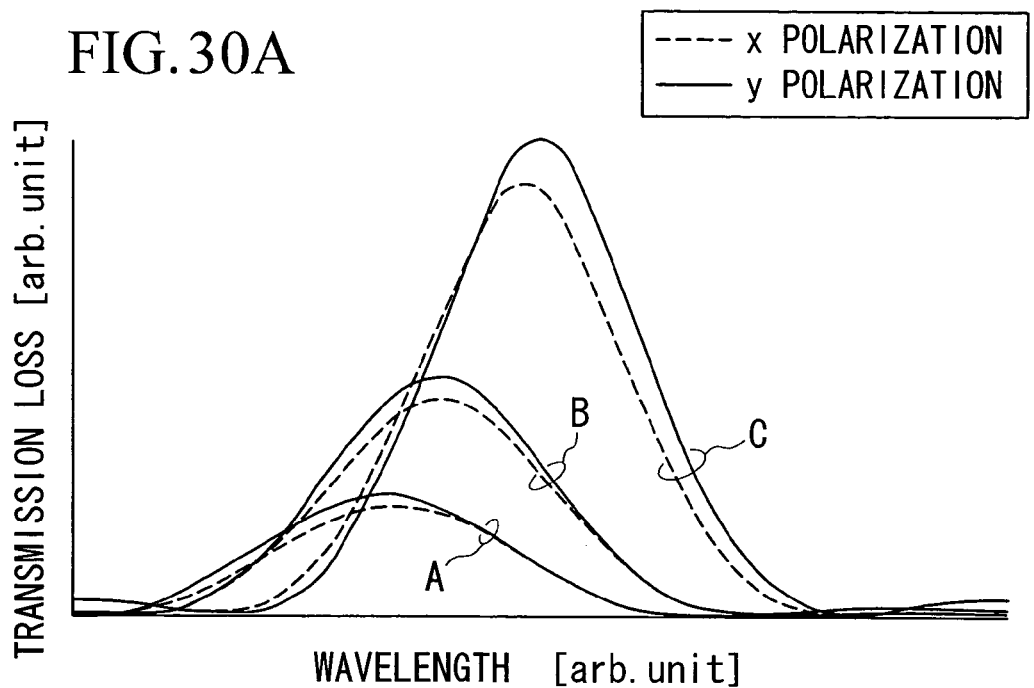
FIG. 30A is a diagram showing the transmission loss of an optical fiber grating manufactured by performing exposure so that the birefringence of the optical fiber itself and the birefringence caused by the exposure cancel each other out, for a case in which the birefringence caused by the exposure is larger.
Figure 30B:
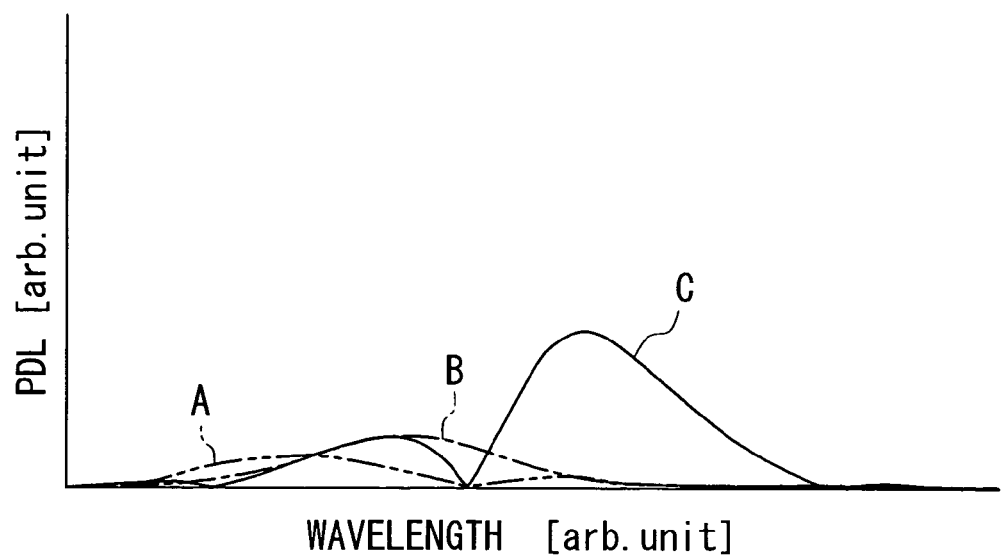
FIG. 30B is a diagram showing the PDL of an optical fiber grating manufactured by performing exposure so that the birefringence of the optical fiber itself and the birefringence caused by the exposure cancel each other out, for a case in which the birefringence caused by the exposure is larger.

In this case, as shown in FIG. 30A, as exposure proceeds from A to C, the positional relationship between the long wavelength and the short wavelength in the shift of the center wavelengths of the x polarization and the y polarization is reversed. In such a case, introducing an appropriate amount of birefringence by adjusting appropriately the birefringence caused by exposure allows PDL to be further reduced.

For the third case mentioned above, a specific method for further reducing PDL by introducing an appropriate amount of birefringence by adjusting appropriately the birefringence caused by exposure is described below.

Because the effective refractive index of the optical fiber is greater for the x polarization than for the y polarization, when, as a result of forming a grating by irradiating ultraviolet light from the x axis direction in FIG. 41A and FIG. 41B, the birefringence caused by exposure is greater than the birefringence of the optical fiber, then the amount of birefringence introduced by exposure can be adjusted by performing asymmetric exposure onto the x axis direction and the y axis direction of the optical fiber.

Figure 31:
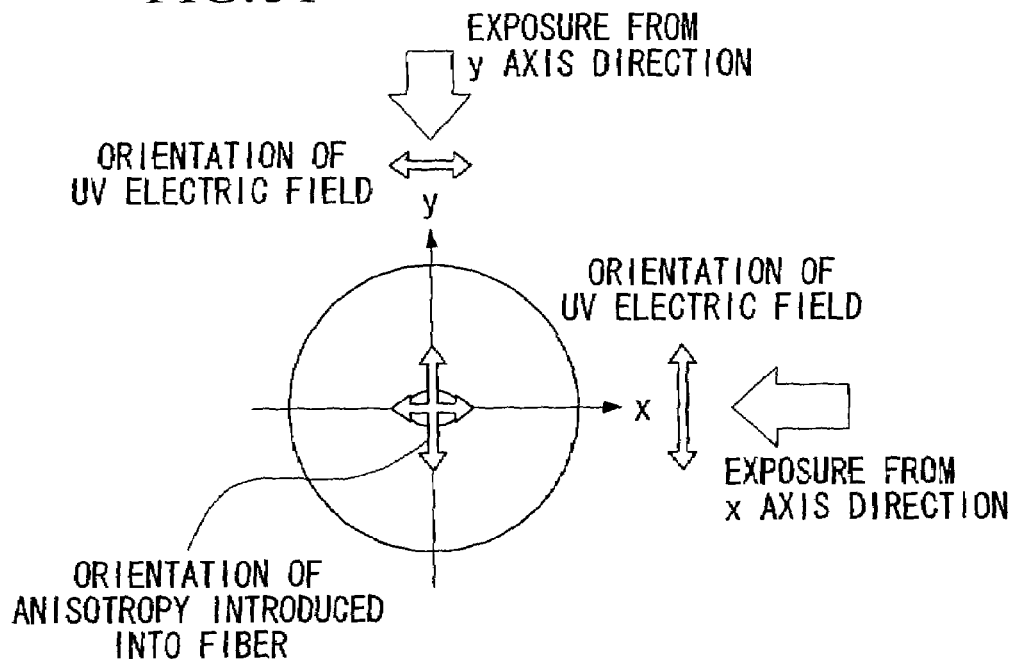
FIG. 31 is a diagram showing a method of adjusting the birefringence introduced by the exposure, by performing exposure from both the x axis direction and the y axis direction, with a different amount of exposure from each direction.
Figure 32:
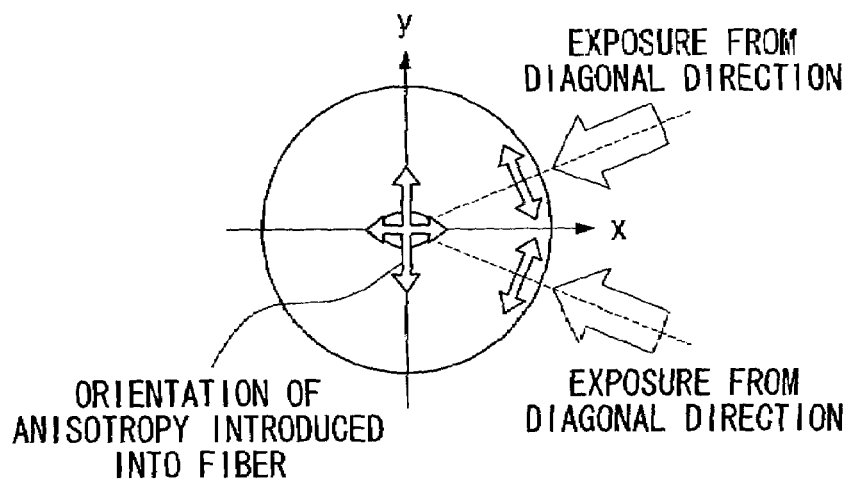
FIG. 32 is a diagram showing a method of adjusting the birefringence introduced by the exposure, by performing exposure from a predetermined angle relative to the x axis or the y axis.

Examples of exposure methods in which asymmetric exposure is performed in the x axis direction and the y axis direction of the optical fiber as a method of adjusting the amount of birefringence which is introduced by exposure are shown in FIG. 31 and FIG. 32.

The exposure method shown in FIG. 31 is a method in which exposure is performed from the x axis direction and the y axis direction, this exposure being performed such that the exposure amount from the x axis direction is greater than the exposure amount from the y axis direction. As a result, the refractive index introduced into the optical fiber as a result of exposure is higher in the y axis direction than in the x axis direction. Conversely, when exposure is performed so that the exposure amount from the y axis direction is greater than the exposure amount from the x axis direction, the refractive index introduced into the optical fiber as a result of exposure is higher in the x axis direction than in the y axis direction. In this manner, it is possible to adjust the amount of birefringence introduced by exposure.

FIG. 32 shows an exposure method from a diagonal direction, which can suitably compensate for optical fiber birefringence. In this case, by performing exposure from two directions which are diagonal relative to the x axis, the refractive index introduced into the optical fiber becomes larger in the y axis direction than in the x axis direction. Because the size of the refractive index introduced into the optical fiber differs according to the diagonal angle from which exposure is performed, then by setting an appropriate angle and irradiating light from this angle, it is possible to adjust the amount of birefringence introduced by the exposure.

After analyzing the transmission loss spectrum and PDL spectrum of an actual manufactured optical fiber grating, it was apparent that the birefringence caused by exposure was greater than the optical fiber birefringence. From further analysis, it was found that by forming an LPFG by irradiating ultraviolet light from a direction which forms an angle of 55° relative to the major axis of the optical fiber, it was possible to minimize PDL. The calculation of this angle can be performed by finding the angle $\phi$ which satisfies equation (13).

Figure 33:
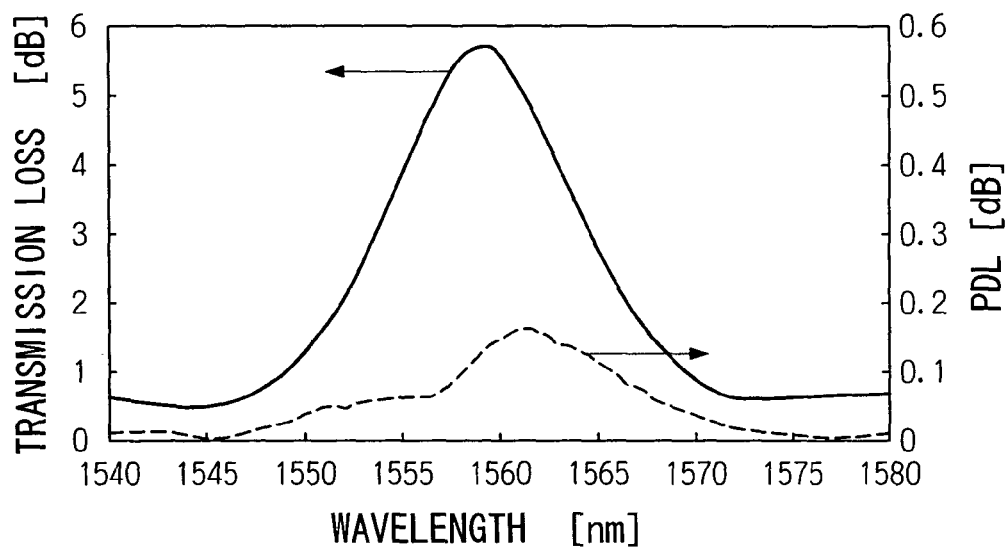
FIG. 33 is a diagram showing an example of the transmission loss and PDL of an optical fiber grating manufactured by performing exposure from an angle of 55° relative to the major axis of the optical fiber cross-section.
Figure 34:
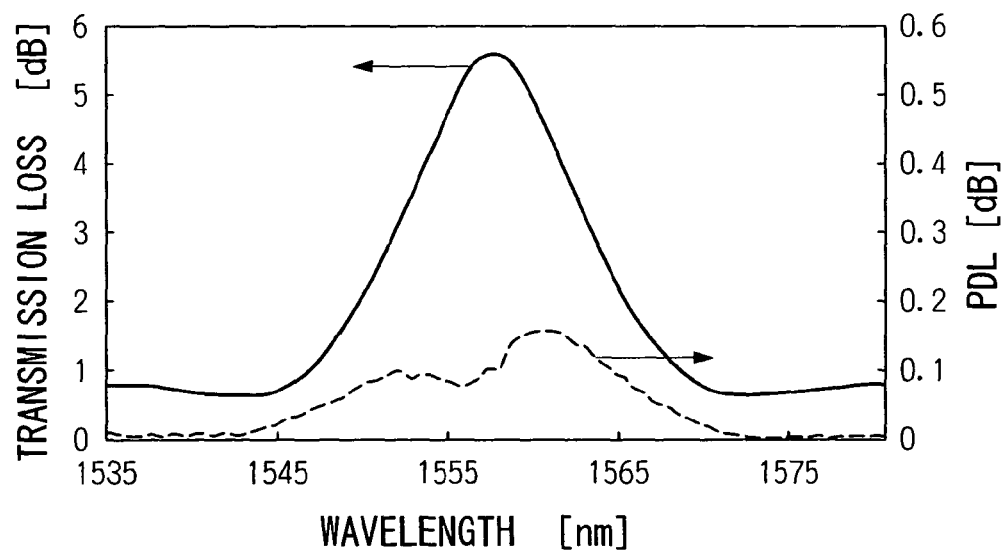
FIG. 34 is a diagram showing an example of the transmission loss and PDL of an optical fiber grating manufactured by performing exposure from an angle of 55° relative to the major axis of the optical fiber cross-section.
Figure 35:
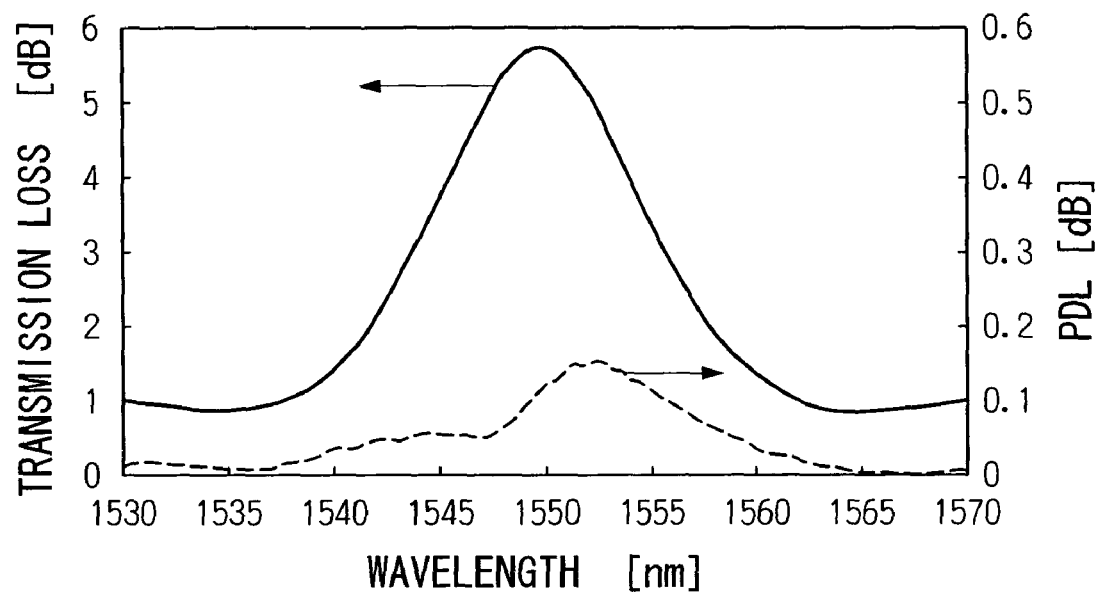
FIG. 35 is a diagram showing an example of the transmission loss and PDL of an optical fiber grating manufactured by performing exposure from an angle of 55° relative to the major axis of the optical fiber cross-section.

The transmission loss spectra and PDL spectra of actual long period optical fiber gratings manufactured by irradiating ultraviolet light from a direction which forms an angle of 55° relative to the major axis of the optical fiber are shown in FIG. 33 to FIG. 35. Furthermore, the grating manufacture parameters at this time are shown in Table 2.

TABLE 2

| Grating Number | Grating Period (μm) | Number of Gratings |
|---|---|---|
| No. 7 (FIG. 33) | 242 | 45 |
| No. 8 (FIG. 34) | 242 | 45 |
| No. 9 (FIG. 35) | 238 | 45 |

It is apparent from FIG. 33 to FIG. 35 that the maximum PDL value is from 0.15 to 0.17 dB. This is a satisfactorily small value when compared with the fact that the maximum PDL value of an LPFG manufactured by performing exposure by irradiating ultraviolet light from a direction parallel to the major axis is from 0.46 to 0.49 dB, and the fact that even the maximum PDL value of an LPFG manufactured by performing exposure with ultraviolet radiation of the same irradiation amount from a direction perpendicular to the major axis is from 0.24 to 0.27 dB. In other words, performing asymmetric exposure relative to the x axis direction and the y axis direction of the optical fiber and thereby adjusting the amount of birefringence caused by exposure which is introduced, is very effective in reducing PDL.

In the description above, a method for reducing PDL was described in terms of an LPFG, but this method is not limited to an LPFG, and can of course, be applied to an SPFG.

According to the optical fiber grating manufacturing apparatus of this example, by incorporating a device which measures the outer diameter of the optical fiber and a device which changes the exposure direction relative to the optical fiber, it is possible to perform exposure of the optical fiber so that the birefringence caused by the makeup of the optical fiber itself and the birefringence caused by the exposure cancel each other out, and an optical fiber grating manufacturing apparatus can be realized which is capable of manufacturing an optical fiber grating with a small insertion loss polarization dependence.

Furthermore, according to the optical fiber grating manufacturing method of this example, by measuring the outer diameter of the optical fiber and irradiating ultraviolet light onto the optical fiber from the major axis direction and/or the minor axis direction of the optical fiber cross-section, it is possible to realize an optical fiber grating manufacturing method wherein the birefringence caused by the makeup of the optical fiber itself and the birefringence caused by the exposure can cancel each other out, thereby enabling the manufacture of an optical fiber grating with a small insertion loss polarization dependence.

In addition, because it is possible to adjust the introduced amount of birefringence caused by exposure by irradiating different amounts of ultraviolet light onto the optical fiber from the major axis direction and the minor axis direction of the optical fiber cross-section, causing the introduced refractive index to differ between the major axis direction and the minor axis direction according to the polarization of the irradiated ultraviolet light, an optical fiber grating manufacturing method capable of manufacturing an optical fiber grating with a small insertion loss polarization dependence can be realized.

Furthermore, because it is possible to adjust the introduced amount of birefringence caused by exposure, by manufacturing an optical fiber grating by irradiating ultraviolet light onto the optical fiber from a direction which forms a predetermined angle relative to the major axis direction or the minor axis direction of the optical fiber cross-section, thereby causing the amount of birefringence caused by exposure to differ for the major axis direction and the minor axis direction according to the polarization of the irradiated ultraviolet light, an optical fiber grating manufacturing method capable of manufacturing an optical fiber grating with a small insertion loss polarization dependence can be realized.

Furthermore, it is possible to realize an optical fiber grating with greatly reduced insertion loss polarization dependence by manufacturing the optical fiber grating according to the manufacturing methods described above.

In the method described in Japanese Patent Application No. 2000-360905, the birefringence introduced into the optical fiber by exposure is reduced to a minimum, but the birefringence caused by the optical fiber itself remains.

Normally, in a single mode fiber, the birefringence caused by the optical fiber itself is small, and the center wavelength shift expressed by equation (4) is as high as approximately 0.1 nm, and at most is still below 1 nm. The PDL determined from equation (8) and equation (9) for such small wavelength shift can be expressed in a differential form such as that shown in equation (14), from the center wavelength shift $\Delta\lambda_{ctr}$, the grating period $\Lambda$, and the absolute value $|dloss(\lambda)/d\lambda|$ obtained by differentiating the loss spectrum loss ($\lambda$) by the wavelength.

$$PDL_{calc}(\lambda) = \Delta\lambda_{ctr}\left|\frac{dloss(\lambda)}{d\lambda}\right| \quad (14)$$

Furthermore, the PDL caused by the optical fiber itself can be expressed by equation (15), from equation (14) and equation (4).

$$PDL_{calc}(\lambda) = \Delta B_1\left|\frac{dloss(\lambda)}{d\lambda}\right| \quad (15)$$

Here, the loss spectrum loss ($\lambda$) is measured by incident non-polarized light or fully polarized light onto the optical fiber grating and measuring the results using an optical spectrum analyzer or an optical power meter. The wavelength differentiation of the loss spectrum can be determined by performing measurement with a sufficiently small wavelength interval $\delta\lambda$ and then approximating the result based on the difference as shown in equation (16).

$$\frac{dloss(\lambda)}{d\lambda} \approx \frac{loss(\lambda + \delta\lambda/2) - loss(\lambda - \delta\lambda/2)}{\delta\lambda} \quad (16)$$

In an optical fiber grating manufactured by the manufacturing method of the present invention, the PDL of the optical fiber grating can be made smaller than the PDL caused by the optical fiber itself which is expressed by equation (15). In other words, the actual PDL measured for the optical fiber grating manufactured by the manufacturing method of the present invention ($PDL_{meas}(\lambda)$) can be reduced to a smaller value than the PDL resulting from the birefringence caused by the optical fiber itself ($PDL_{calc}(\lambda)$) expressed by equation (15).

Next, an example of an optical amplifier module is described as an example of an optical module of the present invention.

In this example, the optical fiber grating described above is used as a gain equalizer which flattens the wavelength dependence of light amplified by an optical amplifier such as an erbium doped optical fiber amplifier, and this optical amplifier and optical fiber grating in combination form an optical module.

Figure 36:
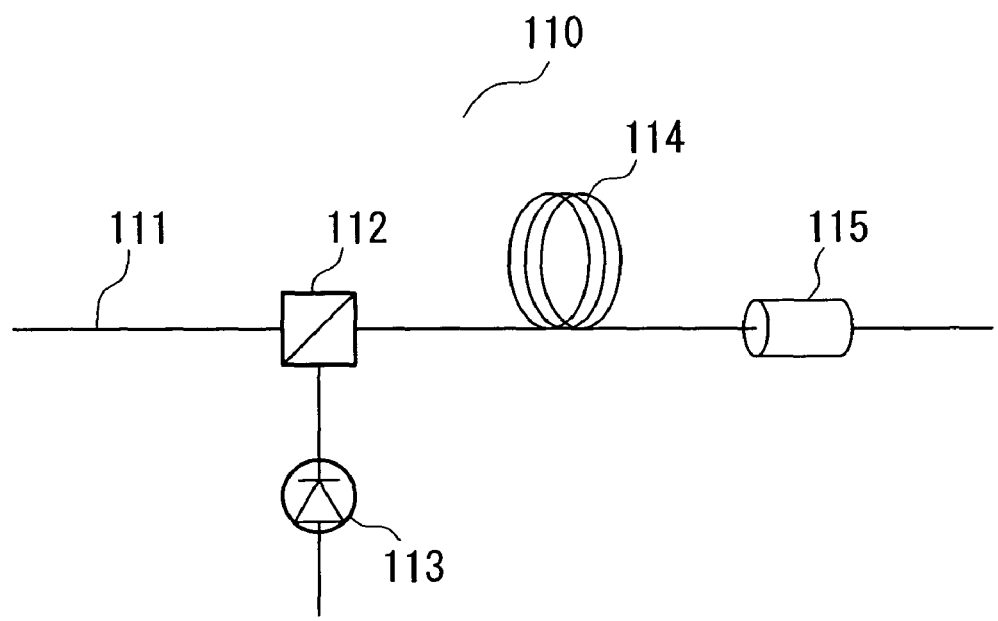
FIG. 36 is a diagram showing an example of the construction of an optical module using an optical fiber grating of the present invention.

FIG. 36 shows an example of the construction of an optical amplifier module of the present invention in a case in which an erbium doped optical fiber amplifier is used as the optical amplifier.

In FIG. 36, reference numeral 111 indicates an optical transmission path over which optical signals are transmitted. This optical transmission path 111 is connected to one of the input ports of a WDM coupler 112. A pumping light source 113 is connected to the other input port of this WDM coupler 112, and an output port of the WDM coupler 112 is connected to one end of an erbium doped optical fiber (abbreviated to "EDF" below) 114, which is a gain medium.

An optical fiber grating 115 is connected to the other end of this EDF 114. In this example, the connections between the optical components are made by fusion splicing, for example. The optical signals transmitted from the optical transmission path 111 are combined in the WDM coupler 112 with the pumping light from the pumping light source 113, input into one end of the EDF 114, and amplified. The amplified light undergoes gain equalization by means of the optical fiber grating 115, and is output to the optical transmission path 111.

Because the optical fiber grating of the present invention is capable of reducing PDL as described above, it is effective as a gain equalizer for equalizing the gain of the optical amplifier.

In the description above, a case was described in which an erbium doped optical fiber amplifier was used as the optical amplifier, but the optical amplifier is not limited to this type, and another type of optical amplifier may also be used according to need.

The description above involved an optical amplifier module, but the term optical module used here does not refer only to optical amplifiers, and the optical fiber grating of the present invention can also be used effectively in an optical module constructed only of passive components, such as a block equalizer. Here, a block equalizer is a compensator module which can compensate for deviation from the design value of the gain of the optical amplifier and/or deviation from the design value of the wavelength dependence of the transmission loss of the transmission optical fiber, and is used at a ratio of one equalizer for every several, or every several dozen optical amplifiers, as needed.

According to the optical module of this example, by performing gain equalization using an optical fiber grating capable of reducing PDL, an optical module can be realized with small gain and insertion loss polarization dependence.

Next, an example of an optical communication system of the present invention is described.

In the optical communication system of this example, an optical transmitter and an optical receiver are connected by an optical transmission path, and optical amplifier modules as described above are provided within this optical transmission path.

Figure 37:
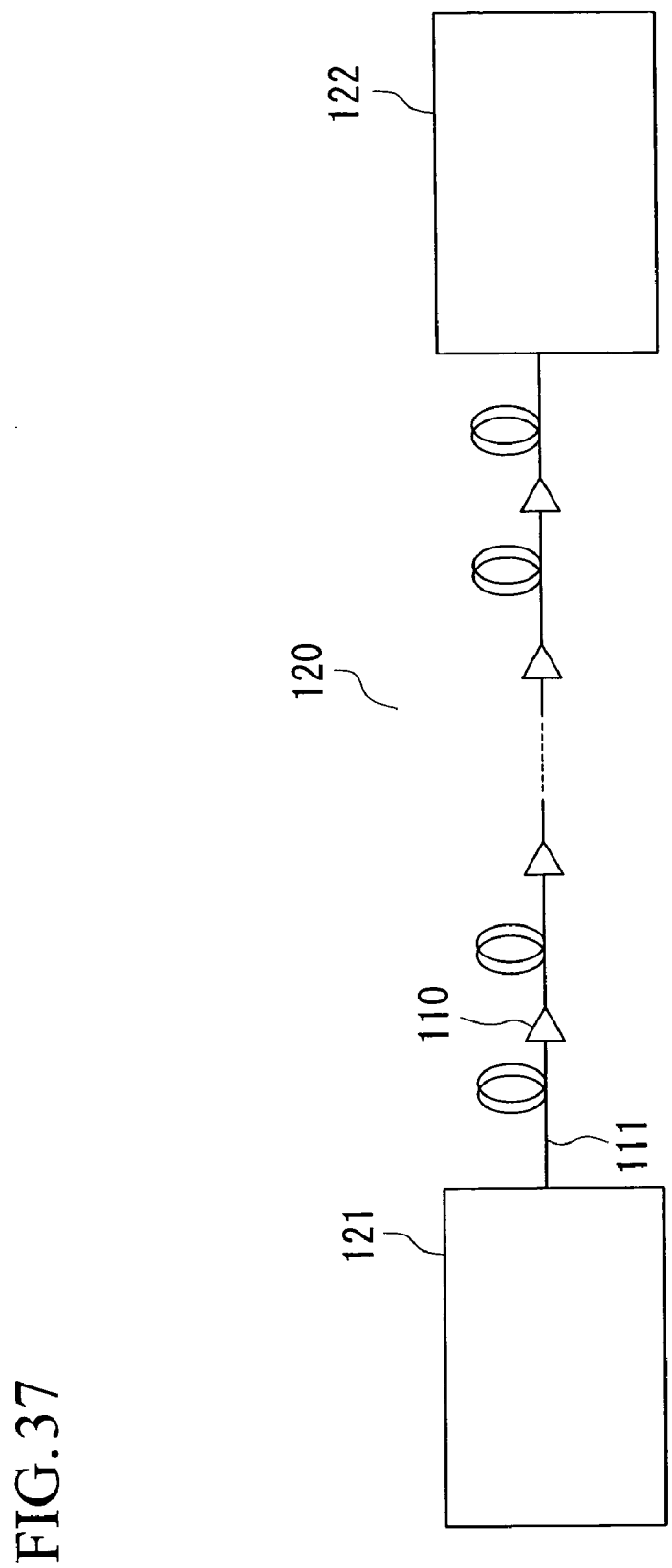
FIG. 37 is a diagram showing an example of the construction of an optical communication system incorporating an optical module of the present invention.

The construction of an example of the optical communication system of the present invention is shown in FIG. 37.

In FIG. 37, reference numeral 120 indicates the optical communication system, reference numeral 121 indicates an optical transmission terminal, and reference numeral 122 indicates an optical receiver terminal. The optical transmission terminal 121 and the optical receiver terminal 122 are connected by the optical transmission path 111. As examples of the optical module 110 of the present invention, optical amplifier modules are inserted in single stage or directly connected in multiple stages within the optical transmission path. The optical signals sent by the optical transmission terminal 121 are amplified by the optical amplifier modules provided in multiple stages, and received by the optical receiver terminal 122.

In this example, by incorporating optical modules which use the optical fiber grating of the present invention as a gain equalizer into the optical communication system, an optical communication system with excellent polarization characteristics and high signal transmission quality can be realized.

As described above, according to the present invention, by providing a device which measures the outer diameter of the optical fiber and a device which changes the exposure direction relative to the optical fiber, it is possible to perform exposure of an optical fiber so that the birefringence caused by the makeup of the optical fiber itself and the birefringence caused by the exposure cancel each other out. Consequently, an optical fiber grating manufacturing apparatus capable of manufacturing an optical fiber grating with a small insertion loss polarization dependence can be obtained.

Furthermore, by detecting the major axis direction and the minor axis direction of the optical fiber cross-section by measuring the outer diameter of the optical fiber, and then irradiating ultraviolet light onto the optical fiber from the major axis direction and/or the minor axis direction of the optical fiber cross-section, it is possible for the birefringence caused by the makeup of the optical fiber itself and the birefringence caused by the exposure to cancel each other out. As a result, an optical fiber grating manufacturing method capable of manufacturing an optical fiber grating with a small insertion loss polarization dependence can be obtained.

In addition, by irradiating different amounts of ultraviolet light from the major axis direction and the minor axis direction of the optical fiber cross-section, the introduced refractive index can be set so as to differ between the major axis direction and the minor axis direction according to the polarization of the irradiated ultraviolet light, and the amount of birefringence introduced by exposure can be adjusted. As a result, an optical fiber grating manufacturing method capable of manufacturing an optical fiber grating with a small insertion loss polarization dependence can be obtained.

Furthermore, by manufacturing an optical fiber grating by irradiating ultraviolet light onto the optical fiber from a single direction or a plurality of directions which form a predetermined angle relative to the major axis direction and the minor axis direction of the optical fiber cross-section, the introduced refractive index can be set so as to differ between the major axis direction and the minor axis direction according to the polarization of irradiated ultraviolet light, and the amount of birefringence introduced by exposure can be adjusted. As a result, an optical fiber grating manufacturing method capable of manufacturing an optical fiber grating with a small insertion loss polarization dependence can be obtained.

Furthermore, by manufacturing an optical fiber grating according to the manufacturing methods described above, an optical fiber grating with a greatly reduced insertion loss polarization dependence can be obtained.

Moreover, by performing gain equalization using an optical fiber grating capable of reducing PDL, an optical module with low polarization dependence can be obtained.

Furthermore, by incorporating an optical module with low polarization dependence into an optical communication system, an optical communication system with a small polarization dependence can be obtained.

The invention claimed is:

1. A method of manufacturing an optical fiber grating having a plurality of grating sections arranged intermittently at a predetermined period along a longitudinal direction, by irradiating, onto the side of an optical fiber having locations made of a material wherein the refractive index rises when irradiated by light of a specific wavelength, light of said specific wavelength along a length direction of the optical fiber at a predetermined period, causing the refractive index of the irradiated sections to rise, wherein in the formation of a plurality of high refractive index sections, light is irradiated by varying sequentially the light irradiation position along the longitudinal direction of the optical fiber, so that the irradiation amount of the light becomes equal around the circumferential direction of the optical fiber as a result of integrating thr light irradiation amount along the length direction of the optical fiber over all of said grating section.

2. The method according to claim 1, wherein by rotating either one or both of the optical fiber and the irradiating light around the axis of the optical fiber, light is irradiated evenly around the circumferential direction of the optical fiber.

3. An optical fiber grating manufacturing apparatus used in said method according to claim 1, comprising a holding device which holds the optical fiber, and an irradiatng device which irradiates light of a specific wavelength onto the optical fiber, and said holding device comprises a rotation mechanism which rotates said optical fiber in the circumferential direction thereof.

4. A method of manufacturing an optical grating according to claim 1, wherein the optical fiber grating has a periodic refractive index distribution, which is formed by irradiating ultraviolet light at a predetermined period along a length direction of an optical fiber, wherein the distribution of maximum insertion loss polarization dependence values within the working wavelength range of the optical fiber gratings for a single manufacturing batch is less than one fifth of the average value of said maximum insertion loss polarization dependence within the same manufacturing batch.

5. An optical fiber grating manufacturing apparatus used in an optical fiber grating manufacturing method, comprising a parabolic mirror having a mirrored inner surface, an irradiating device which irradiates light onto the inner surface of said parabolic mirror, a holding device which holds an optical fiber in place within said parabolic mirror, and a moving device which moves at least one of said parabolic mirror and said holding device in the length direction of said optical fiber, and wherein said optical fiber grating manufacturing method is a method of manufacturing an optical fiber grating having a plurality of grating sections arranged intermittently at a predetermined period along a longitudinal direction, by irradiating, onto the side of an optical fiber having locations made of a material wherein the refractive index rises when irradiated by light of a specific wavelength, light of said specific wavelength along a length direction of the optical fiber at a predetermined period, causing the refractive index of the irradiated sections to rise, wherein high refractive index sections are formed by irradiating light evenly onto the optical fiber around the circumferential direction thereof, and wherein by using a parabolic mirror, light is irradiated evenly around the circumferential direction of the optical fiber.

6. An optical fiber grating manufacturing apparatus used in an optical fiber grating manufacturing method, comprising a plurality of reflecting mirrors, an irradiating device which irradiates light onto these reflecting mirrors, a holding device which holds an optical fiber in place within the optical path of the light reflected by said reflecting mirrors, and a moving device which moves at least one of said reflecting mirrors and said holding device in a length direction of said optical fiber, and wherein said optical fiber grating manufacturing method is a method of manufacturing an optical fiber grating having a plurality of grating sections arranged intermittently at a predetermined period along a longitudinal direction, by irradiating, onto the side of an optical fiber having locations made of a material wherein the refractive index rises when irradiated by light of a specific wavelength, light of said specific wavelength along the length direction of the optical fiber at a predetermined period, causing the refractive index of the irradiated sections to rise, wherein high refractive index sections are formed by irradiating light evenly onto the optical fiber around the circumferential direction thereof, and wherein by using a plurality of reflecting mirrors, light is irradiated evenly around the circumferential direction of the optical fiber.

7. An optical fiber grating manufacturing apparatus for manufacturing an optical fiber by irradiating ultraviolet light onto an optical fiber doped with a photosensitive element to form periodic high refractive index sections, comprising:

a device which measures the outer diameter of said optical fiber, and a device which varies a direction of exposure relative to said optical fiber.

8. An optical fiber grating manufacturing apparatus according to claim 7, wherein an optical fiber clamp which holds said optical fiber is rotated around the axis of said optical fiber, for varying said exposure direction.

9. An optical fiber grating manufacturing apparatus according to calim 7, wherein either a mirror, or both a mirror and a condensing lens, for irradiating ultraviolet light onto said optical fiber are rotated around the outer periphery of said optical fiber, for varying said exposure direction.

10. An optical fiber grating manufacturing apparatus according to any one of claim 7 through claim 9, wherein said exposure is performed by an interference exposure system.

11. An optical fiber grating manufacturing apparatus according to any one of claim 7 through claim 9, wherein said exposure is performed by irradiating said ultraviolet light onto said optical fiber through a phase mask or an intensity mask.

12. An optical fiber grating manfacturing apparatus according to any one of claim 7 through claim 9, wherein said exposure is performed by irradiating said ultraviolet light onto said optical fiber while moving either a mirror, or both a mirror and a condensing lens, in parallel to the axis of said optical fiber.

13. An optical fiber grating manufacturing apparatus according to any one of claim 7 through claim 9, wherein said exposure is performed by irradiating said ultraviolet light onto said optical fiber while moving an optical fiber clamp which holds said optical fiber, in parallel to the axis of said optical fiber.

14. An optical fiber grating manufacturing method, wherein a major axis direction and a minor axis direction of an optical fiber cross-section are found by measuring the outer diameter of the optical fiber, and an optical fiber grating is manufactured by irradiating ultraviolet light onto said optical fiber from the major axis direction and/or the minor axis direction of said optical fiber cross-section to form periodic high refractive index sections.

15. An optical fiber grating manufacturing method, wherein a major axis direction and a minor axis direction of an optical fiber cross-section are found by measuring an outer diameter of an optical fiber, and an optical fiber grating is manufactured by irradiating mutually different amounts of ultraviolet light onto said optical fiber from the major axis direction and the minor axis direction of said optical fiber cross-section, respectively, to adjust an amount of birefringence introduced by exposure to form periodic high refractive index sections.

16. An optical fiber grating manufacturing method, wherein a major axis direction and a minor axis direction of an optical fiber cross-section are found by measuring an outer diameter of an optical fiber, and an optical fiber grating is manufactured by irradiating ultraviolet light onto said optical fiber from either a single direction or a plurality of directions with a predetermined angle relative to the major axis or the minor axis of said optical fiber cross-section, to adjust an amount of birefringence introduced by exposure to form periodic high refractive index sections.

17. An optical fiber grating manufacturing method according to claim 16, wherein said predetermined angle is decided based on a transmission loss spectrum and an insertion loss polarization dependence of an optical fiber grating formed by irradiating ultraviolet light onto said optical fiber from the major axis direction and/or the minor axis direction of said optical fiber cross-section.

18. An optical fiber grating made by forming periodic high refractive index sections by irradiating ultraviolet light onto an optical fiber doped with a photosensitive material, which has a smaller insertion loss polarization dependence $PDL_{meas}$ ($\lambda$) than an insertion loss polarization dependence $PDL_{cale}$ ($\lambda$) determined as $\Lambda \cdot B_1 \cdot |(\lambda)/d\lambda|$ from the absolute value|dioss ($\lambda$)/d$\lambda$|of the loss spectrum loss ($\lambda$), observed when non polarized light or fully polarized light is introduced, differentited by the wavelength, the mode birefringence $B_1$ of the guided mode of the optical fiber, and the grating period $\Lambda$.

19. An optical module using the fiber grating according to claim 18.

20. An optical communication system incorporating the optical module according to claim 19.

21. An optical fiber grating manufacturing apparatus used in an optical fiber grating manufacturing method, comprising a plurality of reflecting mirrors, an irradiating device which irradiates light onto these reflecting mirrors, a holding device which holds an optical fiber in place within the optical path of the light reflected by said reflecting mirrors, and a moving device which moves at least one of said reflecting mirrors and said holding device in the length direction of said optical fiber, and wherein said optical fiber grating manufacturing method is a method of manufacturing an optical fiber grating having a plurality of grating sections arranged intermittently at a predetermined period along a longitudinal direction, by irradiating, onto the side of an optical fiber having locations made of a material wherein the refractive index rises when irradiated by light of a specific wavelength, light of this specific wavelength along a length direction of the optical fiber at a predetermined period, causing the refractive index of the irradiated sections to rise, wherein in the formation of a plurality of high refractive index sections, light is irradiated by varying sequentially the light irradiation position along the longitudinal direction of the optical fiber, so that the irradiation amount of the light becomes equal around the circumferential direction of the optical fiber as the result of integrating the light irradiation amount along the length direction of the optical fiber over all of said grating section, and wherein by using a plurality of reflecting mirrors, light is irradiated evenly around the circumferential direction of the optical fiber.

* * * * *